(12) United States Patent
Barnett et al.

(10) Patent No.: US 11,563,997 B2
(45) Date of Patent: *Jan. 24, 2023

(54) STREAMING MEDIA PRESENTATION SYSTEM

(71) Applicant: Meta Platforms, Inc., Menlo Park, CA (US)

(72) Inventors: John Samuel Barnett, Newark, CA (US); Joshua Barton Dickens, Oakland, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,781

(22) Filed: May 11, 2020

(65) Prior Publication Data

US 2020/0288191 A1    Sep. 10, 2020

Related U.S. Application Data

(63) Continuation of application No. 16/384,587, filed on Apr. 15, 2019, now Pat. No. 10,659,835, which is a
(Continued)

(51) Int. Cl.
*H04L 29/06* (2006.01)
*H04L 29/08* (2006.01)
(Continued)

(52) U.S. Cl.
CPC ....... *H04N 21/42203* (2013.01); *H04L 65/75* (2022.05); *H04L 65/765* (2022.05);
(Continued)

(58) Field of Classification Search
CPC .............. H04L 65/00; H04L 65/60; H04L 65/601–605; H04L 67/00; H04L 67/18;
(Continued)

(56) References Cited

U.S. PATENT DOCUMENTS 8,195,665 B1    6/2012 Mayle et al.
8,612,517 B1   12/2013 Yadid et al.
(Continued)

FOREIGN PATENT DOCUMENTS

CN    101681469 A    3/2010
CN    102314913 A    1/2012
(Continued)

OTHER PUBLICATIONS

Extended European Search Report as received in EP16156553.6 dated Feb. 8, 2017.
(Continued)

*Primary Examiner* — Boris D Grijalva Lobos
(74) *Attorney, Agent, or Firm* — Keller Preece PLLC

(57) ABSTRACT

One or more embodiments of the disclosure provide systems and methods for providing media presentations to users of a media presentation system. A media presentation generally includes a one or more media streams provided by one or more capturing users of the media presentation system. In one or more embodiments, a user of the media presentation system may share a media presentation with a viewing user. The media presentation system can provide a number of features to produce a media stream within a media presentation.

20 Claims, 16 Drawing Sheets

Related U.S. Application Data continuation of application No. 15/889,138, filed on Feb. 5, 2018, now Pat. No. 10,264,308, which is a continuation of application No. 14/964,340, filed on Dec. 9, 2015, now Pat. No. 9,917,870.

(60) Provisional application No. 62/183,612, filed on Jun. 23, 2015.

(51) Int. Cl.

| | | |
|---|---|---|
| *H04N 21/422* | (2011.01) | |
| *H04L 67/306* | (2022.01) | |
| *H04N 5/232* | (2006.01) | |
| *H04L 65/75* | (2022.01) | |
| *H04L 67/52* | (2022.01) | |
| *H04W 4/08* | (2009.01) | |

(52) U.S. Cl.
CPC ............ *H04L 67/306* (2013.01); *H04L 67/52* (2022.05); *H04N 5/23206* (2013.01); *H04N 5/23293* (2013.01); *H04W 4/08* (2013.01)

(58) Field of Classification Search
CPC ......... H04L 67/30; H04L 67/306; H04N 5/00; H04N 5/222; H04N 5/225; H04N 5/232–23206; H04N 5/23293; H04N 21/00; H04N 21/40; H04N 21/41; H04N 21/422; H04N 21/42203; H04W 4/00; H04W 4/06; H04W 4/08
See application file for complete search history.

(56) References Cited

U.S. PATENT DOCUMENTS

| | | | |
|---|---|---|---|
| 9,088,697 B2* | 7/2015 | Vivekanandan | ........ H04N 7/157 |
| 9,129,179 B1* | 9/2015 | Wong | ........................ G06K 9/20 |
| 9,917,870 B2 | 3/2018 | Barnett et al. | |
| 10,187,684 B2 | 1/2019 | Barnett | |
| 10,264,308 B2 | 4/2019 | Barnett et al. | |
| 2002/0103919 A1 | 8/2002 | Hannaway | |
| 2005/0147376 A1 | 7/2005 | Lim | |
| 2005/0262530 A1 | 11/2005 | Ruetschi et al. | |
| 2008/0092047 A1 | 4/2008 | Fealkoff et al. | |
| 2008/0127272 A1* | 5/2008 | Cragun | ............. H04L 29/06027 725/46 |
| 2009/0132924 A1 | 5/2009 | Vasa et al. | |
| 2009/0234910 A1 | 9/2009 | Chung et al. | |
| 2009/0249222 A1 | 10/2009 | Schmidt et al. | |
| 2009/0254862 A1 | 10/2009 | Viginisson et al. | |
| 2010/0088649 A1 | 4/2010 | Kemp | |
| 2010/0157062 A1* | 6/2010 | Baba | .................. G07C 9/00563 348/156 |
| 2010/0232643 A1* | 9/2010 | Chen | ........................ G06T 7/248 382/103 |
| 2011/0016172 A1 | 1/2011 | Shah | |
| 2011/0217021 A1 | 9/2011 | Dubin et al. | |
| 2012/0108293 A1 | 5/2012 | Law et al. | |
| 2012/0131139 A1* | 5/2012 | Siripurapu | .............. H04L 65/60 709/217 |
| 2012/0185610 A1 | 7/2012 | Chen | |
| 2013/0007787 A1 | 1/2013 | John et al. | |
| 2013/0103814 A1 | 4/2013 | Carrasco et al. | |
| 2013/0117692 A1 | 5/2013 | Padmanabhan et al. | |
| 2013/0216206 A1 | 8/2013 | Dubin et al. | |
| 2013/0259447 A1 | 10/2013 | Sathish et al. | |
| 2013/0266290 A1 | 10/2013 | Sathish | |
| 2013/0346144 A1 | 12/2013 | Ferren et al. | |
| 2014/0019261 A1 | 1/2014 | Hegeman et al. | |
| 2014/0041038 A1 | 2/2014 | Lessin et al. | |
| 2014/0082645 A1 | 3/2014 | Stern et al. | |
| 2014/0101691 A1 | 4/2014 | Sinha et al. | |
| 2014/0140675 A1 | 5/2014 | De Sa et al. | |
| 2014/0189530 A1 | 7/2014 | Anand et al. | |
| 2014/0282656 A1 | 9/2014 | Belyaev et al. | |
| 2014/0313330 A1* | 10/2014 | Carey | ................. G06K 9/00778 348/143 |
| 2014/0320674 A1* | 10/2014 | Kuang | ............... H04N 5/23222 348/207.1 |
| 2014/0359014 A1 | 12/2014 | Hjertonsson et al. | |
| 2014/0362225 A1* | 12/2014 | Ramalingamoorthy | ..................... G06K 9/00771 348/159 |
| 2015/0002688 A1 | 1/2015 | Baldwin et al. | |
| 2015/0020106 A1 | 1/2015 | Belyaev et al. | |
| 2015/0058016 A1 | 2/2015 | Goldstein | |
| 2015/0078729 A1* | 3/2015 | Sipe | ........................ G11B 27/11 386/241 |
| 2015/0127418 A1 | 5/2015 | Piepgrass et al. | |
| 2015/0149585 A1 | 5/2015 | Zhang | |
| 2015/0365582 A1 | 12/2015 | Eramian | |
| 2016/0248474 A1 | 8/2016 | Gilson | |
| 2016/0381109 A1 | 12/2016 | Barnett | |
| 2016/0381110 A1 | 12/2016 | Barnett et al. | |
| 2016/0381111 A1 | 12/2016 | Barnett et al. | |
| 2018/0159913 A1 | 6/2018 | Barnett et al. | |

FOREIGN PATENT DOCUMENTS

| | | |
|---|---|---|
| CN | 102595212 A | 7/2012 |
| CN | 102790923 A | 11/2012 |
| CN | 112383570 A | 2/2021 |
| EP | 2648394 A2 | 10/2013 |
| JP | 2004-013424 A | 1/2004 |
| JP | 2005033600 A | 2/2005 |
| JP | 2005-149193 A | 6/2005 |
| JP | 2006-187034 A | 7/2006 |
| JP | 2008-191768 A | 8/2008 |
| JP | 2009-169914 A | 7/2009 |
| JP | 2009-171624 A | 7/2009 |
| JP | 2009-200606 A | 9/2009 |
| JP | 2010-041535 A | 2/2010 |
| JP | 2010-522945 A | 7/2010 |
| JP | 2010-268128 A | 11/2010 |
| JP | 2012-531816 A | 12/2012 |
| JP | 2013-510453 A | 3/2013 |
| JP | 2013-511211 A | 3/2013 |
| KR | 10-2012-0063686 | 6/2012 |
| WO | WO-2012015919 A1 | 2/2012 |
| WO | WO 2014/036362 A1 | 3/2014 |
| WO | WO-2014100519 A1 | 6/2014 |
| WO | WO-2015025309 A1 | 2/2015 |
| WO | WO-2015048338 A1 | 4/2015 |
| WO | WO-2015058307 A1 | 4/2015 |
| WO | WO 2016-209310 | 12/2016 |

OTHER PUBLICATIONS

Partial European Search Report as received in EP 16156553.6 dated Nov. 8, 2016.
International Search Report & Written Opinion as received in PCT/US2015/065066 dated Apr. 1, 2016.
Office Action as received in Japanese Application 2017-566744 dated Aug. 27, 2019.
Examination Report as received in Australian Application 2015400184 dated Jan. 10, 2020.
U.S. Appl. No. 14/964,346, Sep. 7, 2017, Office Action.
U.S. Appl. No. 14/964,346, Apr. 2, 2018, Office Action.
U.S. Appl. No. 14/964,346, Sep. 6, 2018, Notice of Allowance.
U.S. Appl. No. 14/964,333, Sep. 8, 2017, Office Action.
U.S. Appl. No. 14/964,333, Mar. 30, 2018, Office Action.
U.S. Appl. No. 14/964,333, Sep. 26, 2018, Office Action.
U.S. Appl. No. 14/964,333, Feb. 14, 2019, Office Action.
U.S. Appl. No. 14/964,333, Jun. 14, 2019, Notice of Allowance.
U.S. Appl. No. 14/964,340, Oct. 27, 2017, Notice of Allowance.
U.S. Appl. No. 15/889,138, Jul. 9, 2018, Office Action.
U.S. Appl. No. 15/889,138, Dec. 6, 2018, Notice of Allowance.
U.S. Appl. No. 16/384,611, Sep. 9, 2019, Office Action.
U.S. Appl. No. 16/384,611, Jan. 13, 2020, Notice of Allowance.
U.S. Appl. No. 16/384,587, Sep. 27, 2019, Office Action.

(56) References Cited

OTHER PUBLICATIONS

U.S. Appl. No. 16/384,587, Jan. 8, 2020, Notice of Allowance.
Summons to attend Oral Proceedings as received in European Application 16156553.6 dated Mar. 17, 2021.
Examination Report as received in India application 201747045927 dated Feb. 5, 2021.
Co-Pending U.S. Appl. No. 14/964,333, filed Dec. 9, 2015, 103 Pages.
Co-Pending U.S. Appl. No. 14/964,340, filed Dec. 9, 2015, 104 Pages.
Co-Pending U.S. Appl. No. 14/964,346, filed Dec. 9, 2015, 105 Pages.
International Preliminary Report on Patentability for International Application No. PCT/US2015/065066, dated Jan. 4, 2018, 10 pages.
Office Action dated Apr. 21, 2020 for Chinese Application 201580081167.8, filed Dec. 10, 2015, 15 Pages.
Notice of Preliminary Rejection dated Oct. 28, 2021 for Korean Application No. 2018-7000255, filed Dec. 10, 2015, 9 pages.
Eleftheriadis A., "MPEG-4 Systems: Architecting Object-Based Audio-Visual Content," Journal of VLSI Signal Processing, vol. 27, 2001, pp. 55-67.
European Search Report for European Application No. 22156100.4, dated May 24, 2022, 9 pages.
European Search Report for European Application No. 22156021.2, dated May 23, 2022, 9 pages.
Office Action dated Apr. 4, 2022 for Korean Application No. 2018-7000255, filed Dec. 10, 2015, 3 pages.
Office Action for European Application No. 22156245.7, dated Jun. 22, 2022, 13 pages.
Office Action dated Sep. 1, 2022 for Chinese Application No. 202011454836.0, filed Dec. 10, 2015, 16 pages.
Office Action dated Sep. 19, 2022 for Chinese Patent Application No. 202011457656.8, filed on Dec. 10, 2015, 12 pages.
Office Action dated Sep. 20, 2022 for Chinese Patent Application No. 202011454980.4, filed on Dec. 10, 2015, 12 pages.

\* cited by examiner

STREAMING MEDIA PRESENTATION SYSTEM

CROSS REFERENCE TO RELATED APPLICATIONS

The present application is a continuation of U.S. application Ser. No. 16/384,587 filed Apr. 15, 2019, which is a continuation of U.S. application Ser. No. 15/889,138 filed Feb. 5, 2018, now issued as U.S. Pat. No. 10,264,308, which is a continuation of U.S. application Ser. No. 14/964,340 filed Dec. 9, 2015, now issued as U.S. Pat. No. 9,917,870, which claims priority to, and the benefit of U.S. Provisional Application No. 62/183,612 filed Jun. 23, 2015. Each of the aforementioned patents and applications are hereby incorporated by reference in their entirety.

BACKGROUND

1. Technical Field

One or more embodiments relate to systems and methods for providing streaming media content to multiple users. More specifically, one or more embodiments of the present invention relate to systems and methods for distributing streaming media content among multiple users.

2. Background and Relevant Art

Advancements in computing devices and computing technology provide users with the ability to share user-generated media with other users. As such, users are increasingly capturing and sharing media using various computing devices. To illustrate, modern mobile devices enable users to capture media, such as pictures, videos, audio, and text. In addition to sharing pictures, videos, audio, and text, some conventional systems allow users to stream media content to other users. For example, the user can stream captured media to the others users via a media stream. Further, if a user is capturing live content, the user can share a media stream with the live content with the other users. For example, a user can share user-generated media with a group of friends via a variety of communication systems (e.g., IM, text, or social networks).

Despite advances in technology, a number of drawbacks remain for a user wanting to share user-generated media with other users. For example, conventional systems do not distribute or share videos in an intuitive and efficient manner. Thus, when a user wants to share user-generated streaming media, conventional systems statically distribute the user-generated streaming media to only viewing users chosen by the user. Further, when multiple users are capturing user-generated media streams of the same event (e.g., a concert), conventional systems stream each media stream separately, resulting in a multiple unrelated media streams that are difficult for viewing users to navigate, locate, and enjoy as related media streams of the same event.

From the perspective of viewing users, many conventional systems do not account for the interests of the viewing users, and thus, a viewing user may have to navigate through several media streams trying to find a stream that is of interest to the recipient user, which is time consuming and frustrating. For example, when a viewing user wants to switch between two media streams of the same event, the viewing user may have to perform numerous navigational steps to relocate the other media stream. In addition, when the content within the media streams is live, the viewing user misses much of the live content spending time navigating through several media streams to locate a desired media stream.

Along similar lines, in many conventional systems, often users share user-generated streaming media irrespective of the quality or nature of the user-generated streaming media being shared. As a result, conventional systems often provide poor quality user-generated media streams to viewing users, resulting in a poor viewing experience. For example, conventional systems often provide user-generated media that includes shaky video and/or long tedious pauses. Moreover, because conventional systems do not distinguish between good quality or poor quality media streams, viewing users are often have to watch portions of poor quality or tedious media streams while navigating through various user-generated media streams to find a quality media stream.

As an additional problem, conventional systems do not provide a viewing user the ability to easily control the viewing experience of the user-generated streaming media. For example, most conventional systems simply provide a viewing user the user-generated media stream without allowing the viewing user to pause, replay, or otherwise navigate within the user-generated media stream. As a result, in conventional systems, a viewing user that joins a live user-generated media stream of an event after the event has begun can only watch the event from the current media stream position forward, thus reducing the viewing user's ability to understand and experience the complete context of a user-generated media stream. Often, the inability of conventional systems to allow a viewing user to "catch up" to the live position of the user-generated media stream can frustrate the viewing user to the point of choosing to not experience any of the user-generated media stream.

Accordingly, there are a number of considerations to be made in improving a user experience in relation to producing, sharing, distributing, and consuming user-generated streaming media.

SUMMARY

One or more embodiments described herein provide benefits and/or solve one or more of the foregoing or other problems in the art with systems and methods of capturing and sharing collaborative streaming media content between users. For example, one or more principles described herein provide systems and methods that intelligently share, as well as, organize streaming media in an intuitive and efficient manner. Additionally, one or more principles described herein provide systems and methods that produce, or provide tools to enable a user to easily produce, enhanced streaming media that provides a higher quality streaming media presentation that can include multiple related user-generated media streams. Moreover, one or more principles described herein provide systems and methods that enable a user to navigate within a live user-generated media stream during the media presentation of the live user-generated media stream.

To illustrate, one or more embodiments described herein provide systems and methods that provide a number of features that assist users in sharing media streams with other users. For example, the systems and methods described herein determine one or more media characteristics of a media stream, and based on the determined media characteristics, identify one or more users with whom to share the media stream (e.g., a distribution audience). In some example embodiments, the systems and methods dynamically detect a change in one or more media characteristics of a media stream, and based on the changes to the one or more media characteristics, the systems and methods modify the distribution audience of a media stream. For example, based on a characteristic change for a media stream, the systems and methods can increase or decrease the size of the user audience to which the media stream is shared.

Additionally, in some example embodiments, the systems and methods enhance the quality of a media stream. In particular, based on the media characteristics on the media stream, the systems and methods can apply production edits to the media stream to improve the quality of the media stream. For example, the systems and methods can improve the video quality of a media stream (e.g., correct for shakiness of the media stream, or remove long portions of video that do not include any action). As another example, the systems and methods can enhance the audio quality of a media stream using noise filtering, equalization, and volume adjustments.

In additional or alternative example embodiments, the systems and methods mix multiple media streams into a production media stream. More specifically, the systems and methods may produce—or provide tools that enable a user to easily produce—a production media stream based on multiple users providing media streams of the same subject matter (e.g., switching between two or more media streams to provide different angles of the same event). In further embodiments, the systems and methods can determine, based on one or more characteristics of each media stream, which media stream to present in the production media stream that is provided to the viewing users. For instance, the systems and methods may assign a weight to characteristics such as steadiness, image quality, audio quality, and/or facial recognition when selecting a media stream to present in the production media stream. Further, as the characteristics of each media stream change, the systems and methods can dynamically update which media is used to in the production media stream provided to the viewing users.

As yet another example, the systems and methods described herein can allow a viewing user to navigate within a media stream providing live content. For instance, the systems and methods can allow a viewing user to skim and/or replay notable moments from a pervious portion of a live media stream. For example, when a viewing user begins to view a media stream that is mid-way through a live event, the systems and methods provide the viewing user with notable moments, such as highlights, that occurred between the beginning of the media stream and the viewing user accessing the media stream. Additionally, for example, the systems and methods can provide navigation tools to a viewing user to quickly and easily navigate between viewing the media stream and notable moments. As such, the viewing user can quickly be brought up to speed and understand the present context of a media stream, even when accessing a media stream well after the beginning of the event.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail using the accompanying drawings.

DETAILED DESCRIPTION

Figure 1:
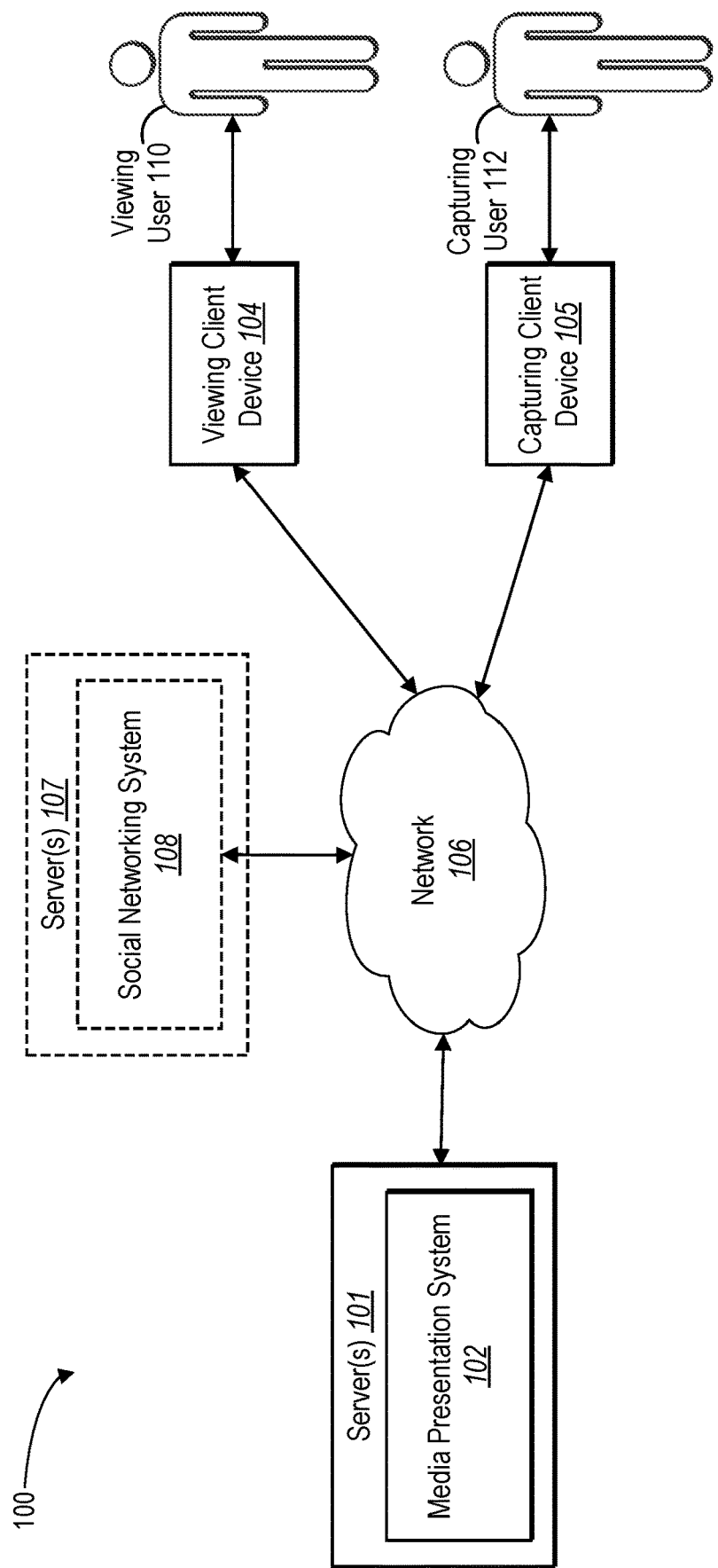
FIG. 1 illustrates a schematic diagram of a communication system in accordance with one or more embodiments described herein.

Embodiments disclosed herein provide benefits and/or solve one or more of the abovementioned or other problems in the art with a media presentation system that improves a user's experience for sharing and viewing a media stream. In particular, the media presentation system intelligently, produces, organizes, and shares a media stream in an intuitive and efficient manner. In some embodiments, for example, the media presentation system provides a user the ability, via a client device, to capture and provide a media stream (e.g., a video media stream) that the user intends to share with one or more other users (e.g., viewing users). Additionally, based on various features, preferences, and/or characteristics of a user, viewing users, and/or a media stream, the media presentation system can dynamically determine how to distribute a media stream (e.g., identify viewing users with whom to share a video stream). Moreover, in one or more embodiments, the media presentation system can modify one or more media stream characteristics and/or combine multiple media streams to produce a more enjoyable media stream to provide to viewing users. In addition, one or more examples of the media presentation system provide various navigation features during the presentation of a media stream that allows a user to customize the viewing experience of the media stream.

As briefly mentioned above, in one or more embodiments, the media presentation system can intelligently distribute a media stream, such as to a particular viewing user, a particular group of viewing users, and/or viewing users having a particular attribute. In particular, the media presentation system analyzes various types of data relating to a capturing user, a viewing user, and/or a media stream to dynamically determine a distribution audience for a particular media stream. For instance, the media presentation system can identify a distribution audience based on characteristics of the media stream. For example, the media presentation system can determine a size of a distribution audience based on determining a quality level corresponding to the media stream (e.g., if the media stream includes shaky video and/or poor audio quality, the media presentation system may limit the audience size). As the characteristics of the media stream change, the media presentation system can modify the size of the distribution audience.

Additionally, the media presentation system can monitor interactions and feedback from viewing users corresponding to the media stream, and, based on the interactions and feedback, modify the distribution audience (e.g., the media presentation system may expand or reduce distribution of a media stream in response to positive or negative feedback). The media presentation system can also determine a distribution audience for a media stream based on various other media stream characteristics, as will be further discussed below. Further, in addition to distributing a media stream based on media characteristics of the media stream, the media presentation system can also determine a distribution audience based on profile attributes and preferences of a viewing user (e.g., geographic location, user interests, custom audiences).

In some example embodiments, the media presentation system can detect that multiple users are capturing and sharing related media streams (e.g., media streams captured at the same event). In response, the media presentation system may produce a production media stream using the related media streams. For example, for each of the related media streams, the media presentation system may consider the angle and/or perspective (e.g., close-up verses panoramic wide-angle), subject matter being captured, facial-recognition, the length of time a media stream has been featured, the audio-quality, whether the media stream is redundant, view count, likes, shares, etc. Further, the media presentation system can mix in various aspects of multiple media streams to enhance the overall quality of a mixed media stream, such as switching video between three media streams, while using the audio from a single media stream that includes the highest audio quality.

Additionally, in one or more embodiments, the media presentation system may provide a viewing user with the ability to easily navigate content within a media presentation, enabling the viewing user to customize their viewing experience. For example, a viewing user may begin viewing a media stream after the media stream commences. In such a case, the media presentation system may provide previous media segments of the event that allow the viewing user to replay notable moments from the event and/or catch up to the live action. Further, in some example embodiments, the media presentation system may identify past portions of a media stream that correspond to a viewing user's interests and/or preferences.

Accordingly, one or more embodiments of the media presentation system overcome one or more disadvantages of conventional systems by enabling a user to efficiently capture media and share a media stream of the media with one or more viewing users. In addition, the media presentation system provides an enjoyable user experience to a viewing user by providing the most relevant and highest quality media streams to the viewing user, while also providing the viewing user various control features that enhances the user's ability to navigate and/or otherwise experience a media stream presentation. Additional details and advantages will be described below.

The term "media," as used herein, refers to digital data that may be transmitted over a communication network. Examples of media include, but are not limited to, digital photos, digital videos, digital audio, and/or other types of digital data. Accordingly, media may refer to images, video, audio, text, documents, animations, screen sharing, or any other audio/visual data that may be transmitted over a communication network. In general, media includes captured media content or simply content. As such, media can include content, such as user-generated content (e.g., content that a user captures using a media capturing device such as a smart phone or a digital camera) as well as non-user-generated media (e.g., content generated by a entity or third-party). In addition, media can be transmitted in various forms using various types of technology. Further, a media presentation system can transmit media in the form of a discrete file, or additionally, the media presentation system can send media in the form of streaming digital content (i.e., a media stream).

The term "media stream," as used herein refers generally to a flow of media that is provided over time. An example of a media stream can include a stream of live, near-live, or semi-live media from one computing device to one or more other computing devices. In some instances, a media stream broadcasts previously captured content. A media stream can include sending packets of data from one computing device to another computing device. In general, a media stream includes sending images, videos, and/or audio between computing devices. Further, when a computing device sends a media stream, the computing device may encode and/or encrypt a media stream before transmitting the media stream to the one or more other computing devices.

The term "media segment," as used herein refers generally to a discrete portion of media. For example, a media segment can include an image portion, video portion, and/or an audio portion comprising media form a media stream. For instance, a computing device that sends or receives a media stream can store a portion of the media stream as a media segment. As such, a media segment may include a video clip and/or an audio clip taken from a media stream. In some example embodiments, a media segment may include a portion of discrete media that is not obtained from a media stream, such as a media segment digitally created by a user (e.g., an animated video).

As used herein, the term "media presentation" refers to a defined set of one or more media streams and/or media segments. For example, a media presentation can include a plurality of related media streams and/or media segments. Accordingly, in one or more embodiments, a media presentation can include a compilation of media streams and/or media segments. For instance, a media presentation may include related media streams provided by multiple users at a common location or event. In some cases, a media presentation can include a single media stream, provided by a user and shared with other users. In general, the media presentation system will provide one or more media presentations to a viewing user in a media presentation feed, and the viewing user can select a media presentation to access one or more media streams and/or media segments corresponding to the media presentation. Further, as used herein, the term "media presentation feed" refers generally to a collection of one or more media presentations that are presented to a viewing user. For example, a client device can present a viewing user with a media presentation feed that includes multiple media presentations, with each media presentation organized chronologically, or by topic, user, channel, and/or additional organizational groupings.

The term "media characteristic" refers to features and attributes associated with media, such as media within a media stream or a media segment. Media characteristics can include both attributes of the media itself as well as metadata associated with the media. Examples of media characteristics include, but are not limited to, audio/video quality, connection strength to a communication network being used to provide a media stream, facial and object recognition, angles and perspectives, geographic location, time, redundancy, etc. Further, media characteristics can include interactions and feedback from viewing users, including implicit interactions (e.g., number views) and explicit feedback (e.g., likes, comments, shares, etc.). Additional detail and examples regarding media characteristics are provided below in the detailed description.

As used herein, the terms "interact" or "interacting" refer generally to any type of interface activity between a user and a client device. In one or more embodiments, interacting can include a user capturing media or viewing, browsing, accessing, and/or otherwise experiencing media. Moreover, interacting can include selecting graphical elements on a graphical user interface provided by a client device, such as selecting menu options or graphical buttons to capture media, access a media stream, replay a media segment from a media stream, approve a captured media segment, request a captured media segment be added to a media presentation, or other additional actions. In one or more embodiments, a user can interact with a client device using one or more user input devices, such as a touch screen, touchpad, keyboard, or mouse.

FIG. 1 illustrates an example embodiment of a communication system 100 (or simply, "system 100") in accordance with one or more embodiments described herein. As shown, the system 100 may include one or more server(s) 101 that include a media presentation system 102, a viewing client device 104, and a capturing client device 105 that are communicatively coupled through a network 106. Although FIG. 1 illustrates a particular arrangement of the media presentation system 102, the viewing client device 104, the capturing client device 105, and the network 106, various additional arrangements are possible. For example, the viewing client device 104 and/or the capturing client device 105 may directly communicate with the media presentation system 102, bypassing the network 106.

Optionally, the system 100 may include one or more server(s) 107 that include a social networking system 108. When the system 100 includes the social networking system 108, users of the social networking system 108 may be able to use the features and functionalities of the media presentation system 102, as described herein, via the social networking system 108. In some example embodiments, the media presentation system 102 may be a part of, or directly connected to, the social networking system 108. In other example embodiments, the media presentation system 102 is separate from the social networking system 108, but users of the social networking system 108 can access the media presentation system 102 via the social networking system 108.

In the event the media presentation system 102 interfaces with the social networking system 108, the viewing user 110, and/or the capturing user 112 may be associated with the social networking system 108. For example, the capturing user 112 may authorize the media presentation system 102 to access the social networking system 108 to obtain information about the capturing user 112, such as the user's profile, social network behavior, social networking contacts, and affinity to each social networking contact. The media presentation system 102 may also use the social networking system 108 to share media presentations among users of the media presentation system 102. For instance, a capturing user 112 may capture media, associate the captured media with a media presentation, and send the media presentation to the social networking system 108. Further, the social networking system 108 may provide the media presentation to the viewing user 110 via the social networking system 108.

Regardless of the presence of the social networking system 108, the components of the system 100, including the one or more server(s) 101, the viewing client device 104, the capturing client device 105, and the one or more optional server(s) 107 can communicate via the network 106. The network 106 may include one or more networks and may use one or more communication platforms or technologies suitable for transmitting data and/or communication signals. Additional details relating to the network 106 are explained below with reference to FIGS. 12-13.

As further illustrated in FIG. 1, a viewing user 110 may interact with the viewing client device 104, and a capturing user 112 may interact with the capturing client device 105. The viewing user 110 and the capturing user 112 may each be an individual (i.e., human user), a business, a group, or any other entity. For purposes of explanation, FIG. 1 illustrates only one viewing user 110 and one capturing user 112, however, it should be understood that the system 100 may include any number of viewing users and/or capturing users interacting with the system 100 using one or more corresponding client devices. Likewise, it should be understood that the terms "viewing user" and "capturing user" are generally used for purposes of explanation, and that the viewing user 110 and the capturing user 112 are both simply users of the media presentation system 102 and are both capable of capturing, sharing, and accessing media using the media presentation system 102.

As mentioned above, the viewing user 110 and the capturing user 112 may interact with the viewing client device 104 and the capturing client device 105, respectively, to communicate with the media presentation system 102 and/or social networking system 108. For purposes of explanation, the viewing client device 104 and the capturing client device 105 are sometimes collectively referred to as "client devices." The client devices may represent various types of client devices. For example, the client devices can include a mobile device, such as a mobile telephone, a smartphone, a PDA, a tablet, or a laptop. Furthermore, client devices can include a non-mobile device, such as a desktop or server. In addition, the client devices may include display devices such as televisions, LCD displays, LED displays, monitors, projectors, etc. Generally, as used herein, client devices can include any type of computing device. Additional details and examples with respect to the client devices are discussed below with respect to FIG. 11.

In general, the client devices may enable a user (e.g., the viewing user 110) to view one or more media presentations, for example, as part of a media presentation feed. For example, the client devices include processing components and a display screen that enable a user to view a media stream. Additionally, the client devices can also include components to capture media, as well as send the captured media to other computing devices. For instance, the client devices include video and/or audio capturing components, such as a camera and/or a microphone, that allow a user to capture media and provide the captured media in a media stream. Further, the client devices can also include components to receive captured media from other devices. Alternatively, some client devices may be limited to only provide viewing capabilities or only provide capturing capabilities.

Regardless of the particular components or arrangement of components of the system 100, the media presentation system 102 generally allows users of the system to capture, produce, distribute, and/or access/view media presentations. As a non-limiting overview example, the capturing user 112 can capture media and provide a media stream using the capturing client device 105 (e.g., provide a stream of live digital video). Based on media characteristics of the provided media stream, the media presentation system 102 determines a group of viewing users to include in a distribution audience. The media presentation system 102 can monitor the media characteristics, and based upon a change in the media characteristics, the media presentation system 102 can dynamically update the distribution audience. A viewing user 110 belonging to the distribution audience uses the viewing client device 104 to view the media stream as part of a media presentation. Further, if the viewing user 110 requests to view missed portions of the media presentation, the media presentation system 102 can identify media segments from the media presentation that are of interest to the viewing user 110, and present the media segments to the viewing user 110 as part of the media presentation. Additional details relating to the media presentation system will be explained in greater detail below.

Figure 2:
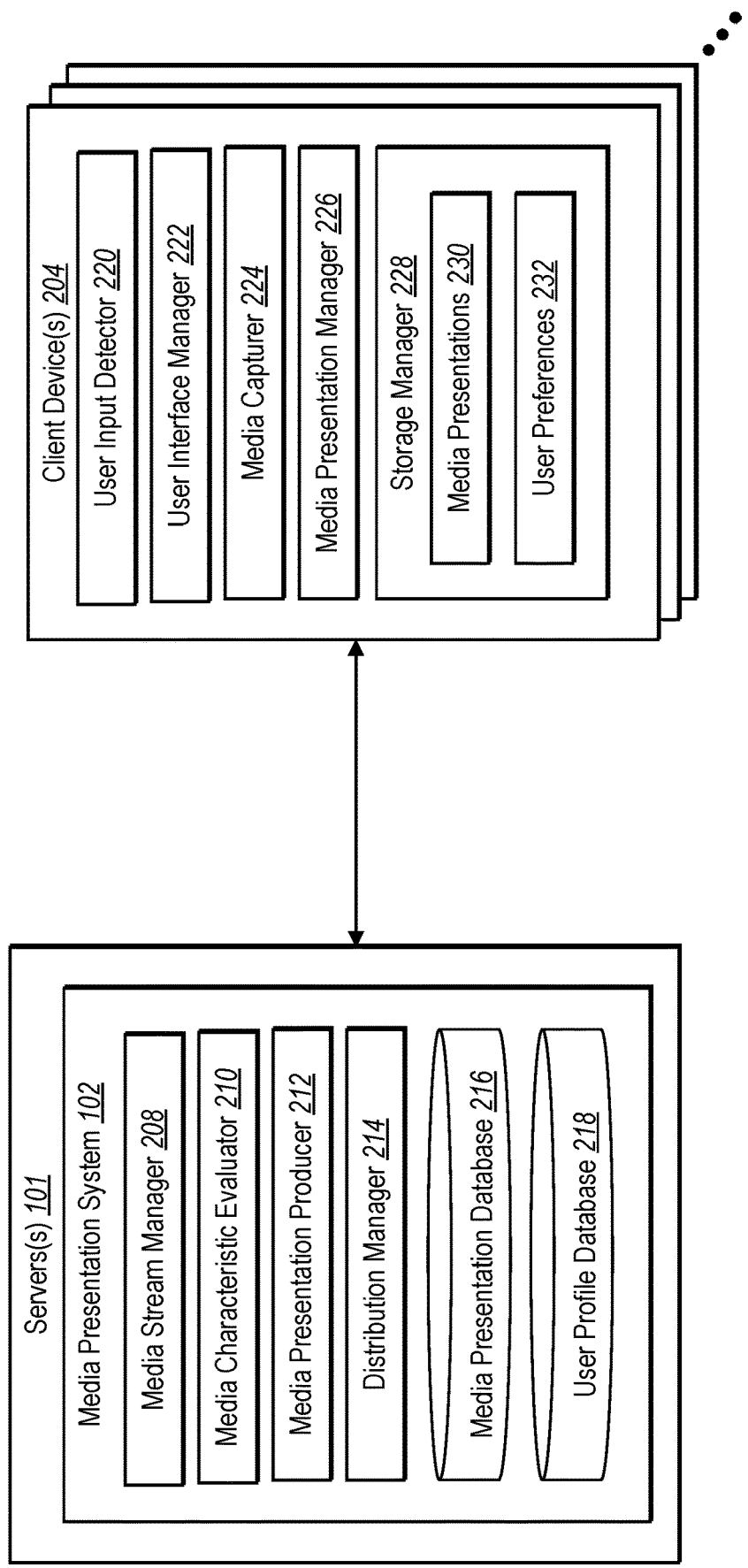
FIG. 2 illustrates a schematic diagram of a media presentation system in communication with one or more client devices in accordance with one or more embodiments described herein.

In particular, FIG. 2 illustrates a schematic diagram of one or more server(s) that include a media presentation system 102 in communication with one or more client devices 204. The media presentation system 102 in FIG. 2 can represent one or more embodiments of the media presentation system 102 discussed above with reference to FIG. 1. Similarly, the client device 204 shown in FIG. 2 may represent one or more embodiments of the viewing client device 204 and/or the capturing client device 105 discussed above with reference to FIG. 1. For instance, the media presentation system 102 and the client device 204 in FIG. 2 can be part of the communication system 100 illustrated in FIG. 1.

As illustrated in FIG. 2, the media presentation system 102 includes, but is not limited to, a media stream manager 208, a media characteristic evaluator 210, a media presentation producer 212, a distribution manager 214, a media presentation database 216, and a user profile database 218. In general, the media stream manager 208 can receive and recognize media streams captured and provided by the client device 204. The media characteristic evaluator 210 may regularly evaluate the media streams for media characteristics and provide the corresponding media characteristics to the media presentation manager 212. The media presentation manager 212 may use the media characteristics to select a media stream to include in a media presentation to one or more viewing users. Further, based on the media characteristics, for example, the distribution manager 214 may determine a distribution audience of viewing users to whom to send the production media stream, as well as, update the distribution audience when based on changes to the media characteristics. The media presentation database 216 can maintain a plurality of media presentations and/or media segments, and the user profile database 218 can maintain user information for users of the media presentation system 102.

Each component of the media presentation system 102 may be implemented using a computing device including at least one processor executing instructions that cause the media presentation system 102 to perform the processes described herein. In some embodiments, the components of the media presentation system 102 can be implemented by a single server device, or across multiple server devices. Although a particular number of components are shown in FIG. 2, the media presentation system 102 can include more components or can combine the components into fewer components (such as a single component), as may be desirable for a particular embodiment.

As briefly mentioned in the above overview of the media presentation system 102, and as illustrated in FIG. 2, the media presentation system 102 includes a media stream manager 208. The media stream manager 208, in general, manages media streams. More specifically, when a client device, such as a capturing client device, provides a media stream to the media presentation system 102, the media stream manager 208 receives, recognizes, and processes the incoming media stream.

As part of recognizing a media stream, the media stream manager 208 may identify information corresponding to the media stream. For example, the media stream manager 208 may identify the identity of the capturing user associated with the media stream. The media stream manager 208 may also identify any description data associated with the media stream. For example, the capturing user can provide a title, topic, or other description for the media stream, and the media stream manager 208 can capture the description data for purposes of organizing and distributing the media stream. In addition, the media stream manager can identify other data associated with the media stream, such as a location associated with the media stream, whether the media stream includes live content, and/or any other data that may be associated with the received media stream.

In one or more embodiments, the media stream manager 208 receives multiple media streams from multiple capturing users. Based on receiving multiple media streams, the media stream manager 208 can determine if any of the media streams relate to each other. In particular, the media stream manager 208 can determine when two or more media streams are providing content from a common location at the same time and/or capturing the same subject matter. For example, the media stream manager 208 can determine that two media streams providing media of the same music performance at the same concert and at the same time are related to each other.

The media stream manager 208 can determine that two or more media streams are related based on a number of factors. For example, the media stream manager 208 can match audio or video patterns (e.g., flashes of light at a concert or audio frequencies) from two or more media streams to determine a relation. As another example, the media stream manager 208 can determine that two media streams are received from client devices that are within a threshold proximity of each other, such as at the same event, venue, location, etc. In some cases, the media stream manager 208 may match labels or tags associating with two or more media streams to determine whether the two or more media streams are related. Additional detail with respect to determining whether media streams are related is provided below.

In addition to the media stream manager 208, and as shown in FIG. 2, the media presentation system 102 includes a media characteristic evaluator 210. The media characteristic evaluator 210, in general, determines one or more media characteristics for a received media stream. More specifically, the media characteristic evaluator 210 analyzes media streams received from capturing client devices to identify media characteristics associated with the media streams. Further, because the media characteristics of a media stream can constantly change, the media characteristic evaluator 210 can dynamically monitor, analyze, and identify media characteristics for each media stream over the time period in which the media presentation system 102 receives the media stream.

The media characteristic evaluator 210 may determine a number of media characteristics for a media stream, such as video characteristics, audio characteristics, and/or metadata characteristics. To illustrate, the media characteristic evaluator 210 can identify video characteristics for a media stream such as video resolution, aspect ratio, frames per second, refresh rate, video quality, etc. Likewise, the media characteristic evaluator 210 can identify video characteristics taken from video data associated with a media stream. For example, the media characteristic evaluator 210 can analyze a media stream to identify one or more video characteristics from the media stream (e.g., blurriness, shakiness, focus, color palate, brightness, contrast, etc.).

In addition to video characteristics, the media characteristic evaluator 210 can identify and/or detect audio characteristics of a media stream, such as the audio quality, clarity, sound levels, noise levels, interference, echoes, feedback, etc. In addition, the media characteristic evaluator 210 can analyze a media stream and determine a composite audio characteristic that represents the overall quality of the audio in a media stream. For example, as the media characteristic evaluator 210 analyzes audio from a media stream, the media characteristic evaluator 210 compare the composite audio characteristic to a threshold that defines an acceptable composite audio characteristic. Alternatively or additionally, the media characteristic evaluator 210 can analyze and compare individual audio characteristics to individual threshold levels related to each individual audio characteristic.

Further, as mentioned above, the media characteristic evaluator 210 identifies metadata characteristics. Examples of metadata characteristics include information about the media stream, such as if the media stream is live, near-live, or semi-live (e.g., delayed 2 seconds, 5 seconds, over 10 seconds, etc.), the location or venue of where the media stream is being captured (e.g., via GPS, WI-FI, and/or triangulation), labels and tags associated with the media stream, the cardinal direction of the capturing client device providing the media stream (e.g., the direction of the camera on the capturing client device), gyroscopic information corresponding to the capturing client device (e.g., how the capturing client device is tilting, rolling, and otherwise moving in three-dimensional space), whether an influential person or sponsor is providing the media stream, etc. Additional examples of metadata characteristics include timing of a media stream (e.g., when the media stream started), duration of the media stream, as well as the number of views, likes, etc. of the media stream.

In some embodiments, the media characteristic evaluator 210 can also determine media characteristics with respect to the content within the media stream. For example, the media characteristic evaluator 210 can use object or feature recognition to determine if the media stream includes an identifiable feature, such as a landmark, well-known object, brand, symbol, animal, etc. Similarly, the media characteristic evaluator 210 can use optical character recognition (OCR) to recognize characters and words within the media stream. As another example, the media characteristic evaluator 210 can use facial recognition to determine if the media stream includes one or more persons, and in particular, if the media stream includes a well-know person such as a celebrity or other influencer. Further, in some instances, the media characteristic evaluator 210 may use voice recognition to determine if a particular sound or person (e.g., as an announcer, singer, actor, etc.) is captured within the media stream.

In some embodiments, the media characteristic evaluator 210 analyzes the content in a media stream to determine the camera angle of the capturing client device capturing the media stream. For example, the media characteristic evaluator 210 determines that one capturing client device is providing a close-up shot while another capturing client device is providing a wide-angle shot of the same subject matter. Further, the media characteristic evaluator 210 may determine that two media streams are both pointing the same direction and/or providing close up shots of the same subject matter, and that the two media streams are providing different angles of the subject matter. The media characteristic evaluator 210 evaluate various other types of media characteristics, as will become more apparent with the description below.

The media characteristic evaluator 201 can provide data to the media presentation producer 212, as shown in FIG. 2. The media presentation producer 212 can create a production media stream to include within a media presentation to be shared with one or more viewing users. In general, the media presentation producer 212 can create a production media stream using one or more media streams received from one or more capturing client devices and taking into account media characteristics of the one or more media streams provided by the media characteristic evaluator 210. In one example, the media presentation producer 212 can select a media stream to create a production media stream to provide in a media presentation based on the media characteristics associated with the media stream, and in another example, the media presentation producer 212 can select and combine or otherwise mix two or more media streams to create a production media stream based on the media characteristics associated with the two or more media streams.

The manner in which the media presentation producer 212 selects media streams and/or creates production media streams can vary from one embodiment to the next based on several factors. In one or more embodiments, the media presentation producer 212 may analyze multiple media characteristics of a media stream in a weighted algorithm to determine whether the media stream measures up to minimum production standards before creating a production media stream to share with one or more viewing users. For instance, if a media stream that includes video is too shaky, the audio contains too much background noise, or the communication signal providing the media stream is weak, the media presentation producer 212 may determine not to include the media stream in a media presentation. In such a case, the media presentation producer 212 can determine to enhance the media stream with production edits prior to sharing the media stream in a media presentation. In addition, using a weighted algorithm, the media presentation producer 212 can select a quality media stream and determine to distribute the quality media stream with little or no production edits.

The weighted algorithm can optimize the media presentation system's ability to distribute media streams that viewing users will enjoy by not distributing media streams that have little value. For instance, the weighted algorithm can assign a higher importance to video quality and audio quality compared to other types of media characteristics. On the other hand, the weighted algorithm can assign a very high importance based on the capturing user. For instance, if a famous capturing user provides a media stream, the likelihood that user's find value in the media stream increases, even in the event that the video and/or audio quality are low. Thus, each media characteristic can be assigned a priority within the weighted algorithm such that the media presentation system distributes media streams that have value to viewing users. In one or more embodiments, a viewing user can set a priority to one or more media characteristics to customize how the media presentation producer 212 selects and creates media presentations for the particular viewing user.

As mentioned above, the media presentation producer 212 can apply a variety of production edits to a media stream to improve the production quality of the media stream. As one example, the media presentation producer 212 applies image stabilization techniques to reduce the shakiness in a video of a media stream. For instance, in some cases, the media presentation producer 212 uses the gyroscopic information, which indicates movement of the capturing device, to counterbalance and steady the video. As another example, the media presentation producer 212 applies audio filters to reduce noise, equalize specific frequencies, and/or increase the volume of voices in the media stream. The media presentation producer 212 can also apply other editing and filtering techniques to improve the production quality of a media stream.

As another example, the media presentation producer 212 may crop a media stream as part of a production edit. To illustrate, the media presentation producer 212 can apply a square cropping to a media stream. Thus, if the media presentation producer 212 receives a 16:9 aspect ratio media stream, the media presentation producer 212 crops the media stream to a 9:9, or 1:1, aspect ratio. In cropping a media stream, the media presentation producer 212 may dynamically adjust the position of the crop within the media stream at each frame to continually focus on the relevant content within the media stream. For example, if the media stream is capturing a sports play that moves from left to right within the media stream, the center of the crop may also shift from left to right to capture the sports play (e.g., follow a football in a video).

In addition, the media presentation producer 212 may determine whether to crop a media stream based on the capabilities and/or orientation of a viewing client device. For example, the media presentation system 102 can initially provide a square media stream to a viewing user. Upon the viewing user focusing on the media stream (e.g., providing user input to make the media stream full screen) and/or orientating the display of their viewing client device lengthwise, the media presentation system 102 provides the wider-angled, less-cropped, media stream to the viewing user.

Further, the media presentation producer 212 may cut away from a media stream when the media presentation system 102 detects a drag in the media stream (e.g., based on media characteristics and/or based on analyzing the media stream), and supplement the media stream with additional content. For example, upon the media presentation producer 212 detecting a long period of silence or lag (e.g., a period of uneventful content) in a media stream, the media presentation producer 212 may replay one or more notable moments from the media stream. For instance, if the media stream is of a concert, and the media presentation producer 212 detects a break between artists performing, the media presentation producer 212 can replay highlights from a previous artist's performance, perhaps from a different media stream showing a different angle. Alternately, the media presentation producer 212 can insert a media stream from a sponsor, such as an advertisement, or associate a replay with a sponsor (e.g., this replay brought to you by SPONSOR.)

In some cases, however, even after the media presentation producer 212 applies production edits to a media stream, the media stream or portions of the media stream may still not meet minimum production standards or quality levels for adding the media stream to a media presentation. In these cases, the media presentation producer 212 may notify the capturing user that the quality of the media stream is too low. In addition, the media presentation producer 212 may provide, as part of the notification, the media characteristic(s) that fail to satisfy the minimum standards (e.g., a notification that the signal strength is too weak). Alternatively, presentation producer 212 may add the media stream to a media presentation and provide the media presentation to the distribution manager 214 regardless of the production quality level.

As mentioned above, in one or more example embodiments, the media presentation producer 212 creates a production media stream by using multiple media streams. As an example, if multiple users are providing media streams that are captured at the same event, the media presentation producer 212 can create a production media stream of the event that includes portions from each of the multiple media streams. In other words, the media presentation producer 212 may switch or cut between each of the multiple media streams to produce a production media stream of the event. For instance, the media presentation system 102 can establish a media stream connection with a client device associated with a viewing user, and the media presentation producer 212 can alternate between providing each of the multiple media streams via the media stream connection with the client device.

In determining which media stream form the multiple media streams to use when creating a production media stream, the media presentation producer 212 may consider the media characteristics of each media stream. As an example, two capturing users can each provide a media stream of a performer at a concert. Based on the media characteristics for each of the media streams (discussed above with respect to the media characteristic evaluator 210), the media presentation producer 212 determines which media stream to use for the production media stream. For instance, the media presentation producer 212 can determine that the two media streams have comparable media characteristics and, as such, the media presentation producer 212 regularly switches between using each of the two media streams.

In another instance, the media presentation producer 212 can determine that the first media stream has better media characteristics for a first period of time and that the second media stream has better media characteristics for a second period of time. As such, the media presentation producer 212 uses the first media stream during the first period of time and switches to the second media stream for the second period of time. Additionally, if the media presentation producer 212 detects that the first media stream again has better media characteristics at a third time period, the media presentation producer 212 can switch back to using the first media stream during the third time period.

Along similar lines, the media presentation producer 212 can continuously monitor media characteristics provided in the data stream from the media characteristic evaluator 210 for each media stream. Using the data stream, the media presentation producer 212 can select, in real-time or near-real-time, the media stream that has superior media characteristics to provide in the production media stream. Accordingly, when the media presentation producer 212 detects a change in media characteristics between related media streams, the media presentation producer 212 may dynamically determine whether the current media stream should continue to be provided, or if the media presentation producer 212 should select another media stream.

The media presentation producer 212 may consider a number of factors when determining whether to switch from one media stream to another media stream to provide in a production media stream. In some example embodiments, rather than automatically selecting a media stream from a group of related media streams to provide in a production media stream, the media presentation producer 212 may enable a user to select the media stream to use in the production media stream. For example, the media presentation producer 212 can provide an indication of multiple related media streams to a client device associated with a user. The media presentation producer 212 then allows the user to select a media stream to view. Upon user selection, the media presentation producer 212 can provide the selected media stream to the production media stream as well as provide an indication to the user of the selected media stream (e.g., outlining the image of the selected media stream with a particular color or increasing the size of the selected media stream with respect to the size of the other media stream). Further, after the user has selected a media stream, the media presentation producer 212 continues to provide each of the media streams to the client device such that the user can switch to another media stream to use in the production media stream.

Regardless of whether a media presentation is based on a single media stream or multiple media streams, in one or more embodiments, the media presentation producer 212 can identify notable moments from the media streams associated with a media presentation. Once the media presentation producer 212 identifies a notable moment from a media stream, the media presentation producer 212 can create a media segment that captures the identified notable moment. To illustrate, the media presentation producer 212 may receive three related media streams from three capturing users at the same soccer game. If, during the sporting event, a player scores a goal, the media presentation producer 212 can identify the score as a notable event and create media segments from each media stream capturing the goal (e.g., create three media segments, one from each media stream).

As described below, the media presentation producer 212 can include one or more of the media segments showing the goal in the media presentation as a replay or highlight.

The media presentation producer 212 can identify a notable moment using various techniques. For example, in one or more embodiments, the media presentation producer 212 can monitor an event data feed (e.g., a sports game score feed) and detect when a notable moment occurs. For instance, the media presentation producer 212, based on the event data feed, determine a time frame in which a home run was hit. Using the determined time frame, the media presentation producer 212 can then identify a portion of a media stream associated with the same time frame. Additionally, or alternatively, a capturing user can mark a notable moment while capturing content, and the media stream provided from the client device of the capturing user can include metadata that identifies the notable moment.

Upon identifying a notable moment, the media presentation producer 212 can create a corresponding media segment. In creating each media segment, the media presentation producer 212 can store the media segment in the media presentation database 216 as well as label and/or categorize each media segment. Later, a viewing user can request to view a particular notable moment, and the media presentation producer 212 can identify one or more saved media segments that correspond to a specific notable moment in the media presentation to provide to the viewing user.

In one or more embodiments, the media presentation producer 212 identifies media segments to share with a viewing user based on user preferences and/or profile attributes of a viewing user. For example, if the viewing user has interest in a particular athlete, the media presentation producer 212 can identify media segments that feature the particular athlete. In this manner, the media presentation producer 212 can identify different media segments for different viewing users depending on the preferences of each viewing user requesting to access a particular media stream.

Referring again to FIG. 2, and as mentioned above, FIG. 2 illustrates the media presentation system 102 comprises a distribution manager 214. As an initial overview, the distribution manager 214 determines a distribution audience comprising one or more viewing users with whom to share a media presentation. Once the distribution manager 214 determines a distribution audience, the distribution manager 214 provides the media presentation to one or more client devices corresponding to each viewing user in the distribution audience. Further, the distribution manager 214 can dynamically modify or update a distribution audience based on various factors and characteristics related to a media stream and/or media presentation, as will be discussed further below.

As briefly mentioned above, the distribution manager 214 determines a distribution audience for a media presentation. In some example embodiments, the distribution manager 214 identifies viewing users to include in a distribution audience based on media characteristics of one or more media streams within the media presentation and/or characteristics of the media presentation. For example, if the media characteristics for the production media stream within a media presentation indicate a low quality media stream, the distribution manager 214 can limit the distribution of the media presentation. For instance, the distribution manager 214 can limit sharing the media presentation to only viewing users who are closely connected to user who captured the media stream, or if the media presentation includes a production media stream selected from multiple related media stream, the distribution manager 214 may limit sharing the media presentation to viewing users who are closely connected to any of the capturing users associated with the media presentation.

On the other hand, if the media characteristics for a media stream within the media presentation indicate an acceptable quality level, the distribution manager 214 may increase the number of viewing users within a distribution audience. For example, the distribution manager 214 may provide the media stream to viewing users who are having multiple degrees of separation between a capturing user, or in some instances, the distribution manager can include viewing users in the distribution audience that have not connection to a capturing user.

In addition to quality type media characteristics, the distribution manager 214 can identify users to include in a distribution audience based on various other types of media characteristics. In one or more embodiments, the distribution manager 214 determines a distribution audience by identifying viewing users that meet a particular criteria corresponding with a media presentation. For example, the distribution manager 214 can identify viewing users that are geographically located within a defined proximity of a geographic location associated with a media stream (e.g., viewing users at the same venue). Additionally, the distribution manager 214 can identify a viewing user to include in a distribution audience based on a viewing user being within an defined age range, being associated with the same or similar interests as a capturing user, subscribing to a particular media presentation channel associated with a media presentation, and/or based on user preferences.

As the media characteristics for a media stream change over time, the distribution manager 214 dynamically change which viewing users are included in a distribution audience. For example, based on changes in media characteristics, the distribution manager 214 may increase the number of viewing users in a distribution audience for a particular media presentation. Similarly, based on changes in media characteristics, the distribution manager 214 may decrease the number of viewing users in a distribution audience for a particular media presentation. In the event, however, that the distribution manager 214 decreases the size of a distribution audience, the distribution manager 214 can always identify viewing users that are actively experiencing a media presentation, and maintain the identified viewing users that are actively experiencing a media presentation within the distribution audience.

In order to increase the size of a distribution audience, the distribution manager 214 can identify additional viewing users based on various methods. In one or more embodiments, for example, the distribution manager 214 can identify additional viewing users by identifying users that are associated with each viewing user that experiences a media presentation. For example, upon a particular viewing user experiencing a media presentation, the distribution manager 214 can identify and add additional users that are connected to the particular viewing user. Thus, as more and more viewing users experience a media presentation, the distribution audience naturally grows. In addition to adding additional users to a distribution audience based on viewing users experiencing content, the distribution manager 214 can also modify age ranges, expand interest categories, or otherwise increase the opportunity for more viewing users to fall within a distribution audience.

For instance, in some example embodiments, the distribution manager 214 determines which users to include in the distribution audience based on interactions and feedback received from users currently accessing the media presentation. Interactions and feedback can include views, likes, comments, up or down votes, etc., of the media presentation, or media streams within the media presentation. To illustrate, if over half of viewing users provided with the media presentation report "liking" the media presentation, the distribution manager 214 may determine that viewing users, in general, will be interested in the media presentation. As a result, the distribution manager 214 can provide the media presentation to additional viewing users. Thus, based on feedback from viewing users that have access to the media presentation, the distribution manager 214 can determine whether to increase, decrease, or maintain the number viewing users that can access the media presentation.

In one or more embodiments, the distribution manager 214 predicts that a particular media presentation will be of interest to almost every user of the media presentation system 102. Thus, the distribution manager 214 may determine that the distribution audience includes essentially every viewing user that is available to experience the particular media presentation (e.g., based on age/content restrictions, not every viewing users on the system may be part of the distribution audience regardless of the predicted level of interest). In this way, the media presentation system 102 can distribute highly interesting and relevant content to as many viewing user's as possible during the streaming of a particular media presentation.

When providing viewing users a media presentation, the distribution manager 214 can distribute media presentations through a variety of distribution channels. For example, in addition to distributing media presentations to users of the media presentation system 102, in some embodiments, the distribution manager 214 distributes media presentations to another system or application, such as a social networking system, a messaging application, and/or other systems or applications. For instance, the distribution manager 214 can distribute a media presentation through a social networking system to one or more of the social networking users connected to capturing users (e.g., directly via the social networking system or through a plug-in that integrates the media presentation system 102 in the social networking system). In some cases, the distribution manager 214 may post a media presentation on a newsfeed of one or more social networking users via the social networking system.

As shown in FIG. 2 the media presentation system 102 includes a media presentation database 216. The media presentation database 216 may store media presentations including media streams and media segments. The media presentation database 216 can also store metadata associated with media presentations, such as the number of users that have accessed or viewed each media presentation, capturing users associated with each media presentation, date information, authorization information, user preference information, and any other information associated with media presentations.

In addition to the media presentation database 216, and as shown in FIG. 2, the media presentation system 102 includes the user profile database 218. The media profile database 216 may store user information corresponding to each user in the media presentation system 102. The user profile database 218 may include a user profile for each user of the media presentation system 102. A user profile may include, but is not limited to, biographic information, demographic information, behavioral information, social information, or other types of descriptive information, such as work experience, educational history, hobbies or preferences, interests, affinities, and/or location information. As described above, user profile information may be linked to corresponding profile information for a user stored by a social networking system.

Further, the user profile database 218 may store preference setting information associated with each user. For example, the media presentation system can allow a user to set default preferences (e.g., via a user preference setting interface). Example user preference settings can relate to user-defined default sharing preferences to apply to media presentations that a user captures. In one or more embodiments, for example, a user can define default preferences to apply to media presentations based on one or more characteristics of viewing users, such as age, gender, interests, etc.

Returning to FIG. 2, the media presentation system 102 may communicate with any number of client device(s) 204. For purposes of explanation, only one client device 204 will be described, but it is understood that the principles described can be applied to a plurality of client devices associated with any number of users. Further, the client device 204 shown in FIG. 2 can represent a viewing client device or a capturing client device. In other words, the client device 204 described with respect to FIG. 2 has capabilities to capture media, provide the captured media in a media stream to the media presentations to a user, as well as receive and present media presentations to a user.

As illustrated in FIG. 2, the client device 204 can include, but is not limited to, a user input detector 220, a user interface manager 222, a media capturer 224, a media presentation manager 226, and a storage manager 228. The storage manager 226 can include media presentations 230 and user preferences 232. Each component of the client device 204 may be implemented using a computing device including at least one processor executing instructions that cause the client device 204 to perform the processes described herein. In one or more embodiments, the various components are implemented using one or more applications installed and running on the client device 204. In some embodiments, the components of the client device 204 can be implemented by a client device alone, or across multiple computing devices. Although a particular number of components are shown in FIG. 2, the client device 204 can include more components or can combine the components into fewer components (such as a single component), as may be desirable for a particular implementation.

As mentioned above, the client device 204 includes a user input detector 220. The user input detector 220 can detect user interactions with a user interface to determine user input (e.g., detecting a touch gesture on a touch screen corresponding to an interactive element of the user interface). More specifically, the user input detector 220 can detect, identify, and/or receive user interactions and translate user interactions into a user input (e.g., a user command or request). As referred to herein, a "user interaction" means a single interaction, or combination of interactions, received from a user by way of one or more input devices. In some embodiments, the user input detector 220 can translate a combination of user interactions as a single user input and/or translate a single user interaction into multiple user inputs.

For example, the user input detector 220 can detect a user interaction from a keyboard, mouse, touch screen, or any other input device. In the event a touch screen is used as an input device, the user input detector 220 can detect one or more touch gestures (e.g., swipe gestures, tap gestures, pinch gestures, or reverse pinch gestures) that a user provides to the touch screen. In one or more embodiments, a user can provide one or more touch gestures in relation to and/or directed at one or more graphical objects, items, or elements of a user interface presented on a touch screen. The user input detector 220 may additionally, or alternatively, receive data representative of a user interaction. For example, the user input detector 220 can receive one or more user configurable parameters from a user, one or more user commands from a user, and/or any other suitable user input.

As mentioned above, client device 204 can include a user interface manager 222. In one or more embodiments, the user interface manager 222 can utilize user input and/or other data received from a user (or source simulating user input) to manage, control, and/or facilitate the use of a user interface. In general, the user interface manager 222 can facilitate the presentation (e.g., by way of a display screen associated with a client device 204) of a graphical user interface (or simply "user interface") for purposes of allowing a user to access the features and benefits of the media presentation system 102. In particular, and in response to the user input (e.g., detected by the user interface detector 220), the user interface manager 222 can allow a user to control a user interface to view, navigate, browse, search, edit, contribute to, share, re-share, and/or otherwise experience media presentations. Further, the user interface manager 222 can display graphical elements with which a user interacts to navigate between media presentations in a media presentation feed, as well as capture media to include in a media presentation.

From a capturing user's perspective, in some example embodiments, the interface manager 222 may display a media currently being captured by the client device 204 and being provided as a media stream to the media presentation system. For example, when a user is capturing media for a media stream, the interface manager 222 may present the media as the media is being captured. The interface manager 222 can further provide additional graphical elements associated with providing a media stream, such as selecting a privacy level for the media stream, applying one or more media enhancements to the captured media content, etc.

From a viewing user's perspective, the interface manager 222 may also display user interface elements on the display in connection with the user capturing media for the media stream. To illustrate, the user interface manager 222 can provide a user interface that facilitates the display of one or more media presentations and/or graphical elements on the client device 204 (e.g., on a display screen). In one or more embodiments, the user interface manager 222 can present a user interface as a user navigates within a media presentation feed. Further, the user interface manager 222 can change the display of the user interface as a user scrolls through a media presentation feed, by providing one or more swipe gestures to a touch screen, as described above.

In one or more embodiments, the user interface manager 222 can display a thumbnail or preview of a media presentation to represent to the media presentation. For example, the user interface manager 222 can display an image (e.g., a representative frame) from a media presentation, such as the first image of a media stream within the media presentation to represent the media presentation. Alternatively, the user interface manager 222 may update the thumbnail with a more up-to-date frame as the media presentation proceeds so that the thumbnail better represents the current media within the media stream.

In some example embodiments, a user interacts with a media presentation feed by providing, via a touch screen displaying a user interface, one or more swipe gestures directed toward the media presentation feed. In response to a user providing the one or more swipe gestures, the user interface manager 222 can navigate through multiple media presentations in a media presentation feed. In alternative embodiments, the user interface manager 222 can allow a user to navigate a media presentation feed using other navigation techniques, such as flipping through media presentations (e.g., turning a graphical representation of a page with each page corresponding to a different media presentation).

In addition to allowing a user to manually navigate or browse a media presentation feed, in one or more embodiments, the user interface manager 222 presents a media presentation to the user. In particular, the user interface manager 222 can play a media presentation, including one or more media streams, on the display of the client device 204. For instance, the user interface manager 222 can present a media presentation in response to a user selecting (e.g., providing a tap touch gesture) with respect to a media presentation in a media presentation feed. As described herein, the media presentation manager 226 may provide media presentations, including one or more media streams and/or one or more media segments, for the user interface manager 222 to present to a viewing user.

In one or more embodiments, the user interface manager 222 can cause the client device 204 to present a search interface that allows a user search for specific media presentations based on a variety of user input that may relate to media characteristics associated with media presentations. In one or more embodiments, for example, a user can search for media presentations based on a capturing user (e.g., a username, contact information, phone number, email address, or other identifier), media presentation content (e.g., users tagged in the presentation, topic of presentation), title of a media presentation, location associated with a media presentation, and/or any other identifiable media characteristic of a media presentation. For example, the user interface manager 222 can provide a query input field, a display of suggested search terms, and/or provide a feed of media presentations based on resultant media presentations identified in response to the user's search query.

In addition to allowing a user to browse, search or otherwise navigate a plurality of media presentations within a media presentation feed, in some example embodiments, the user interface manager 222 may present a notification to a user when a media presentation is posted or updated. The interface manager 222 may present the notification as an alert, message, banner, icon, sound, etc. Further, the interface manager 222 may only display a limited number of notifications as well as display notifications for only certain media presentations, such as for media presentations that the user is participating in, or from capturing users whom the user is following, etc.

As illustrated in FIG. 2 and as mentioned above, the client device 204 includes a media capturer 224. In general, the media capturer 224 assists a user in capturing or otherwise obtaining media and providing the captured media to other computing devices via a media stream. For example, the media capturer 224 uses one or more components of the client device 204 to capture media and provide the captured media in a media stream to the media presentation system 102. In particular, to capture media, the media capturer 224 can use a camera and/or microphone (if present) on the client device 204 to capture images, videos, and/or audio. For instance, the media capturer 224 can allow a user to capture a video with audio using the client device 204, and then provide the video with audio to the media presentation system 102 via a media stream.

In some example embodiments, the media capturer 224 can provide a user the ability to modify capture settings or preferences for capturing media. For instance, the media capturer 224 may allow a user to change zoom, take a still image while capturing video, mute/pause audio, apply a steadiness feature, etc. Additional examples of editing include applying themes, coloring, adding text or graphics, etc. To illustrate, the media capturer 224 may facilitate one or more options for a user to add text to a media segment. Additional examples of edits that a user can apply to media as the media is being captured are described below.

After capturing media, the media capturer 224 may provide the media via a media stream to the media presentation system 102. As described above, the media presentation system 102 can receive the media stream, determine media characteristics for the media stream, include the media stream in a media presentation, identify a distribution audience, and/or distribute the media presentation to viewing users in the distribution audience. For example, the media capturer 224 can facilitate the transmission of, or otherwise provide, the media steam to the media presentation system 102 using one or more communication technologies or protocols, as described below with reference to FIG. 12. In addition, in one or more embodiments, the media capturer 224 can compress, encode, alter or otherwise modify the media prior to sending the media stream to increase the efficiency and/or speed at which the media capturer 224 provides media stream. In addition, the client device 204 may store a copy of the media stream on the client device 204, such as in the media presentation database 216.

In addition to the media capturer 224, FIG. 2 further illustrates that the client device 204 includes a media presentation manager 226. In general, the media presentation manager 226 organizes media presentations within the media presentation feed. Further, the media presentation manager 226 facilitates the presentation of one or more media presentations to a user in response to user input. In addition, the media presentation manager 226 assists a user in navigating within a media presentation. For example, the media presentation manager 226 can enable a user to select between viewing multiple media streams provided in a single media presentation and/or view previous media segments from a media presentation. Additional detail regarding the media presentation manager 226 will now be provided.

In one or more embodiments, the media presentation manager 226 organizes media presentations within a media presentation feed based on information received from the media presentation system 102. For example, the media presentation manager 226 may arrange media presentations in the media presentation feed according to the timestamp (e.g., date created, time of last modified, etc.) of each media presentation, such as in a presentation list. To illustrate, when a new media presentation is shared with a user, the media presentation manager 226 may arrange the media presentation feed to display the media presentation before older media presentations. Alternatively, the media presentation manager 226 may arrange or rank the media presentation feed based on other criteria, such as media presentation title, category, age of the media presentation, presentation length, contributors (e.g., capturing users), user indication as a favorite, etc. In some example embodiments, the media presentation manager 226 can enable a user to define, through user preferences, how the media presentation manager 226 organizes, arranges, and/or ranks the media presentation feed.

While the media presentation manager 226 generally provides a single media presentation feed, in alternate embodiments, the media presentation manager 226 may provide numerous media presentation feeds on the client device 204. For example, the media presentation manager 226 may present a media presentation feed shared among friends and another media presentation feed shared among family members. Additionally, the media presentation manager 226 may provide numerous media presentation feeds that are arranged by category, theme, topic, creator, contributors, date created, etc. In one or more embodiments, the media presentation manager 226 can provide multiple media presentation feeds that each represent a media presentation channel to which the user elects to subscribe.

In at least some examples, the media presentation manager 226 presents one media presentation to a user (e.g., plays) at a time. For example, the media presentation manager 226 may fully display one media presentation to the user at a time, and thus plays the fully displayed media presentation. In some example embodiments, however, the media presentation manager 226 may display more than one media presentation to a user. In these embodiments, the media presentation manager 226 may determine which media presentation(s) to play or allow the user to indicate which media presentation(s) to play.

For example, based on a user selecting a media presentation from the media presentation feed, the media presentation manager 226 may provide the media presentation to the user. More specifically, the media presentation manager 226 may present the media from a media stream, such as a production media stream, to the user. In many cases, the production media stream will be a live media stream providing live content. As noted above, a media stream generally refers to a live media stream, a semi-live media stream, or a near-live media stream, the latter two being examples of media streams that are slightly delayed due to processing, transmitting, and production reasons. For example, a near-live or semi-live media stream may be delayed from two to ten seconds, or more, from when the live action actually occurs.

In providing a media presentation to a user, the media presentation manager 226 may provide navigational tools to the user. For example, the media presentation manager 226 provides selectable options for a user to access and view a notable moment from the media presentation. When a user selects an option to access and view a notable moment, the client device 204 may send a request to the media presentation system 102 to provide one or more media segments to the user corresponding to the selected notable moment. In response, the media presentation system 102 can provide the client device 204 with the one or more media segments as part of the media presentation (e.g., as part of a media stream or as a separate file) and the client device 204 can provide the media segments to the user.

In addition to requesting and receiving media segments corresponding to notable moments, when a user selects a media presentation, the media presentation manager 226 can provide a user with a selectable option to view one or more media streams from the media presentation, if available. To illustrate, the media presentation manager 226 may be providing a production media stream to a user as part of a media presentation, where the production media stream switches between two or more media streams provided from two or more capturing user client devices. Rather than viewing the production media stream, the user may prefer to view a particular media stream. As such, the media presentation manager 226 can provide one or more selectable options to a user to allow the user to view a single media stream instead of the production media stream. Further, when the user is viewing the single media stream, the media presentation manager 226 can provide an option to allow the user to return to viewing the production media stream.

In some cases, upon the user selecting the option to view other media streams as part of the media presentation, the media presentation manager 226 may need to communicate with the media presentation system 102 to access the other media streams. For example, upon the user selecting the option to access another media stream, the media presentation manager 226 may request other media streams, or portions thereof, to provide to the user. In some embodiments, the amount (e.g., length) and/or resolution of each media stream that the media presentation system 102 provides, upon the initial request and/or upon being notified of the user selection, to the client device 204 depends on available bandwidth. Alternatively, in some embodiments, when a user selects a media presentation, the media presentation system 102 may provide full-resolution media streams of multiple media stream corresponding to the media presentation to the client device 204.

In addition to allowing a user to select or navigate between media streams within a media presentation, in one or more embodiments, the media presentation manager 226 may facilitate playing, pausing, skipping, and/or repeating portions of a selected media presentation in response to user input. Specifically, in response to the media presentation manager 226 detecting a touch gesture, the media presentation manager 226 can provide navigational features based on the detected touch gesture. For example, if a user provides a right-to-left swipe gesture, the media presentation manager 226 can repeat the previously played media segment. As another example, if a user is watching a media segment of notable moment and provides a tap gesture, the media presentation manager 226 can skip the remaining portion of the playing media segment and provide the next notable moment, or return to providing a media stream.

In additional example embodiments, in response to a user providing a double tap gesture, the media presentation manager 226 can pause the media presentation. In yet another example, if a user provides a left-to-right swipe gesture, the media presentation manager 226 can provide an information page regarding the current media stream or media presentation. The above example gestures are provided as examples only, and one or more embodiments can include the same or additional gestures associated with the same or other functionality, as described herein.

As mentioned above with respect to the user interface manager 222, the media presentation system 102 provides search functionality that allows a user to search or discover media presentations not currently shared with the user. For example, the media presentation manager 226 may enable a user to discover popular, trending, or featured media presentations that users of the media presentation system 102 have made public. For instance, the media presentation manager 226 may enable a "discover tab" that a user may select to view one or more popular, trending, or featured media presentations. In another instance, the media presentation manager 226 may provide channels that allow users to discover different categories of media presentations, such as comedy, sports, news, the arts, music, culture, etc. Further, the media presentation manager 226 may allow a user to discover other media presentations by creator demographics (age, residency, nationality, topic, channel, category, creation date, modification date, popularity (e.g., number of viewers), trends (e.g., within the last hour, 12 hours, 24-hours, or another specified amount of time), location, interests, etc.

In addition to allowing users to search and discover other publicly available media presentations, in some example embodiments, the media presentation manager 226 may enable a user to discover media presentations of other users of the media presentation system 102 that are in a specified proximity of the user. For example, if the user is at an event, the media presentation manager 226 may allow the user to discover media presentations from other users at the event. Further, the media presentation manager 226 may enable a user to discover other users who are at, or who are contributing media streams to a media presentation at a particular location, such as a park, a school, a point of interest, a parade, a rally, etc. Additional details relating to providing media presentations to a viewing user will be described with reference to FIGS. 3A-10 below.

FIG. 2 also illustrates a storage manager 228. The storage manager 228 may include media presentations 230 and user preferences 232. For example, the storage manager 228 stores captured media as well as media presentations provided to the client device 204, including portions of media streams and media segments. The storage manager 228 may communicate with the media presentation system 102 to receive media presentations from the media presentation system 102. For instance, the storage manager 228 receives one or more media streams from the media presentation database 216. Similarly, the storage manager 228 may send user preferences to the user profile database 218 on the media presentation system 102.

Figure 3A:
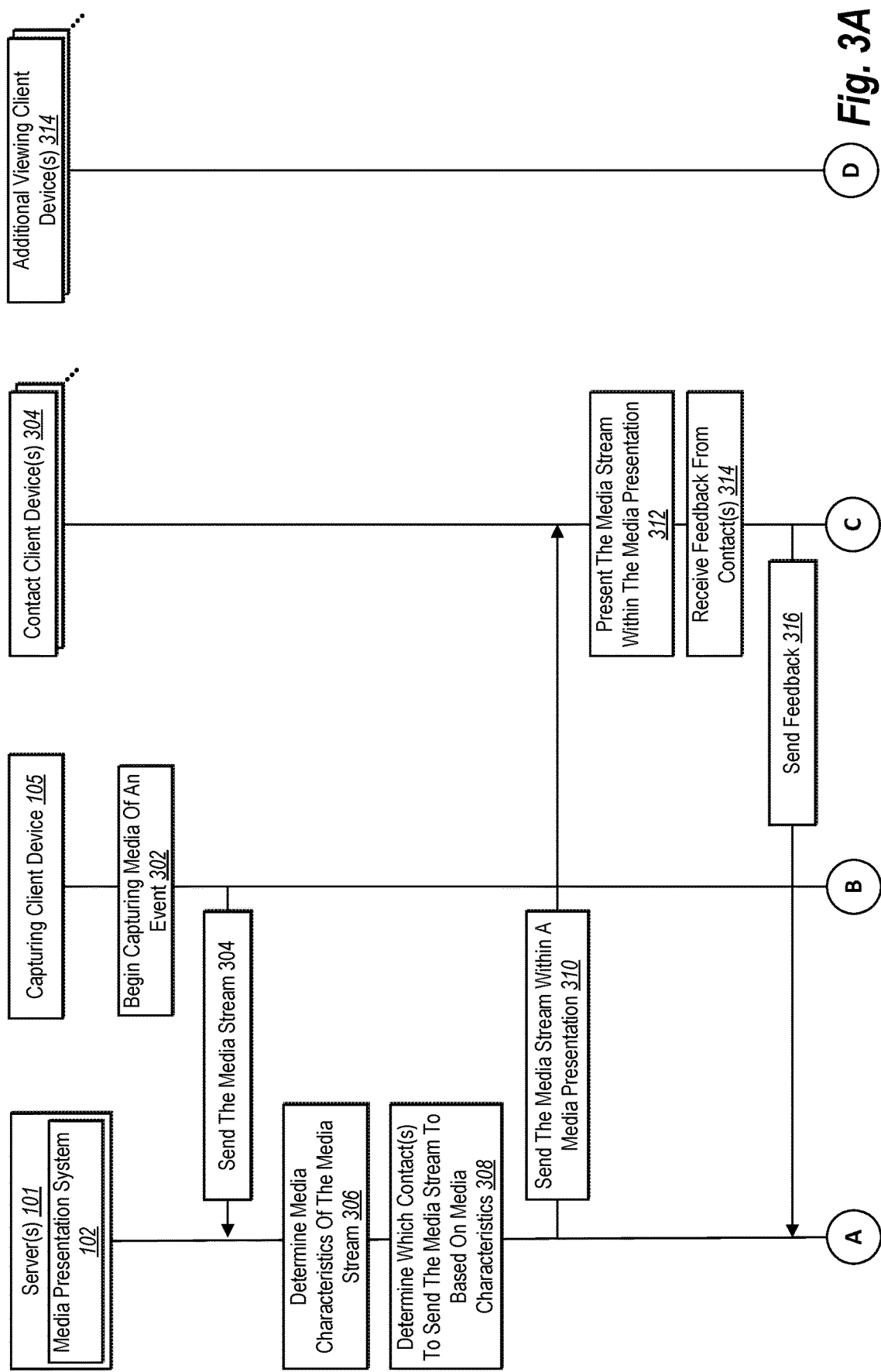
FIGS. 3A-3B illustrate a sequence-flow diagram of a media presentation system in accordance with one or more embodiments.
Figure 3B:
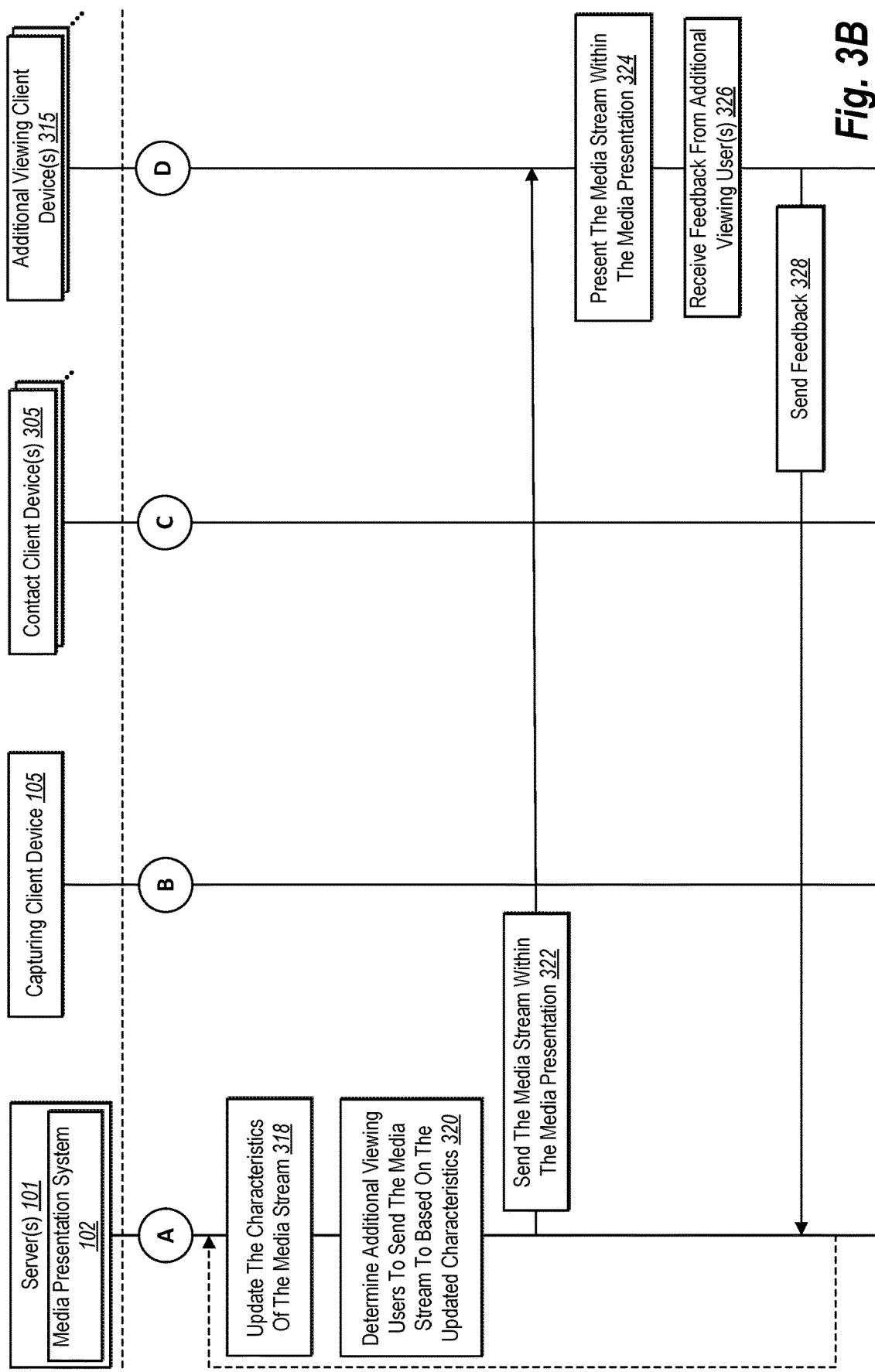

FIGS. 3A-3B illustrate a sequence-flow diagram showing interactions between one or more server(s) 101 that include the media presentation system 102 and multiple client devices, such as one or more capturing client devices 105, or one or more viewing client devices 104. (e.g., one or more contact client devices 305, and one or more additional viewing client devices 315). The capturing client device 105, the one or more contact client devices 305, and the one or more additional viewing client devices 315 may be example embodiments of the client device(s) 204 described with respect to FIG. 2. Further, the media presentation system 102 may correspond to the media presentation system described herein.

FIGS. 3A-3B represent one example of automatically determining a distribution audience for a particular media presentation corresponding to a particular media stream. In particular, and as discussed above, the media presentation system 102 can analyze a media stream and identify one or more viewing users to include in a distribution audience. In addition, based on updated information (e.g., media characteristics) related to the media stream, the media presentation system 102 can modify the distribution audience to include additional viewing users.

In one or more embodiments, and as shown in step 302 of FIG. 3A, the capturing client device 105 begins to capture media of an event. For example, a capturing user associated with the capturing client device 105 captures a live video of a concert that he or she is attending using a video camera and microphone of the capturing client device 105. In one embodiment, the client device access/controls the video camera and microphone functionality using an application associated with the media presentation system such that the capturing user can easy decide to share the media being captured. Alternatively, and as explained above, the client device can access/control the video camera and microphone functionality using an application associated with a social network, as explained above.

After capturing media, the capturing client device 105 may send the media in a media stream to the media presentation system 102 hosted on the one or more server(s) 101, as FIG. 3A illustrates in step 304. More specifically, the capturing client device 105 may stream the captured media of the event to the media presentation system 102 in real-time or near-real-time. In some example embodiments, the capturing client device 105 may provide the media presentation system 102 with context surrounding the media stream, such as including user provided information (e.g., a title for the media stream, tagging or labeling the media stream, etc.). In additional, or alternative embodiments, the media presentation system 102 may automatically determine context from the media stream, as described below.

As shown in step 306 of FIG. 3A, after receiving the media stream, the media presentation system 102 determines characteristics of the media stream. In particular, the media presentation system 102 can analyze the media stream to identify media characteristics, such as video characteristics, audio characteristics, and other characteristics of the media stream. For example, as described above, the media presentation system 102 can identify the video resolution, definition type, aspect ratio, frames per second, refresh rate, color palette, brightness, vocal levels, noise levels, audio range, location, cardinal direction, signal strength, etc. In particular, the media presentation system 102 can determine characteristics based on the video quality (e.g., video steadiness/shakiness, video angle and perspective, and framing) and the audio quality (e.g., music clarity and amount of background noise/interference).

In some example embodiments, the media presentation system 102 determines characteristics based on content identified within the media stream. For instance, the media presentation system 102 may recognize the face and/or the voice people, places, locations, or objects included in the media stream. For example, the media presentation system 102 can recognize a face of the capturing user's friend, and in response, generate a media characteristic corresponding to the capturing user's friend to associate with the media stream. Accordingly, the media presentation system 102 can use the media characteristic corresponding to the user's friend to identify viewing users to include in a distribution audience (e.g., the capturing user's friend, friends of the capturing user's friend, etc.). In the same way, when the media presentation system 102 recognizes a place, location, landmark or object, the media presentation system can generate and associate a media characteristic with the media stream, which can then be used to determine a distribution audience.

In addition to simply recognizing users of the media presentation system, in one or more embodiments the media presentation system 102 recognizes an influencer. In particular, an influencer can be an influential individual, such as a celebrity. Based on recognizing an influencer within a media stream, the media presentation system 102 may modify one or more characteristics (or generate one or more characteristics) to indicate that the media stream includes the influencer. For example, in the even the influencer is a member of a music group. The media presentation system can generate media characteristics that identify the identity of the influencer, the name of the music group, and the genre of music performed by the music group. Based on these media characteristics, the media presentation system 102 can identify users that are interested in the media stream to include in the distribution audience.

Similarly, the media presentation system 102 may include a sponsored media stream within a media stream presentation associated with an event. For example, a corporation may sponsor a "back stage" or "dug out" media stream that is provided to qualifying viewing users (e.g., viewing users who pay a premium, watch an advertisement, like or share a product, etc.). For instance, a user can preview the sponsored media streams, and if a viewing user wants to view more of the sponsored media stream, the viewing user can request access via the media presentation. Alternatively, the sponsored media stream may be presented in connection with a brand, such as the "SPRITE front row media stream." The media presentation system 102 can mix the sponsored media stream into the media presentation associated with the event, as described above.

After determining one or more media characteristics, step 308 in FIG. 3A shows that the media presentation system 102 determines which contact(s) (e.g., viewing users) to send the media stream to based on the media characteristics. In one or more embodiments, the media presentation system 102 will provide access to the media presentation to one or more contacts (e.g., friends) of the capturing user. In some cases, the media presentation system 102 may send the media presentation to additional viewing users of the media presentation system 102. As discussed above, the media presentation system 102 may determine which users to send the media presentation based on the one or more characteristics.

To illustrate, in one or more embodiments, the media presentation system 102 determines whether the quality of the media stream is above a minimum quality level. When the media presentation system 102 determines that the quality of the media stream, based on the media characteristics, is above the minimum quality level, the media presentation system 102 can identify one or more contacts to receive the media presentation as part of a distribution audience. Alternatively, if the media presentation system 102 determines that the media stream fails to satisfy minimum quality levels, the media presentation system 102 can determine not to distribute the media stream to other users. For instance, the media presentation system 102 determines that the signal strength from the capturing client device 105 is too weak to sustain a media stream or that the video is too shaky to be sent out to other users.

In some example embodiments, if the quality of the media stream is above minimum quality levels, the media presentation system 102 can still determine which users to send the media stream to based on media characteristics of the media stream. For example, the media presentation system 102 may weigh media characteristics such as video quality, audio quality, location, tags and labels, etc., when identifying contacts to include in the distribution audience. For instance, if the media stream is of a Beyoncé concert, the media presentation system 102 may identify one or more contacts of the capturing user that have an interest in Beyoncé, or R&B, pop, or soul music, despite other characteristics of the media stream being poor. In another instance, if the video and audio quality of the media stream is above average, the media presentation system 102 may determine to send the media stream to all contacts of the capturing user.

After identifying viewing users to include in a distribution audience, the media presentation system 102 sends the media stream within a media presentation to contact client devices 305 associated with the viewing users that are included in the distribution audience, as shown in step 310 in FIG. 3A. In some example embodiments, the media presentation system 102 can first send a notification or a portion of the media stream before providing the media stream to the contact client device 305. For instance, a contact client device receives a notification that the capturing user is streaming video from a Beyoncé concert. Upon the contact associated with the contact client device selecting the notification corresponding to the Beyoncé concert, the media presentation system 102 may send the media presentation having the media stream of the Beyoncé concert to the contact client device 305.

As mentioned above, the contact client devices 305 can present the media stream within the media presentation to the corresponding contacts, as shown in step 312 of FIG. 3A. In addition, and as illustrated in step 314, the contacts (e.g., a first group of viewing users) can interact with the media presentation and provide explicit feedback, such as liking, sharing, and/or commenting on the media stream. For example, step 314 illustrates the contact client devices 304 can receive the feedback from the viewing users. The corresponding contact client device 305 can also capture implicit feedback from a contact interacting with a media presentation. For example, when a contact accesses a media presentation, the contact client device 305 can capture viewing information (view count, duration watched, replayed segments, navigational inputs, etc.). Moreover, and as further illustrated in step 316 of FIG. 3A, the contact client devices 305 may send the captured feedback to the media presentation system 102.

In some example embodiments, the explicit feedback can include communications sent by viewing users independent of the media presentation system 102. For example, the media presentation system 102 may detect that a viewing user posts a social media message linking to the media stream or content within the media stream. For instance, a viewing user may publically post a short message indicating the viewing user's appreciation for content included in the media stream, and the media presentation system 102 can detect the post, extract feedback from the post, and translate the feedback in to one or more characteristics and/or media characteristics associated with the media stream.

Referring now to FIG. 3B, the media presentation system 102 may receive the feedback from the one or more contact client devices 305 and process the feedback. In particular, the media presentation system 102 may incorporate the feedback and modify and/or generate media characteristics of the media stream. In other words, the media presentation system 102 may supplement the media characteristics determined for the media stream with the feedback information. As shown in step 318 of FIG. 3B, the media presentation system 102 updates the media characteristics of the media stream after receiving the feedback from the contact client devices 305. As the media presentation system 102 receives additional feedback, the media presentation system 102 can continue to update the characteristics of the media stream.

The updated media characteristics associated with a media stream can provide additional information that indicates additional viewing users may be interested in the media stream and/or media presentation. Accordingly, and as shown in step 320 of FIG. 3B, the media presentation system 102 can identify additional viewing users to which to send the media stream based on the updated characteristics (e.g., the media presentation system can modify the users of a distribution audience). For example, when a proportionally high number of contacts of the original distribution audience share or like the media presentation the media presentation system 102 may determine a larger number of additional viewing users to include in a distribution audience. On the other hand, if very few contacts of the original distribution audience watch the media stream for less then a threshold period of time (e.g., ten seconds), the media presentation system 102 may determine not to send the media presentation to any additional viewing users.

In some example embodiments, the media presentation system 102 may determine additional viewing users to whom to send the media stream based on attribute information of potential viewing users. For example, the media presentation system 102 can identify viewing users based on a user's interest, such as viewing users who like Beyoncé. As another example, the media presentation system 102 sends the media presentation to viewing users of a particular age group, demographic, education, or lifestyle. As a further example, the media presentation system 102 sends the media presentation to viewing users within a defined geographic boundary (e.g., users at the same concert or venue, within the same city or state, or within a defined distance from the capturing client device, etc.). Further, the media presentation system 102 can identify a news outlet, a sponsor, and/or media stream channels as additional users to whom to send the media presentation. For example, once the media stream reaches a critical mass, the media presentation system 102 may add the media stream to a public listing sorted by popular or trending media streams. As such, viewing users can discover the media stream.

Once the media presentation system 102 determines additional viewing users to include in a distribution audience, the media presentation system 102 may send, or otherwise provide access to, the media stream to the additional viewing users. In particular, as step 322 of FIG. 3B illustrates, the media presentation system 102 sends the media stream within the media presentation to one or more additional viewing client devices 315 associated with the identified viewing users. In some example embodiments, sending the media presentation involves providing a viewing user access to the media presentation via the additional viewing client devices 315 (e.g., the media presentation appears within the media presentation feed of an additional viewing user).

Upon receiving the media presentation, the one or more additional viewing client devices 315 can present the media stream within the media presentation to the one or more additional viewing users, as shown in step 324 of FIG. 3B. Similar to the description above, the one or more additional viewing client devices 315 associated with the identified viewing users can receive, capture, and send implicit and explicit feedback as the additional viewing users interact with the media presentation and media stream. Thus, as shown in step 326, the one or more additional viewing client devices 315 receive feedback from the one or more additional viewing users, and as shown in step 328, the one or more additional viewing client devices 315 can send the feedback to the media presentation system 102. Upon receiving the feedback, the media presentation system 102 can repeat steps 318 through 328 (as indicated by the dashed arrow in FIG. 3B) to update media characteristics for the media stream, modify the distribution audience, provide viewing users in the updated distribution audience access to the media stream, receive feedback from users of the updated distribution audience, and receive the feedback.

In other words, as viewing users provide feedback, the media presentation system 102 can repeat steps 318-322 by continuously re-evaluating which additional viewing users to send the media stream to based on up-to-date feedback and adjusting which viewing users have access to the media stream based on the determination. To illustrate, as the media presentation system 102 determines that a media stream is gaining popularity, the media presentation system 102 may gradually increase the number of additional viewing to add to a distribution audience. Each time the media stream reaches a new critical-mass level, the media presentation system 102 can identify and send the media stream to additional viewing users. On the other hand, if the popularity of the media stream begins to decline, the media presentation system 102 can decrease the number of additional viewing users. Further, as described above, the media presentation system 102 may also factor in media characteristics, such as audio and video quality when determining the number of additional viewing users to include or exclude in the distribution audience.

Further, in some embodiments, the media presentation system 102 can predict when a media stream will reach the next critical-mass level. For example, the media presentation system 102 can consider the popularity of a media stream in connection with other factors, such as locations, events, trendiness, social buzz, etc. As a result, even though a media stream does not yet have a large following, the media presentation system 102 can anticipate the growth on the media stream and use the anticipated information in determining which additional viewing users to include in the distribution audience.

Figure 4A:
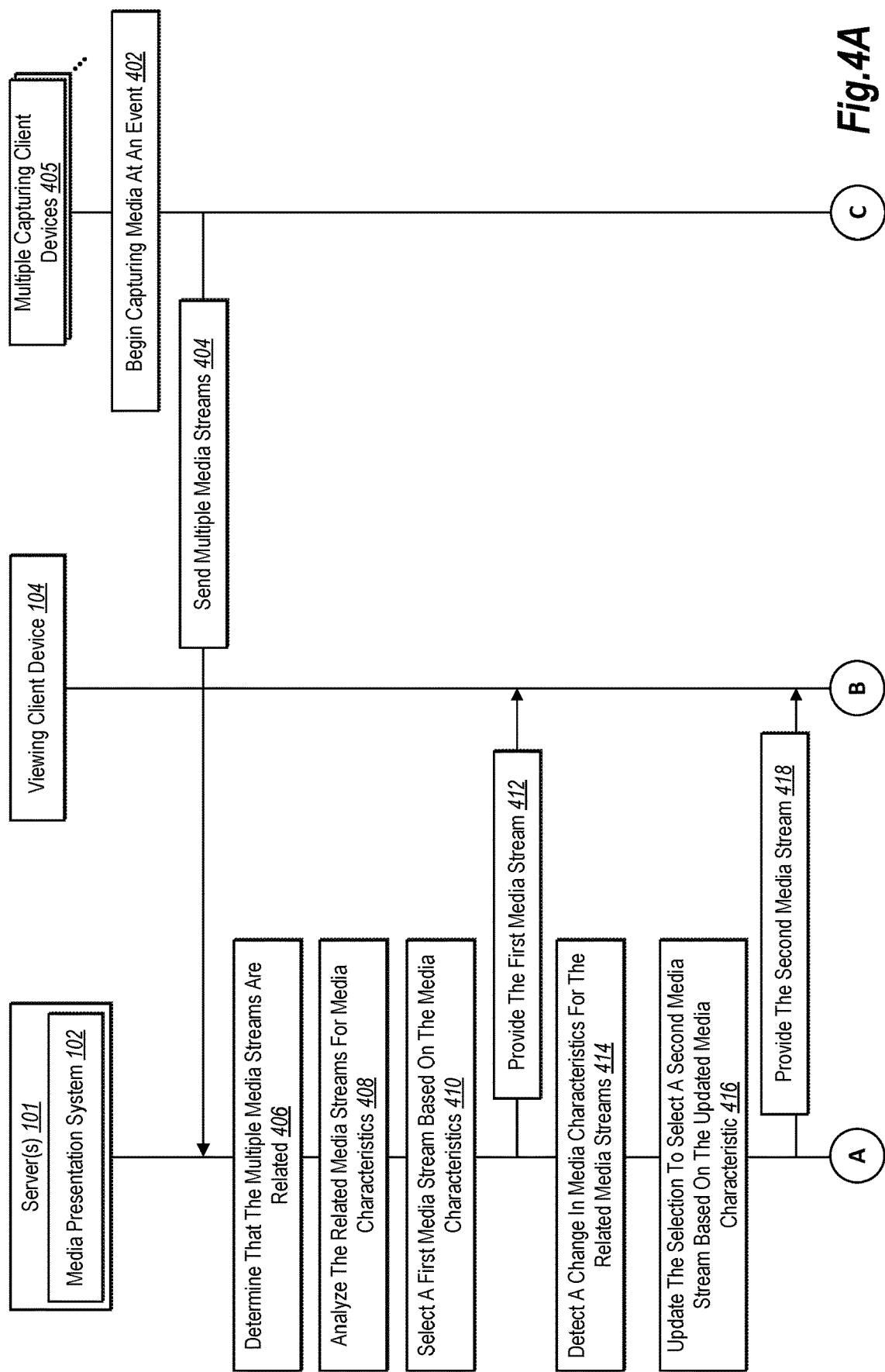
FIGS. 4A-4C illustrate a sequence-flow diagram showing the media presentation system communicating with a viewing user and multiple capturing client devices in accordance with one or more embodiments.
Figure 4B:
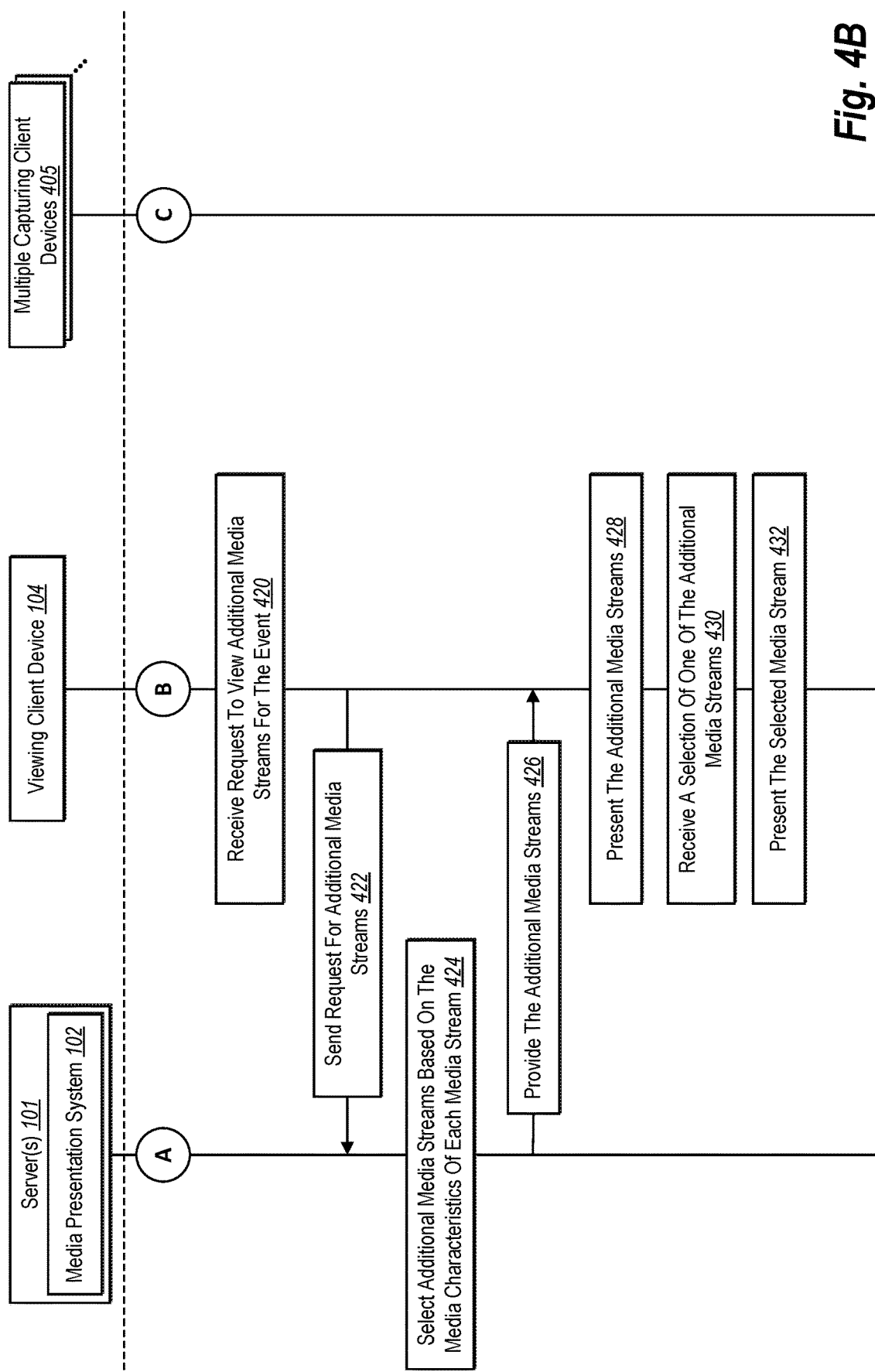
Figure 4C:
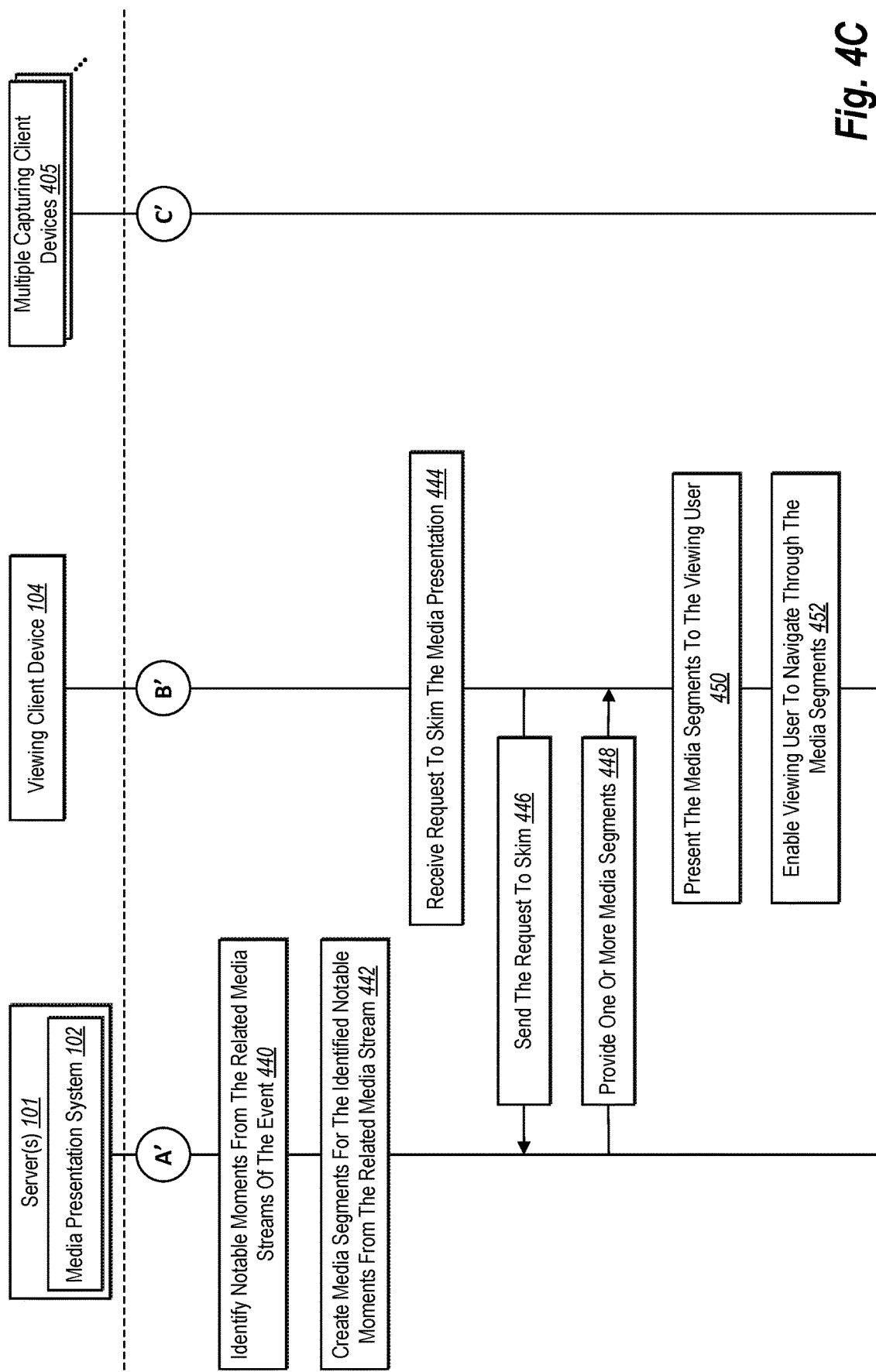

FIGS. 4A-4C illustrate a sequence-flow diagram showing interactions between one or more server(s) 101 that include a media presentation system 102 and multiple client devices, such as the viewing client device 104 and capturing client devices 405. As an overview, FIG. 4A illustrates the media presentation system 102 receiving multiple related media streams from the capturing client devices 405, creating a production media stream from the related media streams, and presenting the production media stream to a viewing client device 104 as part of a media presentation. FIG. 4B continues the sequence-flow diagram from FIG. 4A and illustrates the viewing client device 104 communicating with the media presentation system 102 to request additional and/or alternative media streams from the media presentation. FIG. 4C also continues the sequence-flow diagram from FIG. 4A and illustrates the viewing client device 104 communicating with the media presentation to skimming media segments corresponding to notable moments of the media presentation on the viewing client device 104.

As shown in step 402 of FIG. 4A, multiple capturing users corresponding to the multiple capturing client devices 405 begin capturing media at an event. For instance, multiple capturing users at the same event (e.g., a rally, a concert, a contest, a speech, an awards ceremony, a protest, a fundraiser, etc.) can each capture media. Each capturing client device 405 can send a media stream including the captured media to the media presentation system 102. More specifically, the capturing client devices 405 associated with each capturing user sends the multiple media streams to the media presentation system 102, as shown in step 404 of FIG. 4A. In one or more embodiments, the capturing client devices 405 are simply capturing related media at an event at the same time. In other words, there is no requirement that the capturing client devices 405 begin capturing media or sending a media stream at the same time (e.g., the media presentation system will determine the multiple media streams are related upon receiving and comparing media characteristics of each of the multiple media streams, as will be discussed further below).

As further illustrated in step 406 of FIG. 4A, the media presentation system 102 determines that the multiple media streams are related. Generally, the media presentation system 102 receives a plurality of media streams from the capturing client devices 405 from across the media presentation system. As is often the case, the capturing client devices 405 providing the multiple related media streams are not working in tandem with each other, rather capturing users are individually capturing and sharing media stream with other viewing users, and the media presentation system 102 detects that capturing users are sharing individual media streams. Accordingly, the media presentation system 102 determines whether a relation exists between the shared media streams.

In particular, when the media presentation system 102 receives the media streams from the capturing user client devices 405, the media presentation system 102 can compare the media streams to each other to identify whether any of the media streams are related. For example, the media presentation system 102 can compare the timestamps, geographic information (e.g., the capturing users are within a defined geo-fenced area), labels, tags, identified features (e.g., using image recognition), etc., to determine whether the media streams are related to each other. For instance, the media presentation system 102 may determine that the multiple media streams are related to each other because each of the media streams originate at the same event and have matching audio.

In some embodiments, the media presentation system 102 uses external information to determine whether multiple media streams are related. For example, the media presentation system 102 communicates with a social networking system or another system to collect information about an event and/or users at the event, and uses this information to determine if two media streams are related. For instance, a social networking system may indicate to the media presentation system 102 where and when an event is occurring, the name of the event, participants who will be or are at the event, including the capturing users providing the media streams. In addition, the media presentation system 102 may obtain event and user information based on the status of one or more capturing users on a social networking system or other status-broadcasting system (e.g., FACEBOOK, INSTAGRAM, etc.).

In step 408, the media presentation system 102 analyzes the related media streams for media characteristics. In particular, the media presentation system 102 analyzes each related media stream to identify media characteristics, such as video characteristics, audio characteristics, and other characteristics as described in detail above. In some cases, the media presentation system 102 delays analyzing the related media streams until after a number of related media streams are identified. For example, only after the media presentation system 102 identifies three, four, or five media streams that are related to each other does the media presentation system 102 analyze the related media streams. In other words, the media presentation system 102 may wait for a minimum number of capturing users to actively capture the same subject matter before the media presentation system 102 determines that the individual capturing users share a collective purpose.

As described above, the media presentation system 102 identifies video quality and audio quality media characteristics for each received media stream. In some cases, the media presentation system 102 can rank or prioritize each media stream based on video quality, audio quality and/or a combination of media characteristics. Further, the media presentation system 102 can use the media characteristics to identify which media stream to provide in a production media stream. For example, as shown in step 410, the media presentation system 102 selects a first media stream based on evaluating the media characteristics corresponding to each media stream. For instance, the media presentation system 102 selects the first media stream because the first media stream provides a close-up camera angle and a clear audio feed of the comedy show.

In step 412, shown in FIG. 4A, the media presentation system 102 provides the first media stream to the viewing client device 104. The media presentation system 102 can provide the selected first media stream as part of a production media stream within a media presentation. For example, the media presentation system 102 can send a media presentation to the viewing client device 104 that includes the production media stream showcasing the selected first media presentation. In response, the viewing client device 104 can present the first media stream to a viewing user as part of the production media stream.

After providing the first media stream to the viewing client device 104, the media presentation system 102 can continue to receive the related media streams from the multiple capturing client devices 405. Further, additional capturing users may begin to provide additional media streams of the comedy show and the media presentation system 102 may detect the additional media streams. Similarly, the media presentation system 102 may detect that capturing users that previously provided media streams to the media presentation system 102 have dropped off and are no longer sending media streams to the media presentation system 102.

Step 414 of FIG. 4A illustrates the media presentation system 102 detecting a change in media characteristics for the related media streams. For instance, the media characteristics associated with the media streams will likely change over time. For example, a media stream may become shaky, diminish in signal strength, degrade in audio quality, etc. Conversely, the video quality and audio clarity of a media stream may improve over time. As such, the media presentation system 102 can detect changes in the video and/or audio quality of the related media streams based on the updated media characteristics for each of the related media streams. As another example, the media presentation system 102 may discover that the ranking or priority for the media streams has changed upon detecting the updated media characteristics.

In some example embodiments, the media presentation system 102 monitors the time a media stream is being provided to a viewing user. For example, once the media presentation system 102 selects a media stream to provide to the viewing user, the media presentation system 102 may track the duration of time that the media stream is provided to the viewing client device 104. Accordingly, and as mentioned above, viewing users prefer a content experience that is not tedious. To keep a content experience exciting and stimulating, commercially productions, such as professionally produced movies and television shows, frequent switch between camera angles and perspectives. As a result, viewing users have come to appreciate content that switches between different angles and perspectives. Moreover, longer cuts from a single media stream convey an unprofessional and unpolished feel to viewing users as well as allow viewing users to identify imperfections in the quality of the media stream. For example, a viewing user may not notice that a quick cut from a media stream is shaky or has poor lighting, but if the media stream is provided to the viewing user for an extended period of time, the imperfections of the media stream may become accentuated to the viewing user. In light of the foregoing, in some instances, the media presentation system 102 may automatically switch from providing one media stream to the viewing user to providing another related media stream to the viewing user according to a predetermined schedule (e.g., 2-4 seconds, 12 seconds, 30 seconds, etc.).

In some example embodiments, the media presentation system 102 may use the media characteristic that indicates the length of elapsed time a media stream has been provided to a viewing user as a factor in determining when to provide another related media stream to the viewing user. For example, the media presentation system 102 can reduce the weight given to one or more other media characteristics of a selected media stream the longer the selected media stream is provided. Then, at some point, regardless of how superior the one or more other media characteristics are of the selected media stream in comparison to the other related media streams, the media presentation system 102 will determine to select another media stream. In this manner, the media presentation system 102 can ensure that a viewing user will be provided with different cuts between different related media streams. Further, the media presentation system 102 may provide media streams that have better media characteristics for longer durations of time than media streams that have poorer media characteristics, but the media presentation system 102 may still switch between the different media streams to provide variety to a viewing user.

In one or more embodiments, the media presentation system 102 may follow a production template when determining the length of time to provide a selected media stream to the viewing user before cutting to another media stream from the related media streams. In general, a production template includes default production attributes that help determine the look and feel of a production media stream. For example, if the media presentation system 102 is using a movie trailer type production template, the media presentation system 102 may generally cut between media streams every few seconds. If the media presentation system 102 is using a sports production template, the media presentation system 102 may use longer continuous shots from the same media stream followed by replays from the selected media stream as well as other related media streams. As discussed below, the media presentation system 102 can employ a number of production templates in determining the optimal time the media presentation system 102 should provide a selected media stream to viewing users.

Further, in many cases, the production template that the media presentation system 102 selects may be based on the content and subject matter to which the related media streams correspond. As an example, if the media presentation system 102 detects that the related media streams correspond to a sports game, the media presentation system 102 may use a sports production template, or a particular sporting-type template (e.g., a template designed for a football game, a tennis match, baseball game, a basketball game, etc.). As another example, upon determining that multiple media streams relate to a concert, the media presentation system 102 may select a concert production template that specifies providing longer cuts from media streams that include close-up shots of performers at the concert or that specifies switching between media streams based on the current status of the performance (e.g., whether a performer is performing a solo).

Returning to FIG. 4A, in step 416, the media presentation system 102 updates the selection to select a second media stream to provide to the viewing user based on the updated media characteristics. In particular, when the media presentation system detects a change in the media characteristics of the related media streams, the media presentation system 102 may determine that the media characteristics of the second media stream outperform the first media stream. As a result, the media presentation system 102 switches to the second media stream. As another possibility, while the media characteristics of the first media stream may continue to have equal or better media characteristics than the second media stream, the media presentation system 102 may decide, based on the elapsed time that the media presentation system 102 has provided the first media stream to the viewing user, to change selections to the second media stream, as described above.

Upon switching selections to the second media stream, the media presentation system 102 may provide the second media stream to the viewing user. In particular, step 418 illustrates the media presentation system 102 providing the second media stream to the viewing client device 104. For example, upon selecting the second media stream, the media presentation system 102 switches from providing the first media stream in a production media stream to providing the second media stream in the production media stream.

Upon the media presentation system 102 sending the second media stream to the viewing client device 104, the viewing client device can present the selected second media stream to the viewing user. For instance, if the viewing client device 104 is presenting a production media stream to the viewing user, the production media stream may automatically switch from the first media stream to the second media stream on the viewing client device 104. In other words, from the perspective of the viewing client device 104, the viewing client device 104 continues to provide the production media stream to the viewing user even though the media presentation system 102 switches from providing the first media stream to providing the second media stream in the production media stream.

Referring now to FIG. 4B, in some example embodiments, the viewing user may desire to view one or more additional media streams associated with a media presentation. For example, if the viewing user is watching the production media stream, the viewing user may request to view one or more additional media streams. For instance, the viewing user may select a graphical user interface option to access addition angles and/or perspectives. Accordingly, as illustrated in step 420 of FIG. 4B, the viewing client device 104 receives the request to view additional media streams for the event. As shown in step 422 of FIG. 4B, the viewing client device 104 sends the request for the additional media streams to the media presentation system 102. In an alternative embodiment, the viewing client device 104 may already be accessing one or more additional media streams of the event. For example, the media presentation system 102 may be sending each media stream relating to the event as part of the media presentation, including the production media stream. As such upon receiving the request, the viewing client device 104 may present the additional media streams to the viewing user, as shown in step 428.

In the event the media presentation system 102 receives a request from the viewing client device 104 to provide additional media streams to the media presentation system 102, the media presentation system 102 can provide one or more related media streams to the viewing client device 104. In particular, as step 424 of FIG. 4B shows, the media presentation system 102 selects additional media streams based on the media characteristics of each media stream 424. In some instances, the media presentation system 102 may select a predetermined number of additional media streams to provide to the viewing client device 104. For example, the media presentation system 102 may only select media streams that meet threshold quality standards, before or after the media presentation system 102 applies production edits, as described above. As such, the media presentation system 102 may evaluate the media characteristics of each additional media stream to determine the quality of the media stream and whether to send to the media stream based in the quality level of the media stream, as described above.

In some example embodiments, the media presentation system 102 may identify that the viewing client device 104 has limited display capabilities. For instance, the media presentation system 102 may identify that a viewing client device cannot comfortably display more than four media streams at the same time. Accordingly, the media presentation system 102 may limit the number of provided media streams to four or less. Alternatively, the media presentation system 102 may disregard the capabilities of a viewing client device and may allow the viewing client device to determine how to handle displaying multiple media streams that the media presentation system 102 provides to the viewing client device.

As shown in FIG. 4B, in step 426 the media presentation system 102 provides the additional media streams to the viewing client device 104. In some cases, the media presentation may provide reduced versions of the additional media streams or select portions from the additional media streams. For example, if bandwidth is limited, the media presentation system 102 may provide a lower-quality resolution of the additional media streams. Additionally, or alternatively, the media presentation system 102 may withhold audio for one or more of the media streams when providing the additional media streams.

The viewing client device 104, as illustrated in step 428, can present the additional media streams to the viewing user. For example, the viewing client device 104 can display one or more additional media streams to the viewing user at the one time, such as in a grid layout. Alternatively, the viewing client device 104 may display a one of the additional media streams at one time and allow the viewing user to scroll or cycle through the additional media streams.

In one or more embodiments, the viewing client device 104 may vary the size of the additional media streams when presenting the additional media streams to the viewing user. For example, the viewing client device 104 may display one or more of the additional media streams over a portion of the presently presented media stream, such as the second media stream or the production media stream (e.g., picture-in-picture). As another example, the viewing client device 104 may reduce the size of the second media stream and display one or more of the additional media streams adjacent to the second media stream, such as in a symmetrical grid layout. One will appreciate that the viewing client device 104 can present the additional media streams to a viewing user using a variety of methods and layouts.

The viewing client device 104 can allow the viewing user to select one or more of the additional media streams. Thus, as step 430 of FIG. 4B illustrates, the viewing client device 104 receives a selection of one or more additional media streams. In response, the viewing client device 104 presents the selected media stream to the viewing user, as shown in step 432. The viewing client device 104 can replace the second media stream with the selected media stream. Alternatively, the viewing client device 104 may present the selected media stream in addition to the second media stream, such as side-by-side or one overlying the other.

In some example embodiments, the viewing client device 104 may request a higher resolution of the selected media stream from the media presentation system 102. For example, if the media presentation system 102 sent a lower-resolution, or truncated portion, of the additional media stream that the viewing user selected, the viewing client device 104 may request the media presentation system 102 send a higher resolution of the selected media stream for the viewing client device 104 to present to the viewing user.

Further, in one or more embodiments, the viewing user may allow the viewing user to separately select video and audio from different media streams. For example, the viewing user may switch between various camera angles corresponding to the related media streams, but may remain on the same audio channel provided from the media stream with the clearest audio track. Further, in some cases, the viewing user may mix audio from different media streams together so that the viewing user can hear audio corresponding to multiple media streams. In another case, the viewing user may be content with watching the production media stream, but may desire to change between different audio streams, such as switching to a Spanish or French audio stream rather than an English audio stream.

As described above, FIG. 4C provides an alternate embodiment where a viewing user skims the media presentation for previous notable moments. In particular, the steps 440-452 in FIG. 4C can occur after step 418 of FIG. 4A, where the media presentation system 102 provides the second media stream to the viewing client device 104. In other words, the steps in an embodiment described with respect to FIG. 4C can occur after a viewing user is presented with a media presentation corresponding to an event. In particular, and as shown in step 440 of FIG. 4C, the media presentation system 102 identifies notable moments from the related media streams. As described below in additional detail, the media presentation system 102 can identify notable moments from the multiple related media streams corresponding to the event. Further, as described below, the media presentation system 102 can identify notable moments based on user profile attributes of the viewing user as well as based on social data from other viewing users.

In general, notable moments can include portions of a media steam that are of interest to a viewing user. Examples of notable moments include noteworthy parts, highlights, or significant portions of an event. For instance, a notable moment can be a sports play, an announcement of a contest winner (e.g., a reality show winner, an award winner, a lottery winner), a song performance by an artist, a speech by a politician, an image of a person or object, etc.

The media presentation system 102 can identify notable moments from each of the related media streams. In many cases, the related media streams provide the same content and/or subject matter, but at different angles. As such, the media presentation system 102 can identify that a notable moment is captured from multiple perspectives. In other cases, the media presentation system 102 may identify a notable moment in the related media streams that are only provided on a single media stream. For example, a capturing user may provide subject matter that no other capturing user at the same event provides, such as a celebrity cameo at the event, on a media stream that only captures the actions of a specific athlete.

As mentioned above, the media presentation system 102 can also identify notable moments specific to a particular viewing user based on user profile attributes of the viewing user. As described above, user profile attributes for a user (e.g., a viewing user) can include user profile information, such as biographic information, demographic information, behavioral information, social information, or other types of descriptive information. Further, the user profile attributes can include user actions, such as user-generated likes, comments, posts, shares, etc. For example, the media presentation system 102 can identify notable moments particular to a viewing user based on the viewing user comments about a particular topic or subject. Accordingly, by using user profile attributes of the viewing user, the media presentation system 102 can identify notable moments that are of specific interest to the viewing user.

To illustrate, the media presentation system 102 may determine that the event is a rock concert that includes performance from various artists. Further, the media presentation system 102 may identify that the viewing user likes a particular rock artist. As such, the media presentation system 102 may identify one or more notable moments when the viewing user's favorite artist performs at the rock concert.

The media presentation system 102 can also identify notable moments based on social data. For example, when a threshold number of viewing users replay a segment from a media stream, the media presentation system 102 may identify that segment as a notable moment (e.g., the media presentation system 102 creates a heat-map indicating the most-watched most-replayed portions of a media stream to identify notable moments). Further, the media presentation system 102 can identify common user profile attributes from viewing users replaying a segment (e.g., the majority of viewing users replaying this segment are Pink Floyd fans). In addition, the media presentation system 102 can use indications from social media shared by others (e.g., posts, shares, likes, comments, tweets, messages, etc.) to identify notable moments.

In some embodiments, the media presentation system 102 can prioritize the notable moments for a particular viewing user. For example, if the media presentation system 102 detects that a viewing user prefers a sports team for which the media presentation system 102 has identified a number of notable moments, the media presentation system 102 can rank the identified notable moments. The media presentation system 102 may then use the prioritization of the notable moments when providing one or more media segments to a viewing user (e.g., provide the highest prioritized notable moments to a viewing user first, irrespective of when the notable moments occurred).

Just as the media presentation system 102 can identify notable moments for one viewing user, the media presentation system 102 can identify notable moments for each viewing user of the media presentation system 102. For example, in one embodiment, the media presentation system 102 identifies all possible notable moments for every viewing user. Next, the media presentation system 102 matches each viewing user's profile attributes to the identified notable moments. Then, when a viewing user requests to view a notable moment, the media presentation system 102 can provide the viewing user with one or more of the notable moments that the media presentation system 102 has previously identified and matched for that viewing user.

Additionally, or alternatively, the media presentation system 102 can identify potential notable moments for an event as the notable moment occurs, or after the notable moment occurs, but not associate the notable moment with any viewing users. Later, when a viewing user requests to view a notable moment, the media presentation system 102 can identify one or more notable moments to provide to the viewing user based on the viewing user's profile attributes and/or social data. Additionally, as the viewing user watches various notable moments and manifests additional profile attributes (e.g., replaying sport plays by a particular athlete, skips over notable moments by a particular artist, likes a notable moment, etc.), the media presentation system 102 may identify additional notable moments and/or reprioritize notable moments identified for the viewing user. Further, the media presentation system 102 may update and/or remove one or more notable moments that the media presentation system 102 has previously identified for the viewing user based on feedback gathered from interactions of the viewing user. For example, if a viewing user skips a certain type of notable moment, the media presentation system 102 may remove or reduce the priority of similar notable moments identified for the viewing user.

Returning to FIG. 4C, in step 442, the media presentation system 102 creates media segments from the identified notable moments from the related media streams. More specifically, the media presentation system 102 generates a media segment for each identified notable moment. The media presentation system 102 can create a media segment by extracting and/or copying a segment from a media stream corresponding to the event. As mentioned above, in some instances, the media presentation system 102 creates multiple media segments from a single notable moment. For example, the media presentation system 102 identifies that a notable moment is captured by multiple related media streams. For instance, the media presentation system 102 can identify that three media streams, at different locations through a basketball area, capture the same buzzer-beater shot. As such, the media presentation system 102 generates multiple media segments for the three different media streams, each capturing the buzzer-beater shot from a different angle and/or perspective. In one or more embodiments, the media presentation system 102 can combine two or more media segments to create combination media segment that includes different perspectives of the same notable moment.

FIG. 4C shows step 444, where the viewing client device 104 receives a request to skim the media presentation. More specifically, the viewing user can interact with the viewing client device 104 to request to skim the media presentation system 102. Skimming the media presentation allows the viewing user to review and/or replay notable moments from the media presentation that the viewing user has missed or would like to replay, as discussed above. As such, by skimming previous content from the media presentation, the viewing user can quickly "catch-up" to the live action for the event. Further, skimming allows the viewing user to enjoy missed moments from the media presentation and/or re-experience highlights of particular interest to the user.

Upon receiving the request to skim the media presentation, the viewing client device 104 sends the request to skim to the media presentation system 102, as shown in step 446 of FIG. 4C. In some embodiments, the viewing client device 104 may also provide user profile information about the viewing user to assist the media presentation system 102 in identifying one or more media segments to provide to the viewing user, as described above. Further, as described above, the media presentation system 102 can use the profile information and interactions of the user to update notable moments that the media presentation system 102 has identified for the viewing user.

In response to receiving the request for the viewing user to skim the media presentation, the media presentation system 102 provides one or more media segments to the viewing client device 104, as step 448 illustrates in FIG. 4C. The media presentation system 102 can provide the media segments to the viewing client device 104 in a data streams. Alternatively, the media presentation system 102 can provide the media segment in the form of a discrete data file. In step 450, the viewing client device 104 presents the media segments to the viewing user. As one example, the viewing client device 104 begins playing the media segment upon receiving the corresponding media segments from the media presentation system 102. Further, the viewing client device 104 enables the viewing user to navigate through the media segments, as shown in 452. For instance, the viewing client device 104 provides the viewing user with options to pause, play, skip, replay, change the playback speed, etc., a media segment corresponding to a notable moment, as described above. In addition, the viewing client device 104 can provide navigational tools allowing the user to view a plurality of media segments (e.g., displayed in a grind layout) and select one of the media segments to play.

To illustrate steps 444-452 by way of example, a viewing user named Jane accesses a media presentation of the Beyoncé concert mid-way through the concert. Upon joining, the viewing client device 104 presents a production media stream to Jane of the Beyoncé concert, which cuts between related media streams of Beyoncé's performance. After joining, Jane may request to view missed moments from the Beyoncé concert, such as when Beyoncé performed one of Jane's favorite songs. As such, the viewing client device 104 may send the request to the media presentation system 102. In response, the media presentation system 102 sends the viewing client device 104 media segments corresponding to one or more notable moments that occurred during the concert, some or all of which may be of particular interest to Jane, such as Jane's favorite Beyoncé song. Further, Jane may navigate through the different media segments, for example, by skipping less interesting moments and catching back up to the live performance.

Figure 5:
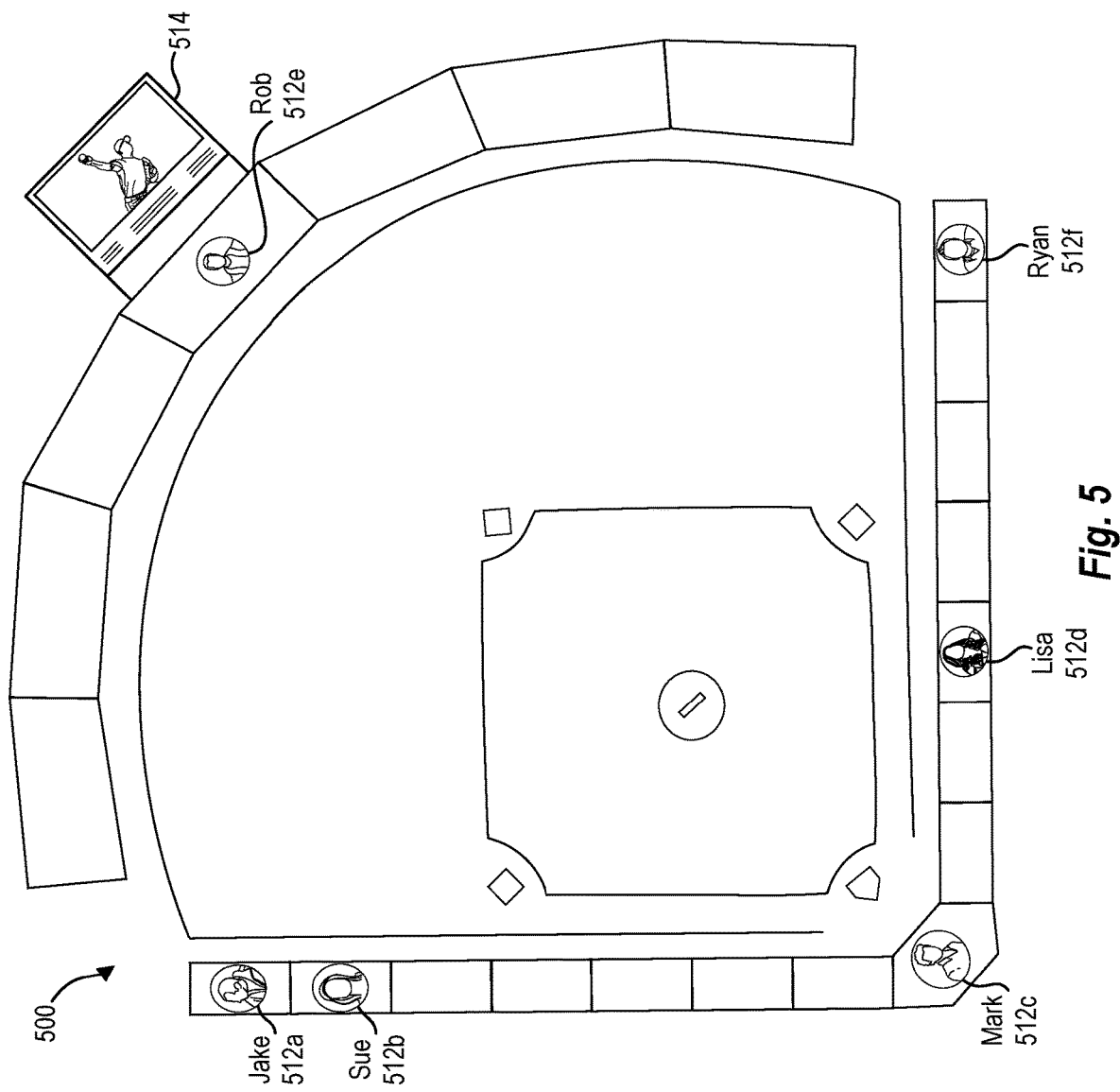
FIG. 5 illustrates an event venue where multiple users of the media presentation system may be capturing media streams of an event in accordance with one or more embodiments.
Figure 6:
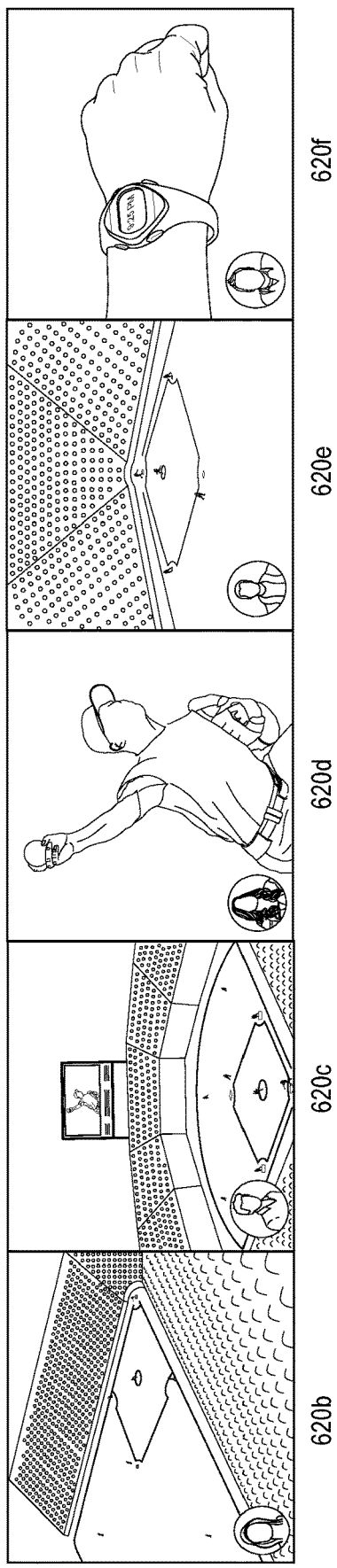
FIG. 6 illustrate exemplary media streams provided by capturing client devices associated with users at the event of FIG. 5 in accordance with one or more embodiments.
Figure 7:
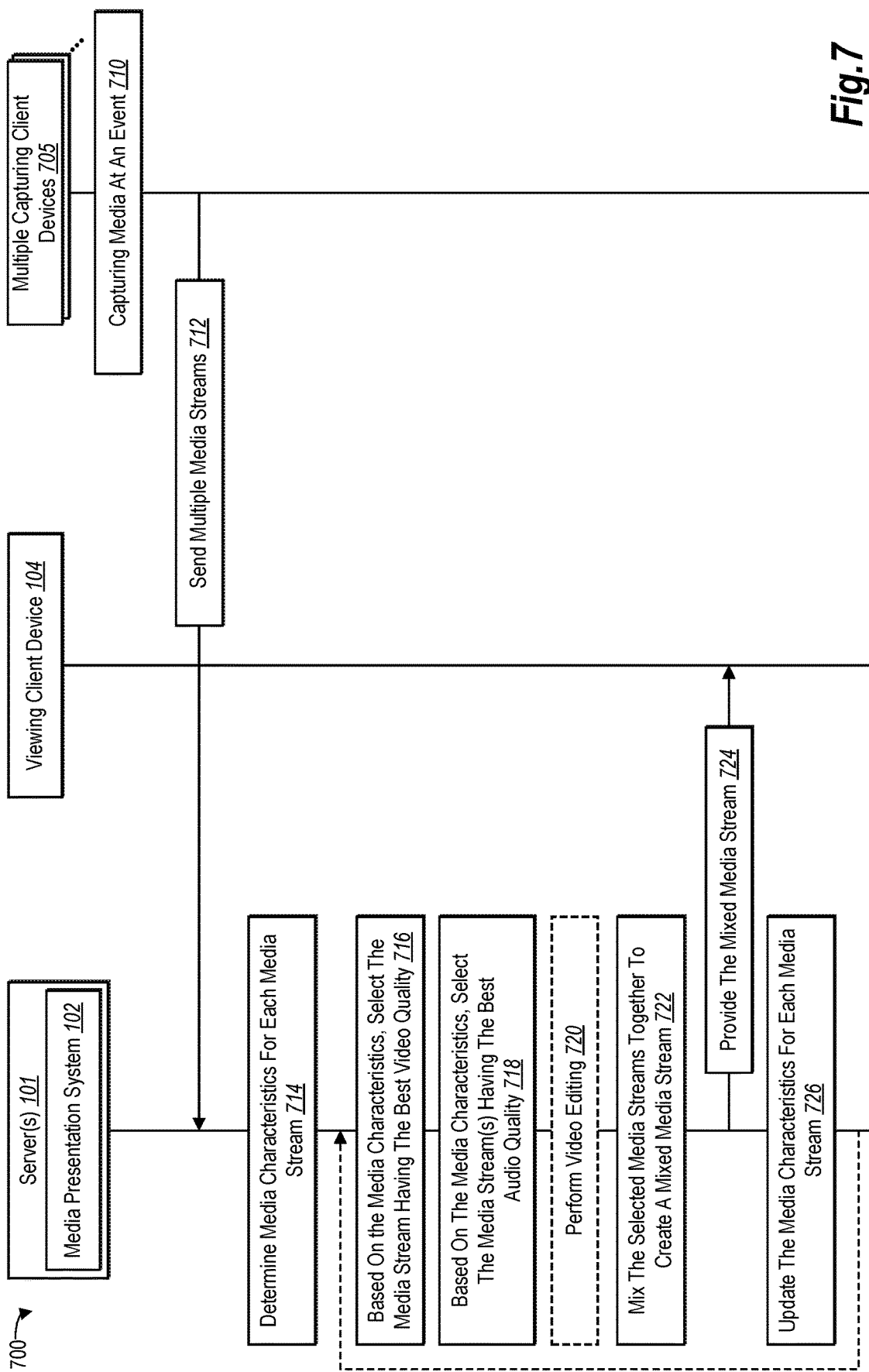
FIG. 7 illustrates a sequence-flow diagram showing a method for creating a production media stream in accordance with one or more embodiments.

FIGS. 5-7 provide illustrative examples of multiple users providing media streams from an event (e.g., a baseball game) to the media presentation system 102 described herein, and the media presentation system 102 providing one or more media streams to at least one viewing user. In particular, FIG. 5 illustrates a baseball stadium where multiple users of the media presentation system provide media streams of a baseball game. FIG. 6 illustrates exemplary media streams provided by capturing users at the baseball game of FIG. 5. Further, FIG. 7 illustrates a sequence-flow diagram showing a method for creating a mixed media stream (e.g., a production media stream) from the media streams provided by the capturing users at the baseball game.

As mentioned above, FIG. 5 shows a baseball stadium 500 that is hosting a baseball game. One or more capturing users of the media presentation system 102 may be attending the baseball game at the baseball stadium 500. As FIG. 5 illustrates, the capturing users are situated at different locations throughout the stadium. The capturing users include Jake 512a, Sue 512b, Mark 512c, Lisa 512d, Rob 512e, and Ryan 512f (collectively referred to as "capturing users 512"). Each of the capturing users 512 is associated with a client device (e.g., a capturing client device) that is capable of providing a media stream to the media presentation system 102.

In one or more embodiments, the client devices may include the capability to automatically report a location of the client device to the media presentation system 102. For example, some of the client devices may use GPS and/or WI-FI to identify their location. Alternatively, a capturing user may manually input his or her location. For instance, the capturing user may identify on a stadium map where he or she is seated in the baseball stadium. In another instance, the capturing user can provide the venue and seat location (e.g., section, row, seat). Regardless of how a client device determines its location, the client device may report its location, or location information, to the media presentation system 102. Based on the location of each user, the media presentation system 102 may populate a location map or schematic that shows each user's location relative to the baseball stadium 500 and to the other capturing users 512. For instance, as shown in FIG. 5, Jake 512a and Sue 512b are located next to left field, Mark 512c is behind home plate, Lisa 512d and Ryan 512f is along the first base line, and Robert 512d is located in the stands just beyond center field, and in front of the big screen 514.

During the baseball game, one or more of the capturing users 512 can each provide a media stream to the media presentation system 102, and the media presentation system 102 may provide the media streams to viewing users, as described herein. For example, at different times throughout the baseball game, Mark 512c uses his client device to provide a media stream from behind home plate, such as when a big hitter is at bat, when there is a play at home plate, when there is a conference on the pitcher's mound, etc. Other capturing users 512 may also provide media streams from their respective locations within the baseball stadium 500. Because the capturing users 512 are spread out within the baseball stadium 500, when more than one capturing user 512 captures media and provides a media stream at the same time, the media presentation system 102 can determine which media stream to provide to a viewing user watching a media presentation of the event. Further, as described above, the media presentation system 102 can provide a viewing user with different angles and perspectives of the baseball game by switching between the various media streams from the client devices of the various capturing users 512.

In addition to the capturing users 512 capturing and providing media streams to the media presentation system 102, the media presentation system 102 may also obtain media streams from a third-party, such as a broadcaster, a news crew, a television network, a radio announcer, a professional photographer, or another entity capturing the baseball game. As one example, the media presentation system 102 may mix the audio provided by a sport's broadcaster with video media streams provided by the capturing users 512. As such, the media presentation system 102 can provide a viewing user video streams provided by the capturing users 512 at the baseball game paired with synced audio from the sports announcer.

In a similar manner, one or more third-parties can communicate with the media presentation system 102 to access one or more of the media streams captured at the baseball game. For example, a sports network may broadcast clips from one or more media streams provided by one of the capturing users 512 at the baseball game. As another example, FIG. 5 shows a large video screen or "big screen" 514 that shows live action and replays of a game at the baseball stadium. The media presentation system 102 may provide a media stream to the stadium production crew, and the stadium production crew displays one of the media stream on the big screen 514 (e.g., the big screen 514 shows a media stream provided by Lisa 512d).

In some example embodiments, multiple capturing users 512 may be capturing media streams from the same location, camera angle, or same perspective. In these embodiments, the media presentation system 102 may provide a notification to one of the capturing users 512 that the user is providing a redundant media stream. Further, the media presentation system 102 may determine which media stream is redundant based on comparing the media characteristics of the media streams. For example, as shown in FIG. 5, Jake 512*a* and Sue 512*b* are located near each other. The media presentation system 102 may determine that the media stream from Sue 512*b* is overall better, and from a similar perspective than the media stream provided from Jake 512*a*. As such, the media presentation system 102 may notify Jake 512*b* that his media stream is not needed at the time. Further, the media presentation system 102 could recommend that Jake 512*a* move to another location, or notify Jake 512*a* when Sue 512*b* is no longer providing a media stream of the baseball game.

In addition to the capturing users 512 at the baseball game providing media streams of the game, a viewing user at the baseball game may view one or more media streams via the media presentation system 102. For example, a viewing user at the baseball game may use the media presentation system 102 to view a different angle of the game. As another example, after a notable moment occurs at the game, a viewing user may access media streams captured at the game to view replays of the notable moment using the systems and methods described above.

In some cases, the media presentation system 102 may limit distribution of the live media streams captured at the baseball game to only users at the game, such as granting access based on the viewing user being within a defined geo-fenced area (i.e., a virtual perimeter for a real-world geographic area) and/or with a time window. For example, the media streams that Mark 512*c*, Lisa 512*d*, and Rob 512*e* provide are only be viewable to other users at the game, such as Jake 512*a* and Sue 512*b*. Alternatively, or additionally, the media presentation system 102 may provide the media streams to other viewing users of the media presentation system 102 not present at the baseball game. In some cases, the media presentation system 102 may allow others access to the media segment only after the game finishes, or after a threshold period time has passed since a live streaming media segment was provided (e.g., after a two-hour delay).

In one or more embodiments, depending on a user's client device capabilities, a capturing user may be able to view media streams while, at the same time, providing a media stream. For example, a client device can provide a split screen that allows a user to view multiple media segments at the same time as capturing footage of the baseball game. As another example, the client device may provide a smaller image (e.g., picture-in-picture) of the media stream over the image of a media stream provided by another user 512 at the baseball game.

To further illustrate, FIG. 6 shows a various media streams 620*b-f* of the baseball game provided by the capturing users 512*b-f* shown in FIG. 5. In general, FIG. 6 illustrates different angles and perspectives provided by the capturing users 512*b-f* at the baseball game. In particular, Sue 512*b* provides the second media stream 620*b*, which shows the baseball game from the stands above left field. Mark 512*c* provides the third media stream 620*c*, which shows a view of the game from behind home plate. Lisa 512*d* provides the fourth media stream 620*d*, which shows a view of the pitcher on the mound. Rob 512*e* provides the fifth media stream 620*e*, which shows a view of the game from the outfield. Lastly, Ryan 512*f* provides the sixth media stream 620*f*, which shows an image of his wristwatch. Of note, the first media stream from Jake 512*a* is not shown because Jake's media stream is redundant in view of the second media stream 620*b* that Sue provides and/or Jake is not currently providing a media stream to the media presentation system 102.

In some example embodiments, and as shown in FIG. 6, a name and/or image of the capturing user providing a media stream is shown in the bottom left corner of the media stream. As such, when a viewing user is viewing a media stream, the name and/or image of the capturing user is displayed to the viewing user within the media stream. For example, Mark's picture is shown in the bottom left corner of the third media stream 520*c* in FIG. 6. Further, when the media stream of the capturing user is displayed on the big screen 514, the big screen 514 can display the name and/or image of the capturing user so that fans at the stadium can see who is providing the media stream. In some embodiments, the media stream may display a brand (e.g., a logo) indicating that the media stream is sponsored by a specific entity or company.

In some instances, the media presentation system 102 can hide or initially conceal the capturing user's picture and/or information from a viewing user. Upon the viewing user requesting to access the information, the media presentation system 102 can provide the information corresponding to the capturing user a menu or another display interface. For example, the media presentation system 102 may present a credits display the indicates which capturing users are providing media streams.

As briefly mentioned above, FIG. 7 illustrates a sequence-flow diagram showing a method 700 for creating a mixed media stream (e.g., a production media stream). For purposes of explanation, reference will be made to the media streams 620*b-f* illustrated in FIG. 6 provided by the capturing users 512*b-f* illustrated in FIG. 5. Accordingly, the media presentation system 102 can create a mixed media stream (e.g., a production media stream) using the media streams provided by the capturing users 512*b-f* at the baseball game corresponding to FIGS. 5-6.

As shown in FIG. 7, one or more servers 101 having a media presentation system 102 communicate with a viewing client device 104 and multiple capturing client devices 705. The viewing client device 104 and the one or more contact client devices 705 may be example embodiments of the client device(s) 204 described with regard to FIG. 2. Further, the media presentation system 102 may correspond to the media presentation system described herein.

As shown in step 710, the multiple client devices 705 capture media at an event. In particular, the capturing users 512*b-f* (e.g., Sue 512*b*, Mark 512*c*, Lisa 512*d*, Rob 512*e*, and Ryan 512*f*) use the multiple capturing client devices 705 to capture footage of the baseball game. Upon capturing content from the baseball game, and as shown in step 712 of FIG. 7, the capturing users 512*b-f* each send a media stream to the media presentation system 102 (e.g., media streams 620*b-f*).

Upon receiving the multiple media streams 620*b-f*, the media presentation system 102 determines the media characteristics for each media stream, shown as step 714. As mentioned above, the media presentation system 102 can analyze a media stream to identify one or more media characteristics associated with and/or manifested in the media stream. By way of example, the media presentation system 102 may analyze the second media stream 620*b* provided by Sue 620*b* to identify media characteristics. As shown, the second media stream 620*b* shows the baseball field from Sue's perspective from the stands near left field and along the third-base line. Based on the second media stream 620*b*, the media presentation system 102 can identify media characteristics, such as the signal strength of Sue's capturing client device, the resolution and/or frame rate of the second media stream 620*b*, the shakiness of the second media stream 620*b*, Sue's position with respect to the stadium (e.g., Sue's location in the stadium), and which direction Sue's capturing client device is facing (e.g., using the gyroscope to detect and/or confirm that Sue's client device is facing the field).

In addition, the media presentation system 102 can identify additional media characteristics from the second media stream 620b itself, such as the angle and perspective of the second media stream 620b (e.g., the zoom level such as panoramic, wide angle, close-up, extreme close-up, etc.), the proximity between Sue and the action on the field (e.g., whether the action is happening close to Sue). Further, the media presentation system 102 can identify media characteristics corresponding audio features, such as whether the second media stream 620b includes recognizable audio, the amount or noise and interference, which frequencies are more prominent, and volume levels.

In some cases, the media presentation system 102 can use image recognition to identify additional media characteristics. For example, the media presentation system 102 determines that the fourth media stream 620d shows a particular baseball pitcher based on recognizing the face of the pitcher and/or the pitcher's name or number on his jersey. Similarly, the media presentation system 102 may use audio recognition to detect media characteristics. For example, the media presentation system 102 uses audio recognition to identify when a specific player is at bat based. For instance, the media presentation system 102 detects when the announcer at the stadium says "Next up, Bryce Harper."

In some embodiments, the media presentation system 102 may identify media characteristics for a media stream using metadata from a third-party source. For example, the media presentation system 102 may receive game statistics and data from an analyst at the game. For instance, the game statistics may inform the media presentation system 102 when each player is at bat, when a player makes a notable play, when the score changes, etc. Using this information, the media presentation system 102 can generate one or more contextual media characteristics to each of the media streams 620b-f. In other words, each time a player comes up to bat or makes a play, the media presentation system 102 can associate a media characteristic with one or more of the multiple media streams 620b-f indicating the player's activity and the time interval within which the activity occurred. The media presentation system 102 can then use the contextual information and/or media characteristics when identifying notable moments.

As described below in additional detail, the media presentation system 102 creates a mixed media stream from the multiple media streams 620b-f. In particular, once the media presentation system 102 determines media characteristics for each media stream, the media presentation system 102 can select between one or more of the media streams to use for the mixed media stream. Further, the media presentation system 102 can use various production templates or video formats to decide when to cut or switch from one media stream to another media stream in addition to factoring in the media characteristics of each media streams.

To illustrate, in step 716, the media presentation system 102 selects the media stream from the media streams 620b-f having the best video quality based on the media characteristics (e.g., the media presentation system 102 selects the video stream from the media stream with the video quality). For example, the media presentation system 102 determines which media stream provides the best balance of steadiness, camera angle, zoom level, facial recognition, image recognition, location of the capturing client device, coverage of the action, etc. For instance, the media presentation system 102 determines that the fourth media stream 620d from Lisa 512d provides the best video quality. In addition, the media presentation system 102 determines that the sixth media stream 620f does not provide the best video quality because, even though the sixth media stream 620f from Ryan 512f is being sent from the baseball game, the sixth media stream 620f shows a wristwatch and is not related to the baseball game.

In step 718, the media presentation system 102 selects the best media stream(s) from the multiple media streams 620b-f having the best audio quality based on the determined media characteristics (e.g., the media presentation system 102 selects the audio stream from the media stream with the audio quality). For example, the media presentation system 102 selects the media stream that has the clearest audio and least interference. In one embodiment, as described above, the media presentation system 102 uses an audio feed provided from a third-party, such as directly from a sports broadcasting system. Thus, if the media presentation system 102 selects video from one media stream and audio from another media stream, the media presentation system 102 may mix together the video stream and audio stream from the different selected media streams. In some example embodiments, the media presentation system 102 mixes audio from multiple media streams together. For example, if the media presentation system 102 is providing a mixed media stream for a concert, the media presentation system 102 may primarily use audio provided from a capturing user near the front, perhaps using an auxiliary microphone and/or a stereo recording device. The media presentation system 102 can also add in portions of audio from the various other capturing client devices at the event.

In step 720, the media presentation system 102 may optionally perform video editing. As described above, the media presentation system 102 may perform video editing such as image cropping, image stabilization, reducing red-eye, resizing, rotating, trimming, retouching, etc. Further, the media presentation system 102 can apply audio filters to the audio track of a media stream. As such, the media presentation system 102 can improve the overall quality of each selected media stream before creating a mixed media stream and providing the mixed media stream to a viewing user. For example, in some example embodiments, the media presentation system 102 can add various editing effects such as text, stickers, sound/music, voice filters, and visual filters. To illustrate, the media presentation system 102 can dynamically add smart text to a media stream. Generally, smart text includes contextually relevant text, such as text associated with an object detected in the media stream. Further, smart text can include stickers or other non-text graphics, such as ideograms, smileys, pictographs, frames or boarders around a media stream, or other graphics that visually interact with media within a media stream.

In some example embodiments, smart text can be fixed to an identified feature within the media stream. As such, the smart text can move within the media stream in connection with the identified feature. To illustrate, if a name of a football player is displayed next to the football player, as the football player moves across the football field, the media presentation system 102 can move the label in connection with the football player within the image. Similarly, if the media presentation system 102 switches between media stream showing the football field from different angles, the media presentation system 102 can dynamically reposition the smart text to realign with the football player.

Further, in connection with added smart text to a media stream based on detecting content within a media stream, the media presentation system 102 can add smart text to match the shape or trajectory of identified content. For example, if the media presentation system 102 detects a curved object in the media stream, the media presentation system 102 can display the smart text along the curved edge of the curved object. Similarly, the media presentation system 102 can have the shape of the smart text change as the shape or the outline of a detected object changes. For instance, as a media stream zooms in on a subject, a text label associated with the subject can also increase in size.

In example embodiments, the media presentation system 102 may suggest which smart text to add based on the content within the media stream (e.g., detected through image recognition) and/or based on meta-data associated with the media stream (e.g., location, time, tags, etc.). For example, the media presentation system 102 may detect that the media stream is related to a particular theme (e.g., ocean, mountains, party), and as such, recommend smart text associated with the identified theme. Further, in some embodiments, the media presentation system 102 may automatically add contextually relevant smart text, such as the name of singer on stage or an athlete that made a significant play shown in a replay.

Irrespective of whether the media presentation system 102 performs video edits, the media presentation system 102 mixes the selected media streams together to create a mixed media stream, as shown in step 722. In particular, the media presentation system 102 combines the selected media stream having the best video quality with the selected media stream(s) having the best audio quality to create a mixed media stream. The media presentation system 102 can include the mixed media stream in a media presentation corresponding to the event.

In general, when mixing, combining, and cutting between the multiple media streams 620*b-f* together, the media presentation system 102 can synchronize the various media streams together so that switching from one media stream to another media stream appears seamless to a viewing user. In one or more embodiments, the media presentation system 102 can use audio cues to synchronize two or more media streams. For example, the media presentation system 102 can detect the same frequency changes and align the media streams together. In additional, or alternative embodiments, the media presentation system 102 can use the timestamps associated with each media stream to align the media streams together. In some embodiments, the media presentation system 102 may use video cues, such as patterns of light flashes, to synchronize the various media streams.

In step 724, shown in FIG. 7, the media presentation system 102 provides the mixed media stream to the viewing client device 104 associated with a viewing user. For example, the media presentation system 102 may provide the mixed media stream in response to a viewing user selecting an option on the viewing client device to access a media presentation associated with the event. Upon receiving the mixed media stream, the viewing user can watch and/or listen to the mixed media stream using the viewing client device 104. After initially sending the mixed media stream to the viewing client device 104, the media presentation system 102 updates media characteristics of each of the media streams, as shown in step 726. As described above, the media presentation system 102 can continuously reevaluate the media characteristics of each media stream to account for changes to each media stream. As a result, the media presentation system 102 again determines media characteristics such as the video quality, audio quality, signal strength, camera angle, past user performance, previous number of view/likes, etc. In sum, the media presentation system 102 can repeat steps 716-726 of the sequence-flow method 700.

In addition to the foregoing, embodiments of the present invention also can be described in terms of flowcharts comprising acts and steps in a method for accomplishing a particular result. For example, FIGS. 8-10, described below, illustrate flowcharts of exemplary methods in accordance with one or more embodiments of the present invention. The methods described in relation to FIGS. 8-10 can be performed with less or more steps/acts or the steps/acts can be performed in differing orders. Additionally, the steps/acts described herein can be repeated or performed in parallel with one another or in parallel with different instances of the same or similar steps/acts.

Figure 8:
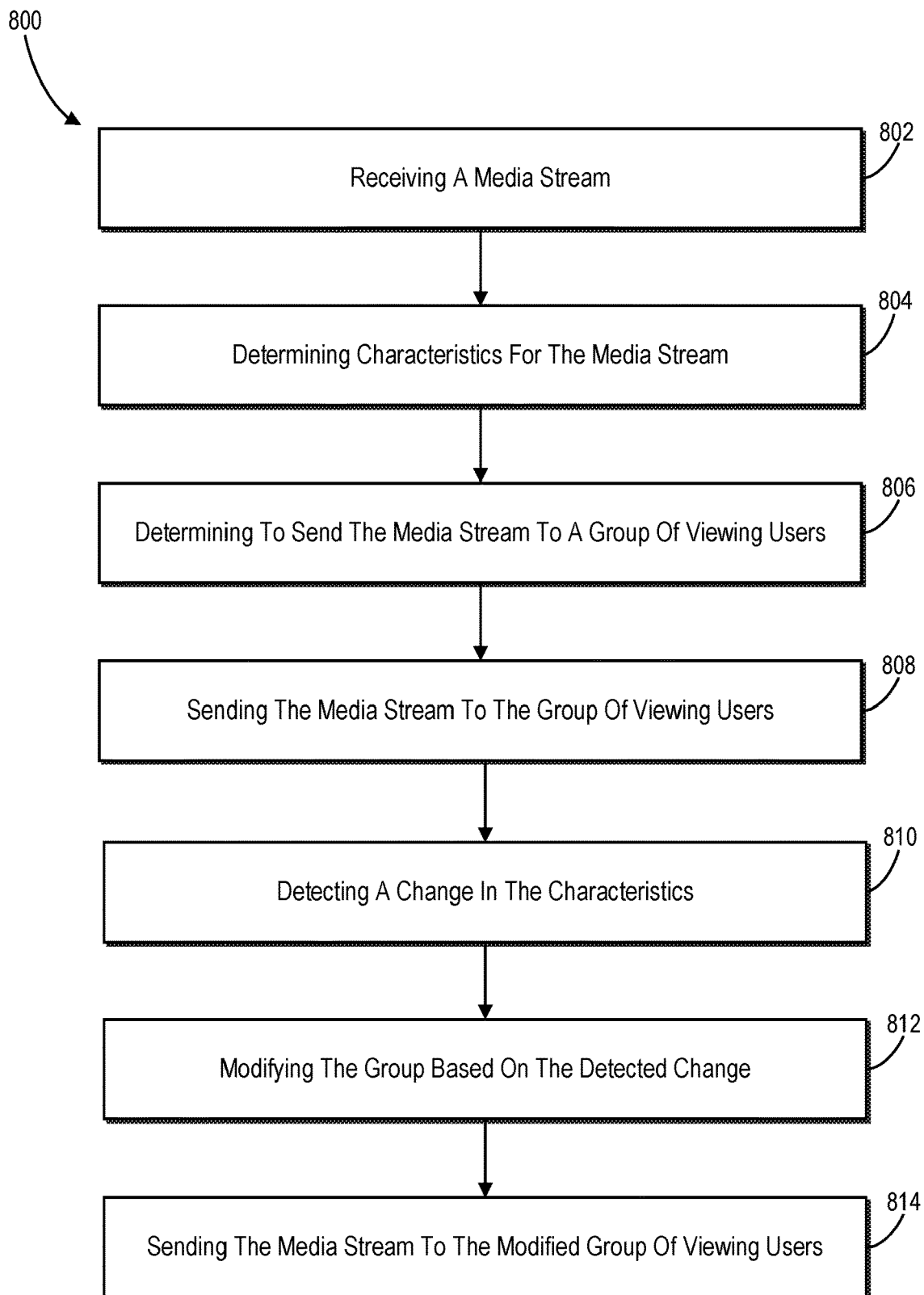
FIG. 8 illustrates a flowchart of a method for dynamically providing a media stream to one or more users in accordance with one or more embodiments.

FIG. 8 illustrates a flowchart of a method 800 of dynamically providing a media stream to one or more users in accordance with one or more embodiments described herein. In some example embodiments, the method 800 may be performed by a media presentation system, such as the media presentation system 102 disclosed above in the previous figures. The method 800 includes an act 802 of receiving a media stream. In particular, the act 802 may involve receiving, from a client device 104 associated with a capturing user 112 of a communication system 102, a media stream. The media stream may include audio (e.g., an audio stream), video (e.g., a video stream), or a combination of audio and video. In addition, the act 802 may involve receiving one or more media streams corresponding to one or more capturing users at an event. Similarly, the method 800 may include an act of identifying an event corresponding to the media stream.

The method 800 also includes an act 804 of determining characteristics for the media stream. In particular, the act 804 may involve determining one or more media characteristics for the media stream. For instance, the act 804 may involve analyzing the media stream to identify media characteristics, such as video characteristics, audio characteristics, signal strength characteristic, and/or metadata characteristics. In some cases, the method 800 may include the act of weighting the one or more media characteristics before determining to send the media stream to the group of viewing users.

The method 800 includes an act 806 of determining to send the media stream to a group of viewing users. In particular, the act 806 may involve determining, based on the one or more media characteristics, to send the media stream to a group of viewing users. For example, the act 806 may involve determining if the media stream meets minimum quality standards before sharing the media stream with others. For instance, the act 806 may further involve determining that the media characteristics of the media stream corresponding to video quality and/or audio quality are above threshold levels.

In addition, the method 800 includes an act 808 of sending the media stream to the group of viewing users. In particular, the act 808 may involve sending the media stream to the group of viewing users when the media stream characteristics merit sharing the media stream with others. Upon sending the media stream to the group of users may lead to receiving feedback from one or more capturing users from the group of viewing users. For example, a viewing user in the group of viewing users may comment, like, appreciate, or share the media stream.

The method 800 further includes an act 810 of detecting a change in the characteristics. In particular, the act 810 may involve detecting a change in the one or more media characteristics. In some instances, the act 810 of detecting a change in the one or more media characteristics may involve detecting the number of viewing users in the group of viewing users that access and/or interact with the media stream. Also, the act 810 may involve detecting a change in video quality, audio quality, or other media characteristics of the media stream. Further, the method 800 may include an act of determining, based on the detected change in the one or more media characteristics, that the number of viewing users accessing the media stream has reached a threshold number.

The method 800 further includes an act 812 of modifying the group based on the detected change. In particular, the act 812 may involve modifying the group of viewing users based on the detected change to the one or more media characteristics. In some example embodiments, the act 812 may involve adding, replacing, or removing viewing users to the group of viewing users.

The method 800 further includes an act 814 of sending the media stream to the modified group of viewing users. In addition, the method 800 may include an act of providing, in a media presentation feed on a client device associated with a viewing user, a plurality of media presentations, where each of the plurality of media presentations corresponds to a media stream, determining one or more media characteristics for each of the corresponding media streams presentations, and prioritizing the plurality of media presentations in the media presentation feed based on the one or more media characteristics determined for each of the corresponding media streams.

In some example embodiments, the method 800 may include an act of receiving a request from a viewing user of the group of viewing users to share the media stream with one or more additional viewing users. In addition, in response to the request, the method 800 may include an act of generating a message that includes a link to the media stream and sending the message with the link to the one or more additional viewing users. In one or more embodiments, the method 800 may include an act of receiving an additional media stream from an additional client device associated with an additional capturing user of the communication system, determining to send the additional media stream to the group of users, and sending the additional media stream to the group of viewing users as part of a media presentation that includes the media stream and the additional media stream. The method 800 may also include an act of providing the media presentation in a media presentation feed on a client device associated with a viewing user, where the media presentation includes the media stream and the additional media stream.

In additional embodiments, the method 800 may include an act of applying production edits to the media stream before sending the media stream to the group of viewing users. In some cases, applying the production edits includes applying a square cropping to the media stream. Further, in some cases, applying the production edits includes stabilizing the media stream based on gyroscopic information received from the client device.

Figure 9:
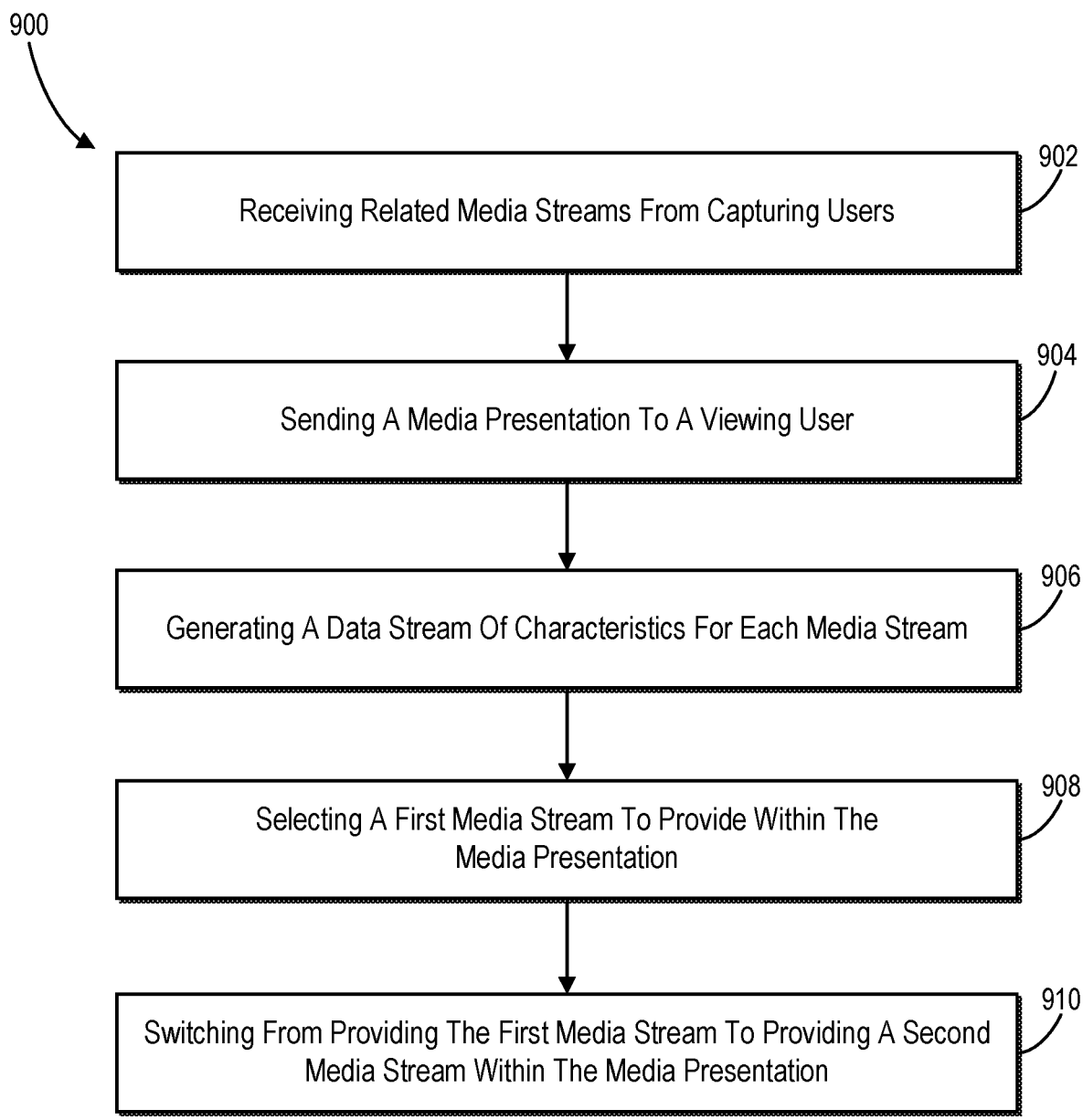
FIG. 9 illustrates a flowchart of a method for producing a media stream from a plurality of related media streams in accordance with one or more embodiments.

FIG. 9 illustrates a flowchart of a method 900 for producing a media stream from a plurality of related media streams in accordance with one or more embodiments described herein. In some example embodiments, the method 900 may be performed by a media presentation system, such as the media presentation system 102 discussed above with respect to the previous figures.

The method 900 includes an act 902 of receiving related media streams from capturing users. In particular, the act 902 may involve receiving a plurality of related media streams from a plurality of client devices associated with a corresponding plurality of capturing users. For example, the act 902 may involve receiving various media streams from multiple capturing users at a common event, such as a concert, sports game, speech, performance, etc.

The method 900 also includes an act 904 of sending a media presentation to a viewing user. In particular, the act 904 may involve sending a media presentation to a client device 104 associated with a viewing user 110 including content from the plurality of media streams. For example, the act 904 may involve mixing one or more media streams from the related media stream to generate a media presentation, and sending the media presentation to the viewing user. In some example embodiments, the media presentation may be a representation of one or more media streams captured at a common location. For instance, in some embodiments, the act 904 may involve determining that the media streams are being provided by capturing users at a common location, where the common location is an event having a virtually defined geographic boundary.

The method 900 further includes an act 906 of generating a data stream of characteristics for each media stream. In particular, the act 906 may involve generating a data stream of time-based media characteristics for each of the media streams. The act 906 may involve determining media characteristics for each media stream. Using the determined media characteristics, the act 906 can involve sending the determined media characteristics in the data stream. Further, as the media characteristics update, the act 906 can involve sending the updated media characteristics in the data stream.

The method 900 additionally includes an act 908 of selecting a first media stream to provide within the media presentation. In particular, the act 908 may involve selecting, based on the time-based media characteristics within the data stream, a first media stream from the plurality of media streams to provide within the media presentation. For example, the act 908 may involve selecting the first media stream based on the first media stream having the best, or at least above average, media characteristics over the other media streams.

The method 900 includes an act 910 of switching from providing the first media stream to providing a second media stream within the media presentation. In particular, the act 910 may involve switching, based on updated time-based media characteristics within the data stream, from providing the first media stream with the media presentation to providing a second media stream from the plurality of media streams within the media presentation. For example, the act 910 may involve detecting, based on the updated time-based media characteristics within the data stream, that the second media stream currently has better media characteristics than the first media stream.

The method 900 may also include an act of identifying that the first media stream and the second media stream both capture the common subject matter, and detecting that the first media stream and the second media stream provide different perspectives of the common subject matter, where selecting the first media stream includes selecting the first media stream based, in part, on the perspective provided by the first media stream.

In some example embodiments, the method 900 may include an act of identifying a third media stream from the plurality of media streams, selecting, based on the time-based media characteristics within the data stream, audio from the third media stream, and mixing the audio from the third media stream into the first media stream before providing the first media stream within the media presentation. Further, the method 900 may include an act of mixing the audio from the third media stream into the second media stream when providing the second media stream within the media presentation. In other embodiments, the method 900 may include an act of detecting a face of an influencer within the first media stream, and updating a media characteristic associated with the first media stream based on detecting the face of the influencer within the first media stream.

In some embodiments, the method 900 may include an act of detecting a period of audio silence in the second media stream being provided within the media presentation, identifying a previous segment from the first media stream, and switching from providing the second media stream to providing the identified previous segment from the first media stream within the media presentation, where identifying the previous segment from the first media stream includes identifying a previous segment from the first media stream based on feedback received from the viewing user.

Further, in one or more embodiments, the method 900 may include an act of providing the related media streams to a client device associated with a producing user, passing control of selecting which media stream of the live related media streams to provide within the media presentation to the client device associated with the producing user, and receiving, from the client device associated with the producing user, a selection of a media stream of the related media streams to include in the media presentation. In addition, the method 900 may include an act of receiving, from the client device associated with the producing user, an indication of which capturing users can provide media streams, where, in some cases, the producing user is an influencer. The method 900 may also include an act of recommending, based on the time-based media characteristics within the data stream, a media stream for the producing user to select to provide within the media presentation.

In some embodiments, the method 900 may also include an act of detecting an object within the second media stream, identifying text corresponding to the identified object, adding the text to the second media stream adjacent to the object, and tracking the identified object within the second liver media stream with the added text.

Figure 10:
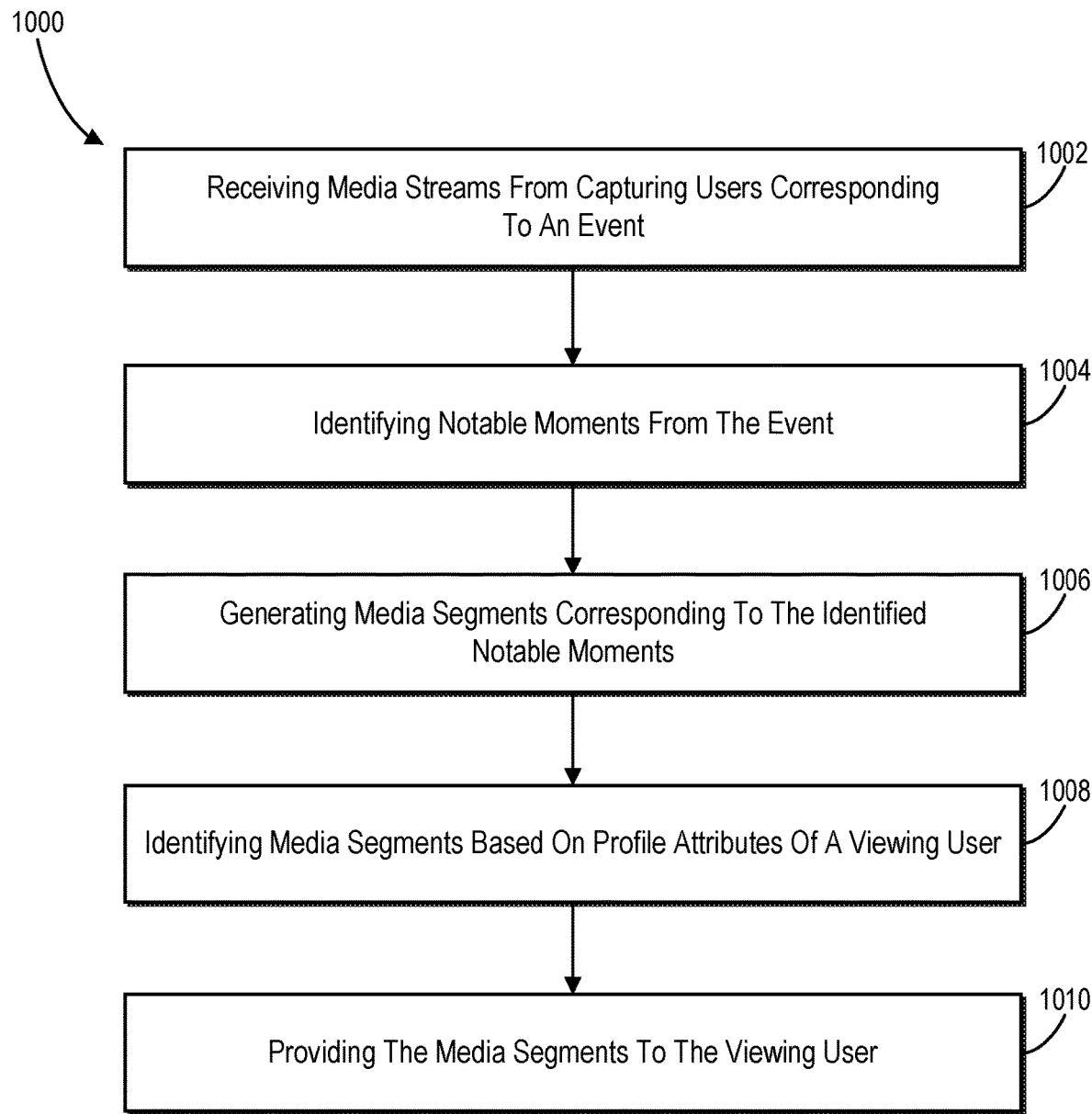
FIG. 10 illustrates a flowchart of a method for identifying and providing notable moments of a media stream in accordance with one or more embodiments.

FIG. 10 illustrates a flowchart of a method 1000 for identifying and providing notable moments of a media stream in accordance with one or more embodiments described herein. In some example embodiments, the method 1000 may be performed by a media presentation system, such as the media presentation system 102 disclosed above in the previous figures.

The method 1000 includes an act 1002 of receiving media streams from capturing users corresponding to an event. In particular, the act 1002 may involve receiving a plurality of media streams from a plurality of capturing users, where the plurality of media streams corresponds to an event. For example, the act 1002 may involve receiving various media stream from multiple capturing users at a common event, such as a concert, sports game, speech, performance, etc. The act 1002 may also involve providing a media presentation associated with the event to the client device associated with the viewing user, the media presentation comprising a media stream, where providing the one or more media segments includes providing the one or more media segments within the media presentation. In some cases, the one or more media segments are provided to the client device associated with the viewing user within the media stream. In other embodiments, the one or more media segments are provided to the client device associated with the viewing user within the media stream.

The method 1000 also includes an act 1004 of identifying notable moments from the event. In particular, the act 1004 may involve identifying a plurality of notable moments from the event captured by at least one media stream of the plurality of media streams. For example, the act 1004 may involve identifying the one or more media segments from the plurality of media segments based on social data corresponding to the event, where, in some cases, the social data corresponding to the event includes views of each notable moment.

In one or more embodiments, the method 1000 may also include the act of identifying a notable moment from the event captured by the plurality of media streams, generating multiple media segments corresponding to the identified notable moment, each media segment being generated from a different media stream of the plurality of media streams, and providing, to the client device associated with the viewing user, one or more of the multiple notable moments corresponding to the identified notable moment.

In addition, the method 1000 includes an act 1006 of generating media segments corresponding to the identified notable moments. In particular, the act 1006 may involve generating a plurality of media segments corresponding to the identified plurality of notable moments. For instance, the act 1006 may involve generating and storing media segments that correspond to the identified notable moments that occurred at the event.

The method 1000 includes an act 1008 of identifying media segments based on profile attributes of a viewing user. In particular, the act 1008 may involve identifying one or more media segments from the plurality of media segments based on one or more profile attributes of a viewing user. In some cases, the profile attributes of the viewing user can include interests of the viewing user, comments by the viewing user, or shares by the viewing user.

The method 1000 includes an act 1010 of providing, to the viewing user, the media segments. In particular, the act 1010 may involve providing, to a client device associated with the viewing user, the one or more media segments. For example, the act 1010 may involve receiving, from the client device associated with the viewing user, a request to provide the one or more media segments to the client device associated with the viewing user.

In some example embodiments, the method 1000 may include an act of generating a media stream from the plurality of media streams from the plurality of capturing users, providing, to the client device associated with the viewing user, the media stream generated from the plurality of media streams, detecting a lag in content from the plurality of media streams, providing the selected one or more media segments within the media stream, detecting completing of the lag in content from the plurality of media streams, and providing the content from the plurality of media streams within the media stream.

The method 1000 may also include an act of receiving, from the client device associated with the viewing user, user input to navigate to a next notable moment, and in response to the request to navigate to the next notable moment, providing the a next identified notable moment to the client device associated with the viewing user. Further, the method 1000 may include an act of detecting that the viewing user replays one of the one or more multiple notable moments provided to the client device associated with the viewing user, and providing, to the client device associated with the viewing user, another notable moment of the multiple notable moments corresponding to the identified notable moment.

In one or more embodiments, the method 1000 may include an act of detecting a change in profile attributes of the viewing user, identifying one or more additional media segments from the plurality of media segments based on the change in profile attributes of the viewing user, and providing, to the client device associated with the viewing user, the one or more additional media segments.

Embodiments of the present disclosure may include or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
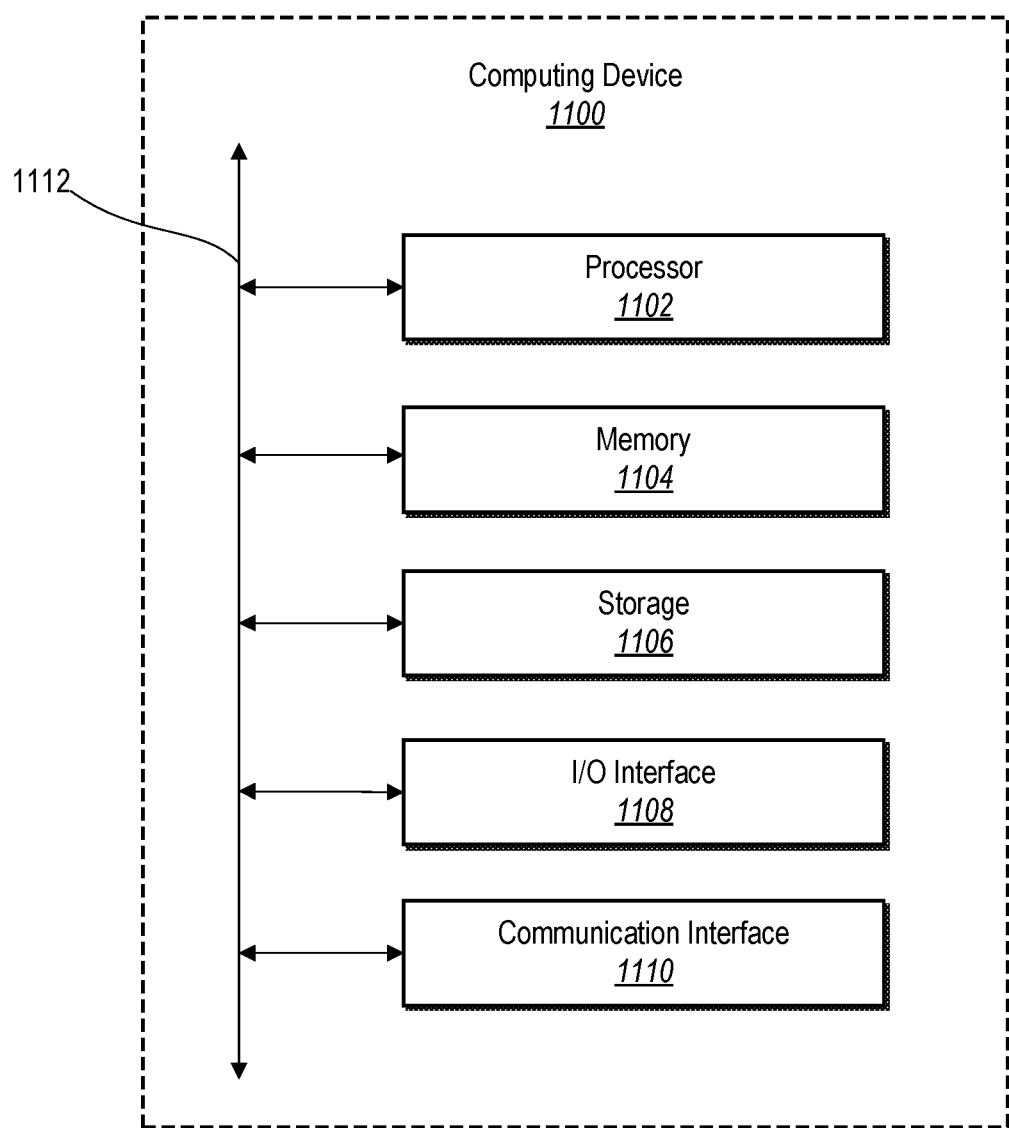
FIG. 11 illustrates a block diagram of a client device in accordance with one or more embodiments.

FIG. 11 illustrates a block diagram of exemplary computing device 1100 that may be configured to perform one or more of the processes described above. One will appreciate that one or more computing devices such as the computing device 1100 may implement the media presentation system 102 and/or computing devices 104, 105, 204, 104, 305, 15, 405, and 705. As shown by FIG. 11, the computing device 1100 can include a processor 1102, a memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can include a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (MC) or network adapter for communicating with an Ethernet or other wire-based network or a wireless MC (WNIC) or wireless adapter for communicating with a wireless network, such as a WI-FI.

Additionally, or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that connects components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA)

bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the communication system 100 can include a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 12:
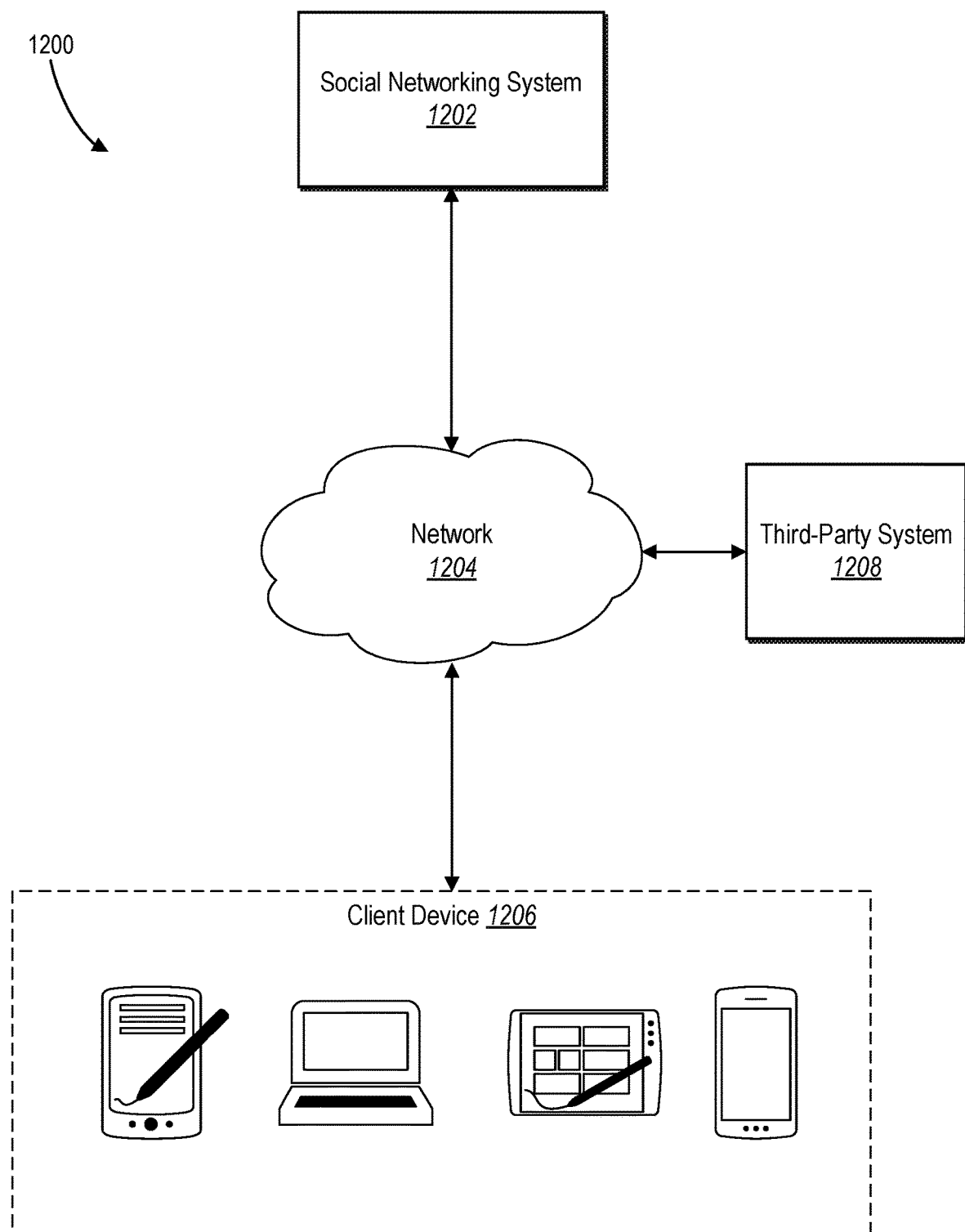
FIG. 12 illustrates a network environment of a social networking system in accordance with one or more embodiments described herein.

FIG. 12 illustrates an example network environment 1200 of a social networking system. Network environment 1200 includes a client system 1206, a social networking system 1202, and a third-party system 1208 connected to each other by a network 1204. Although FIG. 12 illustrates a particular arrangement of client system 1206, social networking system 1202, third-party system 1208, and network 1204, this disclosure contemplates any suitable arrangement of client system 1206, social networking system 1202, third-party system 1208, and network 1204. As an example and not by way of limitation, two or more of client system 1206, social networking system 1202, and third-party system 1208 may be connected to each other directly, bypassing network 1204. As another example, two or more of client system 1206, social networking system 1202, and third-party system 1208 may be physically or logically co-located with each other in whole, or in part. Moreover, although FIG. 12 illustrates a particular number of client systems 1206, social networking systems 1202, third-party systems 1208, and networks 1204, this disclosure contemplates any suitable number of client systems 1206, social networking systems 1202, third-party systems 1208, and networks 1204. As an example and not by way of limitation, network environment 1200 may include multiple client system 1206, social networking systems 1202, third-party systems 1208, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client system 1206, social networking system 1202, and third-party system 1208 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client system 1206 may be an electronic device including hardware, software, or embedded logic components or a combination of two or more such components and capable of carrying out the appropriate functionalities implemented or supported by client system 1206. As an example and not by way of limitation, a client system 1206 may include any of the client devices or systems described in the above figures. A client system 1206 may enable a network user at client system 1206 to access network 1204. A client system 1206 may enable its user to communicate with other users at other client systems 1206.

In particular embodiments, client system 1206 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1206 may enter a Uniform Resource Locator (URL) or other address directing the web browser to a particular server (such as server, or a server associated with a third-party system 1208), and the web browser may generate a Hyper Text Transfer Protocol (HTTP) request and communicate the HTTP request to server. The server may accept the HTTP request and communicate to client system 1206 one or more Hyper Text Markup Language (HTML) files responsive to the HTTP request. Client system 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 1202 may be a network-addressable computing system that can host an online social network. Social networking system 1202 may generate, store, receive, and send social-networking data, such as, for example, user-profile data, concept-profile data, social-graph information, or other suitable data related to the online social network. Social networking system 1202 may be accessed by the other components of network environment 1200 either directly or via network 1204. In particular embodiments, social networking system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1206, a social networking system 1202, or a third-party system 1208 to manage, retrieve, modify, add, or delete, the information stored in data store.

In particular embodiments, social networking system 1202 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 1202 may provide users of the online social network the ability to communicate and interact with other users. In particular embodiments, users may join the online social network via social networking system 1202 and then add connections (e.g., relationships) to a number of other users of social networking system 1202 whom they want to be connected to. Herein, the term "friend" may refer to any other user of social networking system 1202 with whom a user has formed a connection, association, or relationship via social networking system 1202.

In particular embodiments, social networking system 1202 may provide users with the ability to take actions on various types of items or objects, supported by social networking system 1202. As an example and not by way of limitation, the items and objects may include groups or social networks to which users of social networking system 1202 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 1202 or by an external system of third-party system 1208, which is separate from social networking system 1202 and coupled to social networking system 1202 via a network 1204.

In particular embodiments, social networking system 1202 may be capable of linking a variety of entities. As an example and not by way of limitation, social networking system 1202 may enable users to interact with each other as well as receive content from third-party systems 1208 or other entities, or to allow users to interact with these entities through an application programming interfaces (API) or other communication channels.

In particular embodiments, a third-party system 1208 may include one or more types of servers, one or more data stores, one or more interfaces, including but not limited to APIs, one or more web services, one or more content sources, one or more networks, or any other suitable components, e.g., that servers may communicate with. A third-party system 1208 may be operated by a different entity from an entity operating social networking system 1202. In particular embodiments, however, social networking system 1202 and third-party systems 1208 may operate in conjunction with each other to provide social-networking services to users of social networking system 1202 or third-party systems 1208. In this sense, social networking system 1202 may provide a platform, or backbone, which other systems, such as third-party systems 1208, may use to provide social-networking services and functionality to users across the Internet.

In particular embodiments, a third-party system 1208 may include a third-party content object provider. A third-party content object provider may include one or more sources of content objects, which may be communicated to a client system 1206. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 1202 also includes user-generated content objects, which may enhance a user's interactions with social networking system 1202. User-generated content may include anything a user can add, upload, send, or "post" to social networking system 1202. As an example and not by way of limitation, a user communicates posts to social networking system 1202 from a client system 1206. Posts may include data such as status updates or other textual data, location information, photos, videos, links, music or other similar data or media. Content may also be added to social networking system 1202 by a third-party through a "communication channel," such as a newsfeed or stream.

In particular embodiments, social networking system 1202 may include a variety of servers, sub-systems, programs, modules, logs, and data stores. In particular embodiments, social networking system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 1202 may also include suitable components such as network interfaces, security mechanisms, load balancers, failover servers, management-and-network-operations consoles, other suitable components, or any suitable combination thereof. In particular embodiments, social networking system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 1202 to one or more client systems 1206 or one or more third-party system 1208 via network 1204. The web server may include a mail server or other messaging functionality for receiving and routing messages between social networking system 1202 and one or more client systems 1206. An API-request server may allow a third-party system 1208 to access information from social networking system 1202 by calling one or more APIs. An action logger may be used to receive communications from a web server about a user's actions on or off social networking system 1202. In conjunction with the action log, a third-party-content-object log may be maintained of user exposures to third-party-content objects. A notification controller may provide information regarding content objects to a client system 1206. Information may be pushed to a client system 1206 as notifications, or information may be pulled from client system 1206 responsive to a request received from client system 1206. Authorization servers may be used to enforce one or more privacy settings of the users of social networking system 1202. A privacy setting of a user determines how particular information associated with a user can be shared. The authorization server may allow users to opt in to or opt out of having their actions logged by social networking system 1202 or shared with other systems (e.g., third-party system 1208), such as, for example, by setting appropriate privacy settings. Third-party-content-object stores may be used to store content objects received from third parties, such as a third-party system 1208. Location stores may be used for storing location information received from client systems 1206 associated with users. Advertisement-pricing modules may combine social information, the current time, location information, or other suitable information to provide relevant advertisements, in the form of notifications, to a user.

Figure 13:
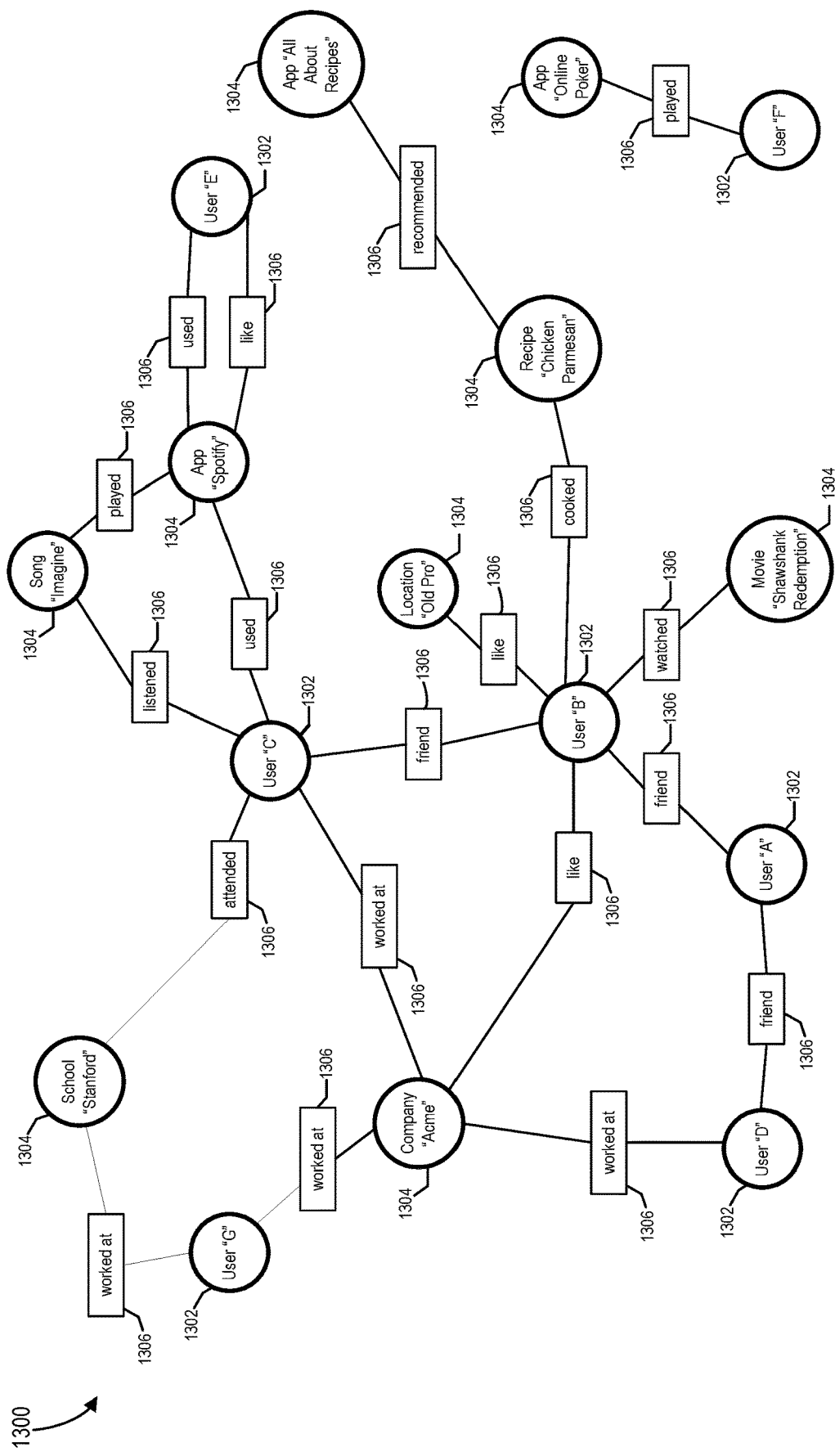
FIG. 13 illustrates an example social graph of a social networking system in accordance with one or more embodiments described herein.

FIG. 13 illustrates example social graph 1300. In particular embodiments, social networking system 1202 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a social networking system 1202, client system 1206, or third-party system 1208 may access social graph 1300 and related social-graph information for suitable applications. The nodes and edges of social graph 1300 may be stored as data objects, for example, in a data store (such as a social-graph database). Such a data store may include one or more searchable or query able indexes of nodes or edges of social graph 1300.

In particular embodiments, a user node 1302 may correspond to a user of social networking system 1202. As an example and not by way of limitation, a user may be an individual (human user), an entity (e.g., an enterprise, business, or third-party application), or a group (e.g., of individuals or entities) that interacts or communicates with or over social networking system 1202. In particular embodiments, when a user registers for an account with social networking system 1202, social networking system 1202 may create a user node 1302 corresponding to the user, and store the user node 1302 in one or more data stores. Users and user nodes 1302 described herein may, where appropriate, refer to registered users and user nodes 1302 associated with registered users. In addition, or as an alternative, users and user nodes 1302 described herein may, where appropriate, refer to users that have not registered with social networking system 1202. In particular embodiments, a user node 1302 may be associated with information provided by a user or information gathered by various systems, including social networking system 1202. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1304 may correspond to a concept. As an example and not by way of limitation, a concept may correspond to a place (such as, for example, a movie theater, restaurant, landmark, or city); a website (such as, for example, a website associated with social-network system 1202 or a third-party website associated with a web-application server); an entity (such as, for example, a person, business, group, sports team, or celebrity); a resource (such as, for example, an audio file, video file, digital photo, text file, structured document, or application) which may be located within social networking system 1202 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including social networking system 1202. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to social networking system 1202. Profile pages may also be hosted on third-party websites associated with a third-party server 1208. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 1208. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1206 to send to social networking system 1202 a message indicating the user's action. In response to the message, social networking system 1202 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, social networking system 1202 may send a "friend request" to the second user. If the second user confirms the "friend request," social networking system 1202 may create an edge 1306 connecting the first user's user node 1302 to the second user's user node 1302 in social graph 1300 and store edge 1306 as social-graph information in one or more of data stores. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to an edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, social networking system 1202 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1202 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, social networking system 1202 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, social networking system 1202 may create an edge 1306 between a user node 1302 and a concept node 1304 in social graph 1300. As an example and not by way of limitation, a user viewing a concept-profile page (such as, for example, by using a web browser or a special-purpose application hosted by the user's client system 1206) may indicate that he or she likes the concept represented by the concept node 1304 by clicking or selecting a "Like" icon, which may cause the user's client system 1206 to send to social networking system 1202 a message indicating the user's liking of the concept associated with the concept-profile page. In response to the message, social networking system 1202 may create an edge 1306 between user node 1302 associated with the user and concept node 1304, as illustrated by "like" edge 1306 between the user and concept node 1304. In particular embodiments, social networking system 1202 may store an edge 1306 in one or more data stores. In particular embodiments, an edge 1306 may be automatically formed by social networking system 1202 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 1202). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1202 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1202) or RSVP (e.g., through social networking system 1202) to an event associated with the advertisement. In addition, or as an alternative, an advertisement may include social-networking-system context directed to the user. As an example and not by way of limitation, an advertisement may display information about a friend of the user within social networking system 1202 who has taken an action associated with the subject matter of the advertisement.

In particular embodiments, social networking system 1202 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1208 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1202 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1202 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 130%). To calculate the coefficient of a user towards a particular object, the rating assigned to the user's actions may comprise, for example, 60% of the overall coefficient, while the relationship between the user and the object may include 40% of the overall coefficient. In particular embodiments, the social networking system 1202 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1202 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1202 may calculate a coefficient based on a user's actions. Social networking system 1202 may monitor such actions on the online social network, on a third-party system 1208, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1202 may calculate a coefficient based on the user's actions with particular types of content. The content may be associated with the online social network, a third-party system 1208, or another suitable system. The content may include users, profile pages, posts, news stories, headlines, instant messages, chat room conversations, emails, advertisements, pictures, video, music, other suitable objects, or any combination thereof. Social networking system 1202 may analyze a user's actions to determine whether one or more of the actions indicate an affinity for subject matter, content, other users, and so forth. As an example and not by way of limitation, if a user may make frequently posts content related to "coffee" or variants thereof, social networking system 1202 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1202 may calculate a coefficient based on the type of relationship between particular objects. Referencing the social graph 1300, social networking system 1202 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than user nodes 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1202 may determine that the user has a higher coefficient with respect to the first photo than the second photo because having a tagged-in-type relationship with content may be assigned a higher weight and/or rating than having a like-type relationship with content. In particular embodiments, social networking system 1202 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1202 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, social networking system 1202 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1206 of the user). A first user may be more interested in other users or concepts that are closer to the first user. As an example and not by way of limitation, if a user is one mile from an airport and two miles from a gas station, social networking system 1202 may determine that the user has a higher coefficient for the airport than the gas station based on the proximity of the airport to the user.

In particular embodiments, social networking system 1202 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1202 may provide information that is relevant to user's interests and current circumstances, increasing the likelihood that they will find such information of interest. In particular embodiments, social networking system 1202 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1202 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1202 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1208 (e.g., via an API or other communication channel), or from another suitable system. In response to the request, social networking system 1202 may calculate the coefficient (or access the coefficient information if it has previously been calculated and stored). In particular embodiments, social networking system 1202 may measure an affinity with respect to a particular process. Different processes (both internal and external to the online social network) may request a coefficient for a particular object or set of objects. Social networking system 1202 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 11, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1304 corresponding to a particular photo may have a privacy setting specifying that the photo may only be accessed by users tagged in the photo and their friends. In particular embodiments, privacy settings may allow users to opt in or opt out of having their actions logged by social networking system 1202 or shared with other systems (e.g., third-party system 1208). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1208, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1202 may send a request to the data store for the object. The request may identify the user associated with the request and may only be sent to the user (or a client system 1206 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
determining a plurality of related user-generated media streams from a plurality of mobile devices associated with a corresponding plurality of capturing users based on a comparison between one or more characteristics of the plurality of user-generated media streams and one or more attributes of a viewing user within a social network graph;
providing a media presentation to a client device associated with the viewing user comprising content from a first user-generated media stream of the plurality of user-generated media streams;
detecting, by at least one processor, an object within a video portion of the first user-generated media stream;
identifying text corresponding to the object;
adding the text adjacent to the object within the video portion of the first user-generated media stream;
tracking the object within the video portion of the first user-generated media stream;
updating a location of the added text within the video portion of the first user-generated media stream to remain adjacent to the object; and
upon causing the client device to switch to a second user-generated media stream of the plurality of user-generated media streams, adding the text adjacent to the object within a video portion of the second user-generated media stream.

2. The computer-implemented method of claim 1, further comprising determining that the viewing user has an affinity to the object within the video portion of the first user-generated media stream based on determining a correspondence between the object and an attribute associated with the viewing user.

3. The computer-implemented method of claim 1, further comprising detecting the object within the video portion of the first user-generated media stream based on analyzing media characteristics of the first user-generated media stream.

4. The computer-implemented method of claim 3, wherein the media characteristics of the first user-generated media stream comprise meta-data indicating the object is present within the first user-generated media stream.

5. The computer-implemented method of claim 1, wherein the object within the video portion of the first user-generated media stream comprises a face, a landmark, a brand, or a symbol.

6. The computer-implemented method of claim 1, further comprising analyzing one or more media characteristics associated with the first user-generated media stream to identify the text corresponding to the object within the video portion of the first user-generated media stream.

7. The computer-implemented method of claim 1, further comprising appending a graphic adjacent to the object within the video portion of the first user-generated media stream.

8. The computer-implemented method of claim 1, wherein adding the text adjacent to the object within the video portion of the first user-generated media stream comprises matching the text to an outline shape of the object.

9. The computer-implemented method of claim 8, wherein the outline shape of the object is curved.

10. The computer-implemented method of claim 1, wherein the video portion of the second user-generated media stream and the video portion of the first user-generated media stream portrays the object from different viewing angles.

11. A non-transitory computer-readable medium storing instructions thereon that, when executed by at least one processor, cause a computer system to:
determine a plurality of user-generated media streams from a plurality of mobile devices associated with a corresponding plurality of capturing users based on a comparison between one or more characteristics of the plurality of user-generated media streams and one or more attributes of a viewing user within a social graph;
provide a media presentation to a client device associated with the viewing user comprising content from a first user-generated media stream of the plurality of user-generated media streams;
detect an object within a video portion of the first user-generated media stream;
identify text corresponding to the object;
add the text adjacent to the object within the video portion of the first user-generated media stream;
track the object within the video portion of the first user-generated media stream;
update a location of the added text within the video portion of the first user-generated media stream to remain adjacent to the object; and upon causing the client device to switch to a second user-generated media stream of the plurality of user-generated media streams, add the text adjacent to the object within a video portion of the second user-generated media stream.

12. The non-transitory computer-readable medium of claim 11, further comprising instructions that, when executed by the at least one processor, cause the computer system to:
detect a change in size of the object within the video portion of the first user-generated media stream; and
modify a visual attribute of the text within the video portion of the first user-generated media stream based on the detected change in size of the object.

13. The non-transitory computer-readable medium of claim 11, further comprising instructions that, when executed by the at least one processor, cause the computer system to:
receive a set of user-generated media streams from the plurality of mobile devices associated with the corresponding plurality of capturing users;
generate one or more media characteristics for each user-generated media streams of the of set of user-generated media streams;
analyze the one or more media characteristics from each of the set of user-generated media streams to determine a subset of user-generated media streams that share a correspondence to an attribute associated with the viewing user; and
determine that the subset of user-generated media streams is the plurality of user-generated media streams.

14. The non-transitory computer-readable medium of claim 11, further comprising instructions that, when executed by the at least one processor, cause the computer system to detect the object within the video portion of the first user-generated media stream based on analyzing media characteristics of the first user-generated media stream.

15. The non-transitory computer-readable medium of claim 11, further comprising instructions that, when executed by the at least one processor, cause the computer system to determine that the viewing user has an affinity to the object within the video portion of the first user-generated media stream based on determining a correspondence between the object and an attribute associated with the viewing user.

16. A system comprising:
at least one processor; and
at least one non-transitory computer-readable storage medium storing instructions thereon that, when executed by the at least one processor, cause the system to:
determine a plurality of user-generated media streams from a plurality of mobile devices associated with a corresponding plurality of capturing users based on a comparison between one or more characteristics of the plurality of user-generated media streams and one or more attributes of a viewing user within a social graph;
provide a media presentation to a client device associated with the viewing user comprising content from a first user-generated media stream of the plurality of user-generated media streams;
detect an object within a video portion of the first user-generated media stream;
identify text corresponding to the object;
add the text adjacent to the object within the video portion of the first user-generated media stream;
track the object within the video portion of the first user-generated media stream;
update a location of the added text within the video portion of the first user-generated media stream to remain adjacent to the object; and
upon causing the client device to switch to a second user-generated media stream of the plurality of user-generated media streams, add the text adjacent to the object within a video portion of the second user-generated media stream.

17. The system of claim 16, further comprising instructions that, when executed by the at least one processor, cause the system to analyze one or more media characteristics associated with the first user-generated media stream to identify the text corresponding to the object within the video portion of the first user-generated media stream.

18. The system of claim 16, further comprising instructions that, when executed by the at least one processor, cause the system to append a graphic adjacent to the object within the video portion of the first user-generated media stream.

19. The system of claim 17, wherein the instructions cause the system to add the text adjacent to the object within the video portion of the first user-generated media stream by matching the text to an outline shape of the object.

20. The system of claim 19, wherein the outline shape of the object is curved.

* * * * *